Figure 1:
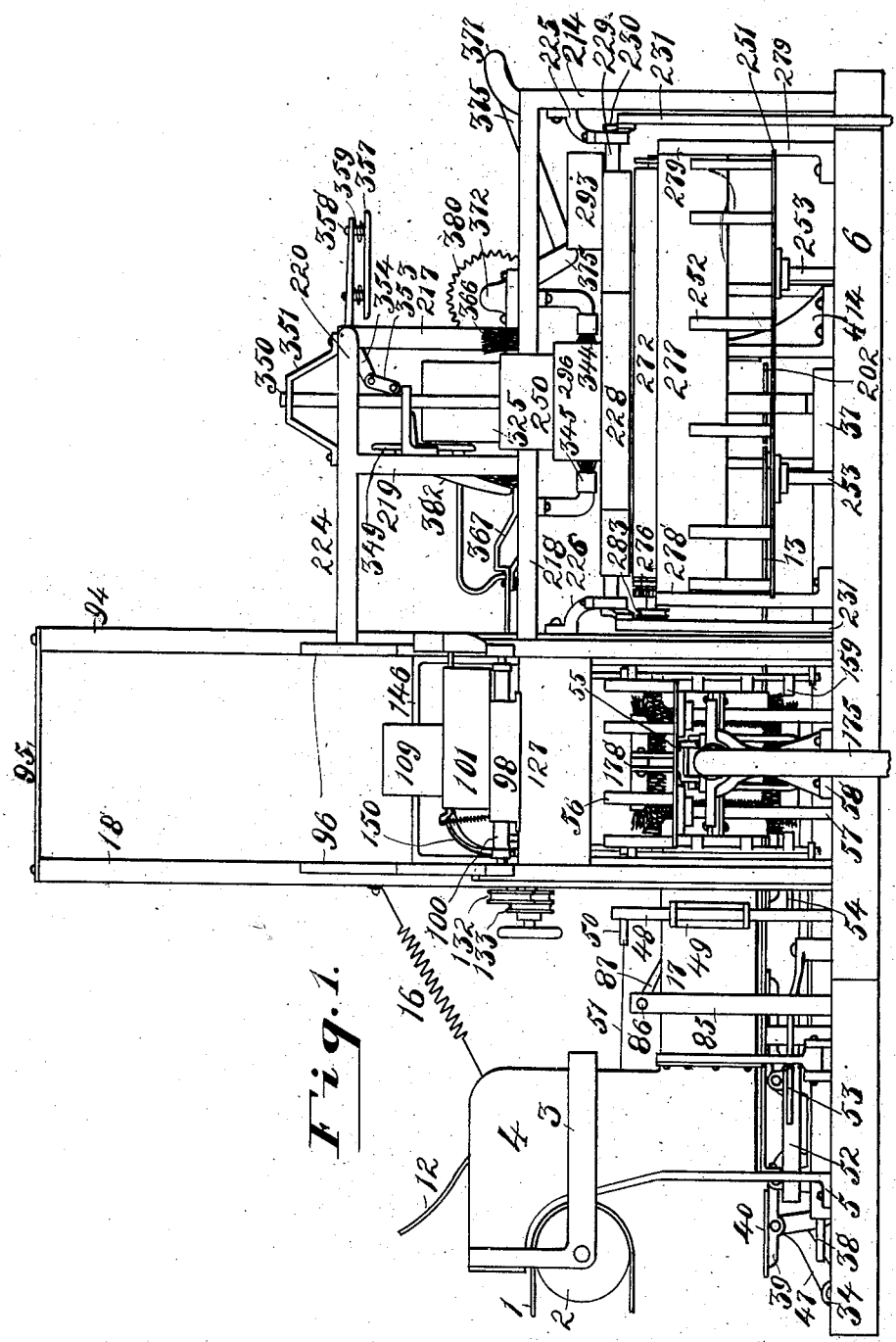

No. 836,902. PATENTED NOV. 27, 1906.
W. C. STEVENS.
LABEL PLACING MACHINE.
APPLICATION FILED JULY 10, 1905.

31 SHEETS—SHEET 1.

Witnesses:
G. Humphrey
Glenara Fox

Inventor,
W. C. Stevens
by C. E. Humphrey
Atty.

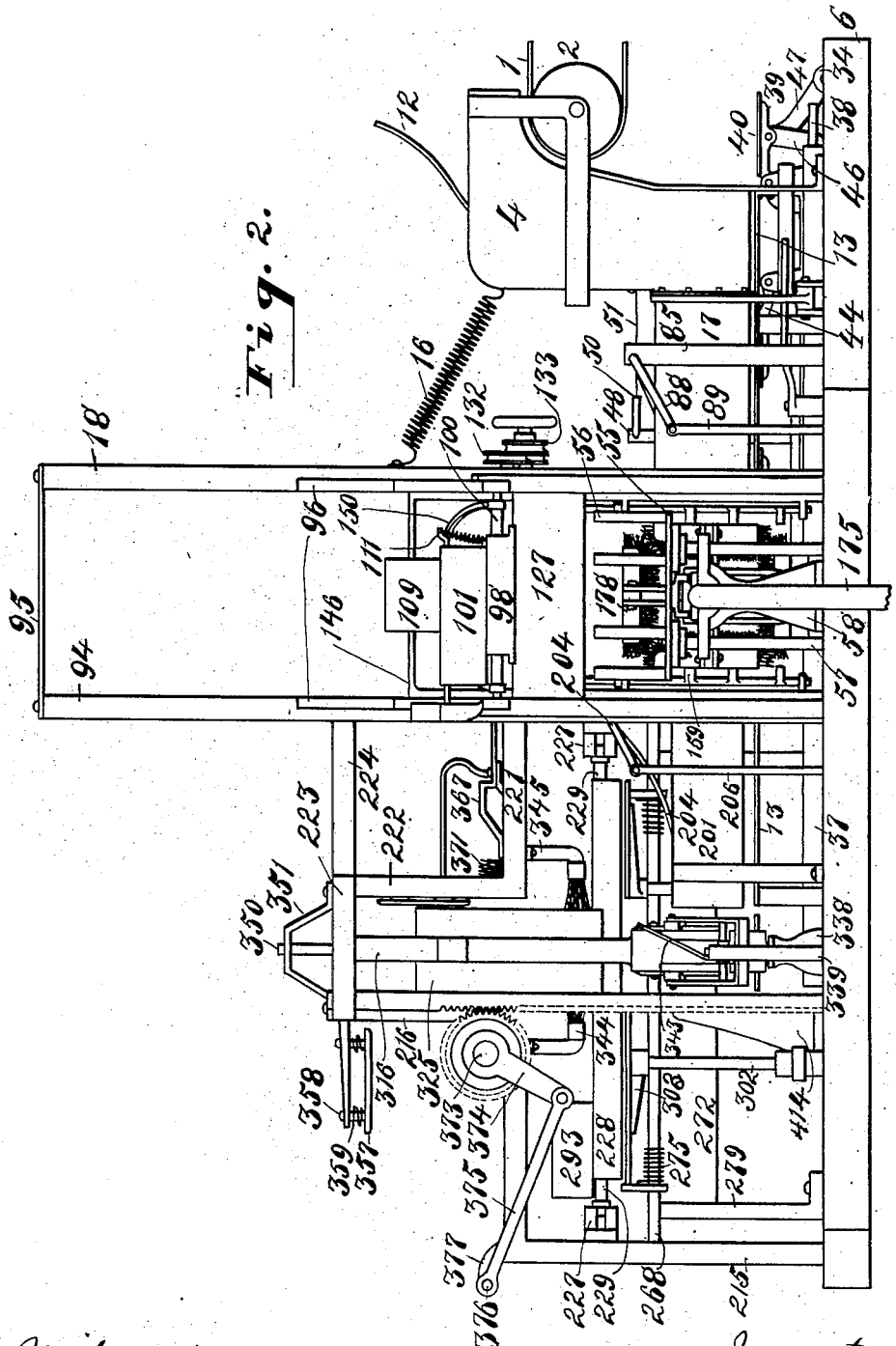

No. 836,902. PATENTED NOV. 27, 1906.
W. C. STEVENS.
LABEL PLACING MACHINE.
APPLICATION FILED JULY 10, 1905.
31 SHEETS—SHEET 3.
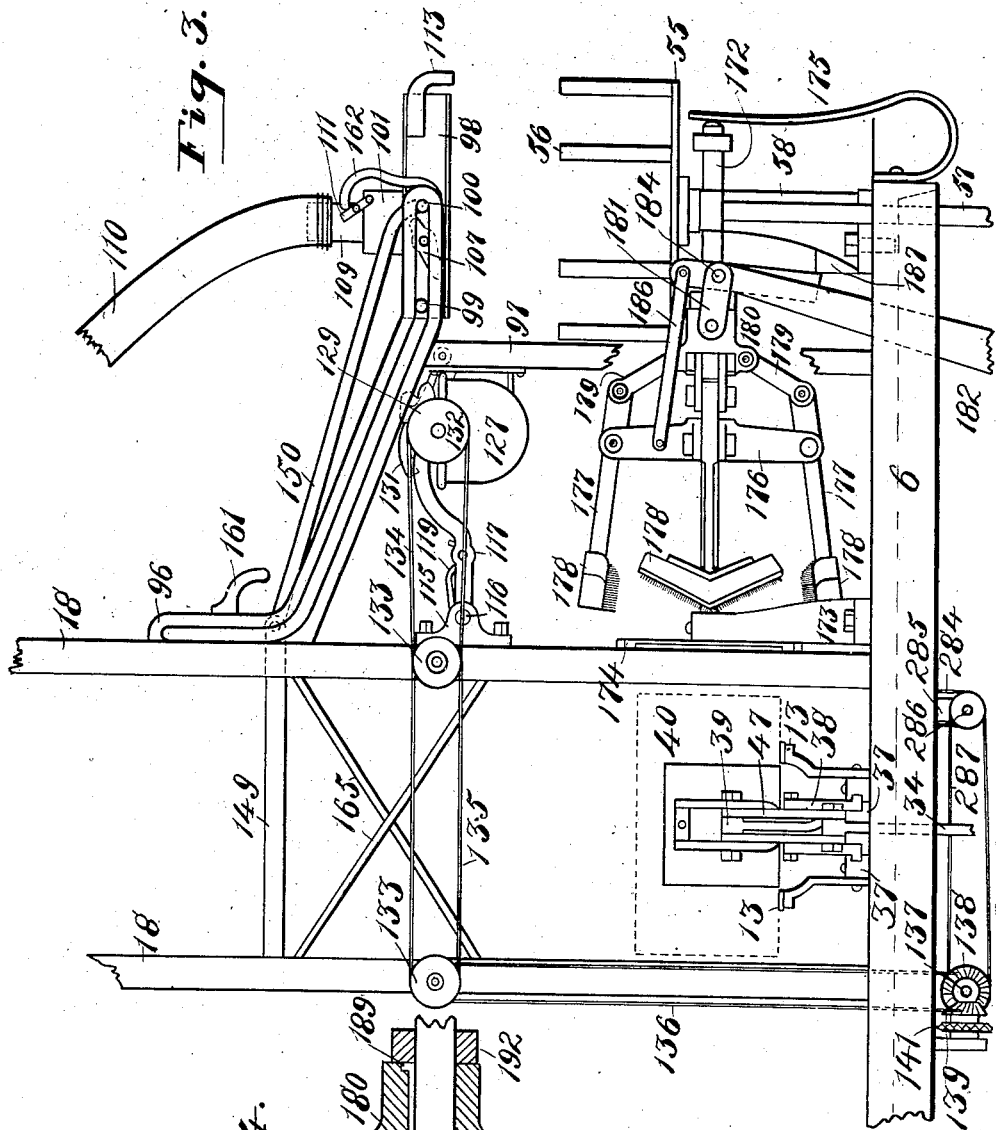
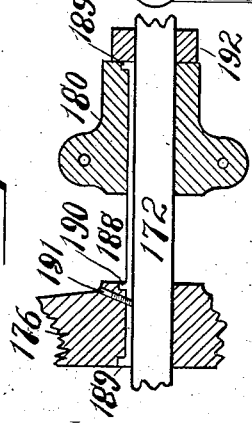

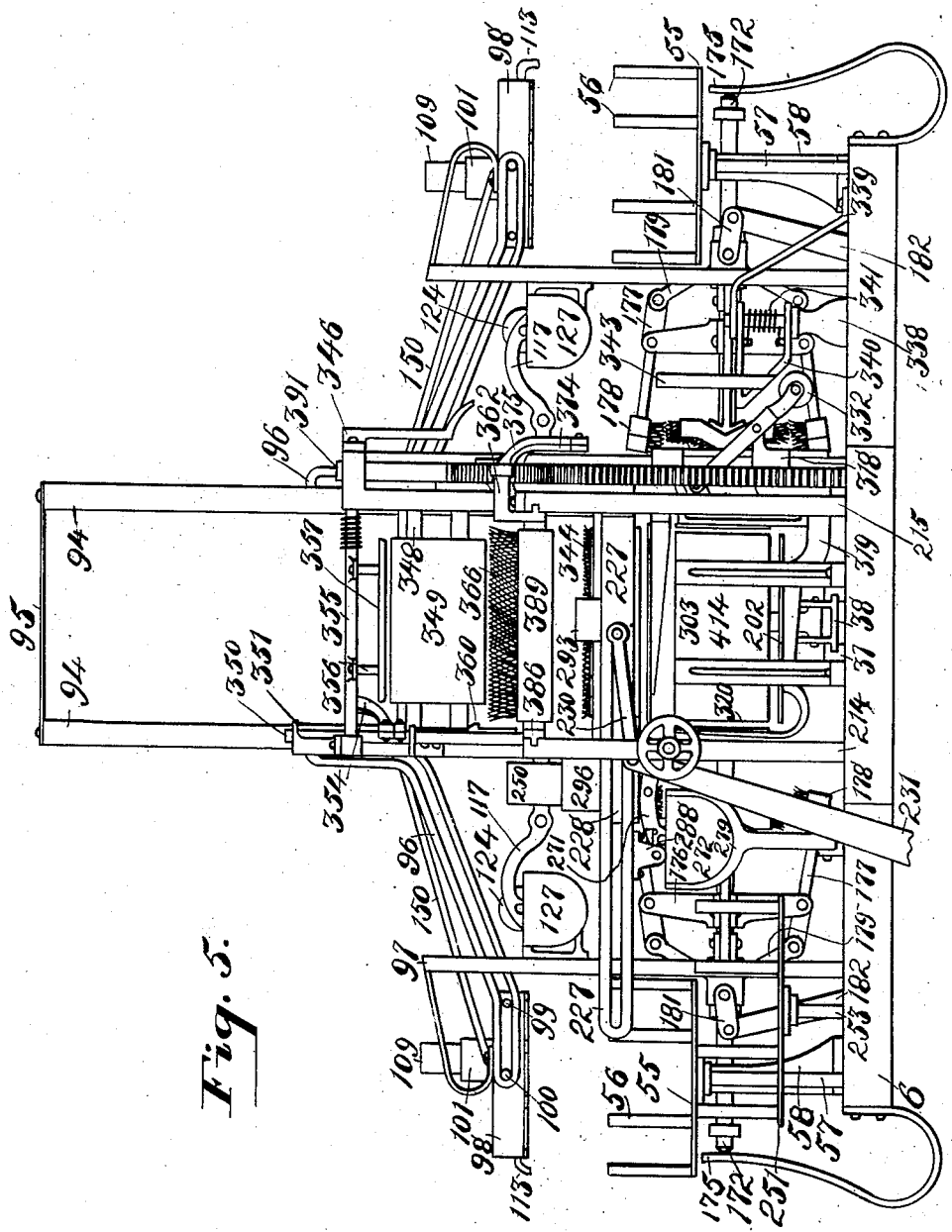

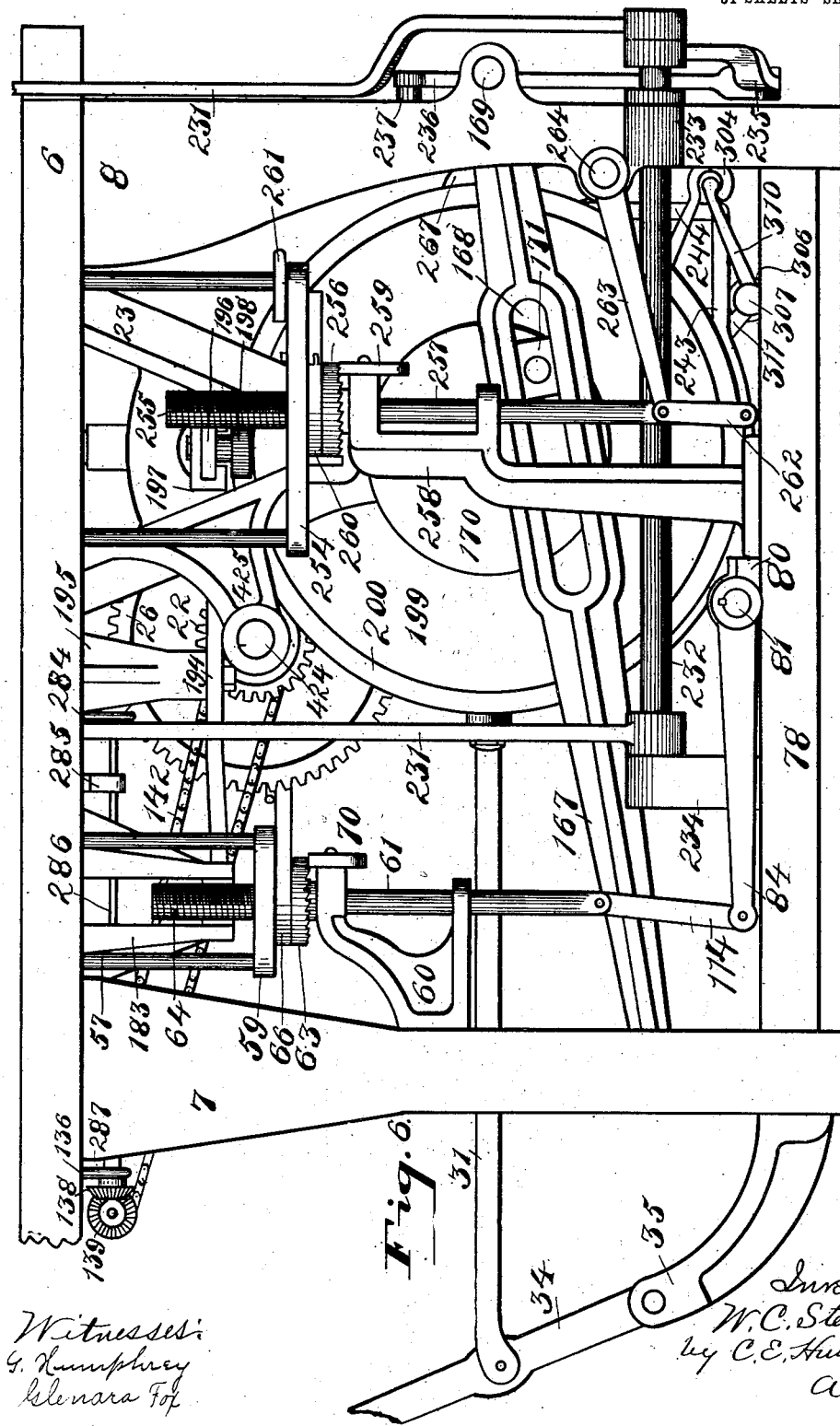

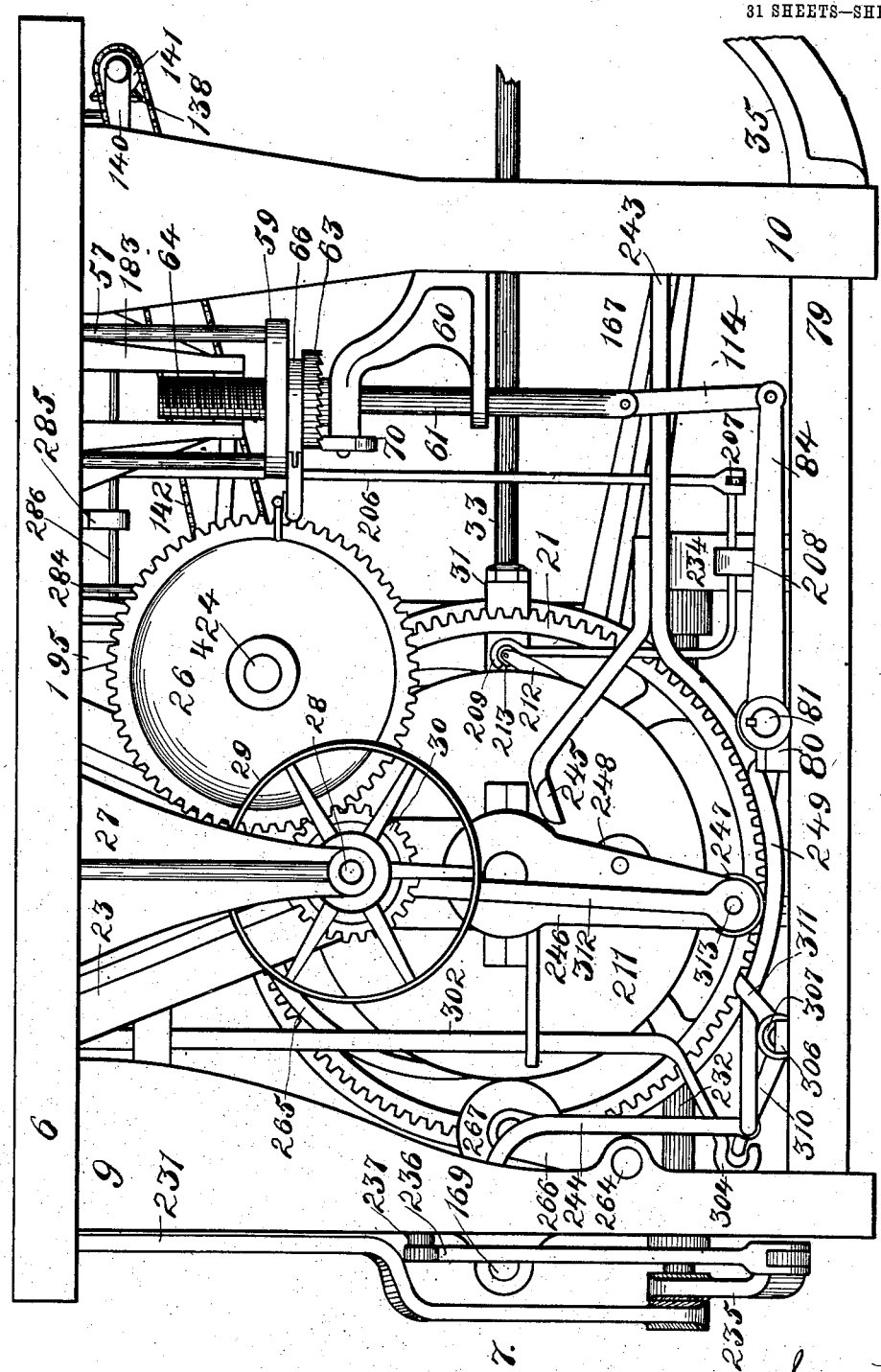

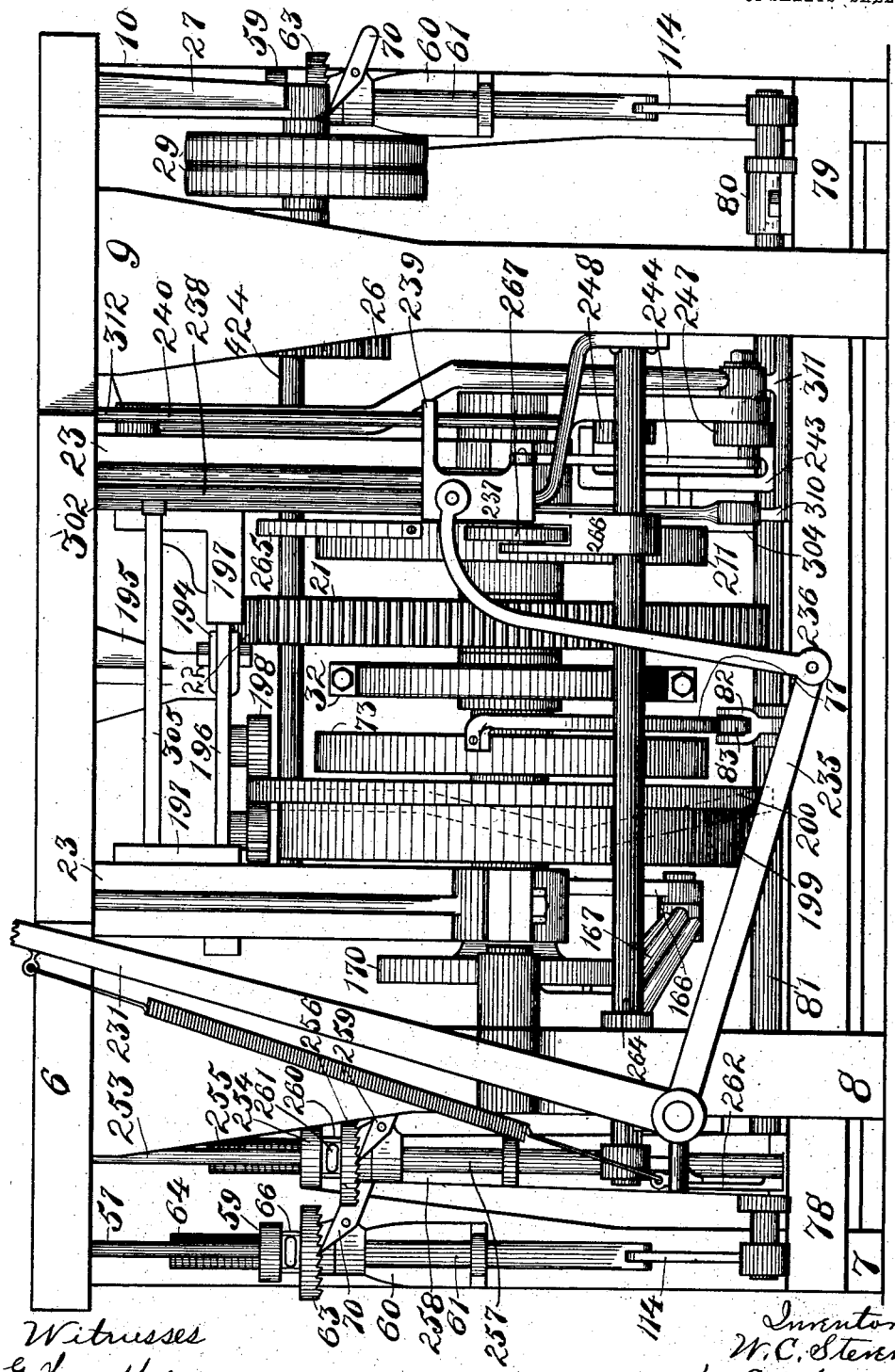

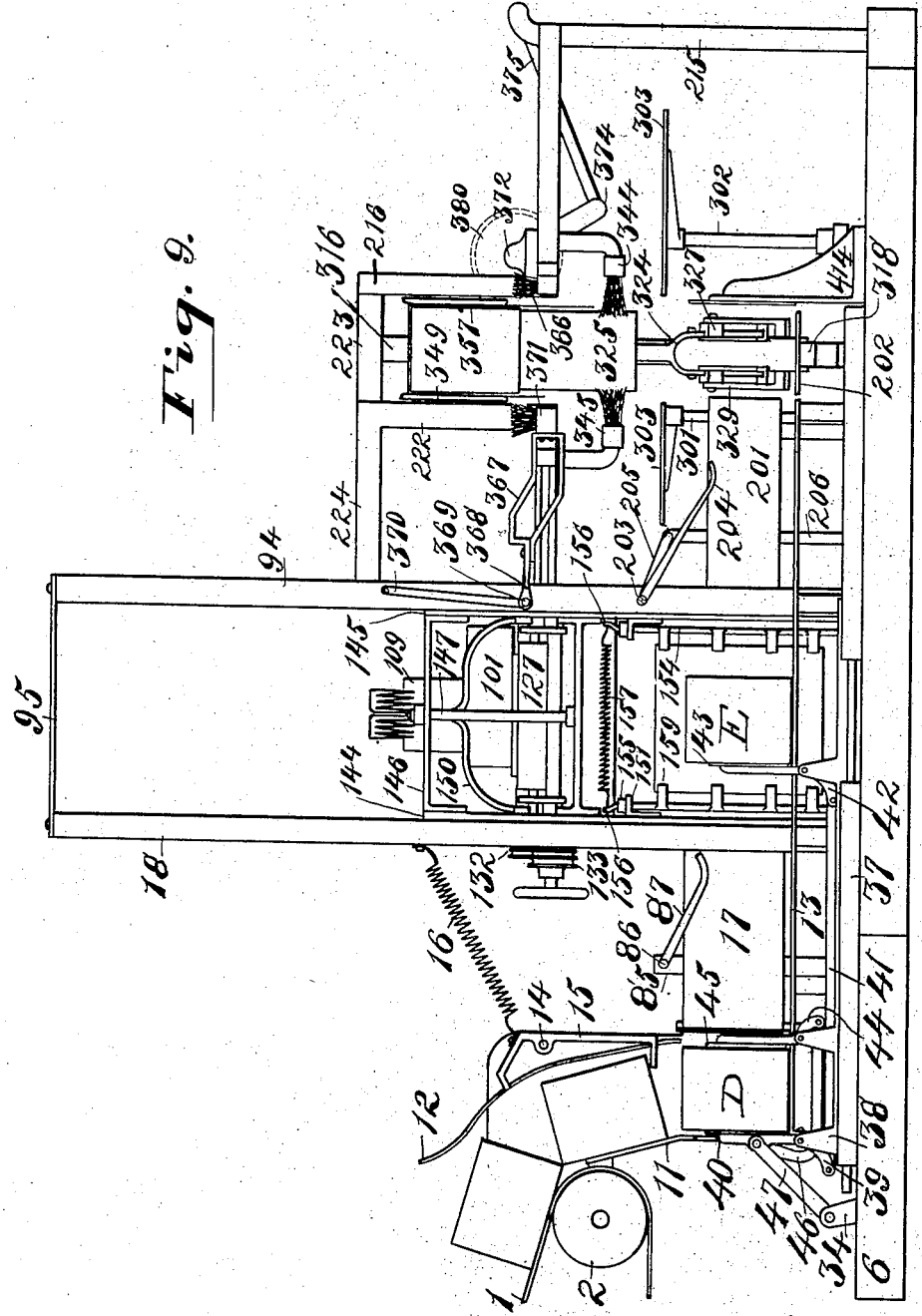

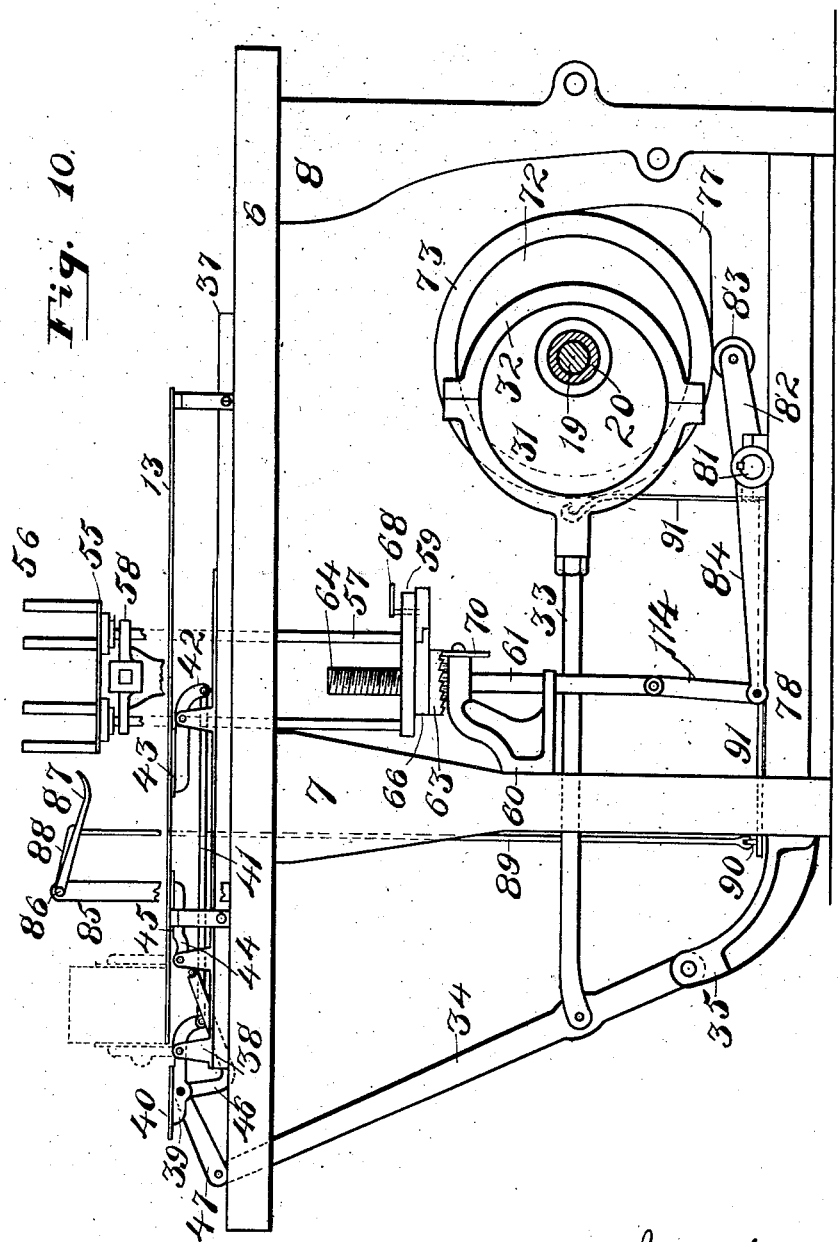

No. 836,902. PATENTED NOV. 27, 1906.
W. C. STEVENS.
LABEL PLACING MACHINE.
APPLICATION FILED JULY 10, 1905.
31 SHEETS—SHEET 10.
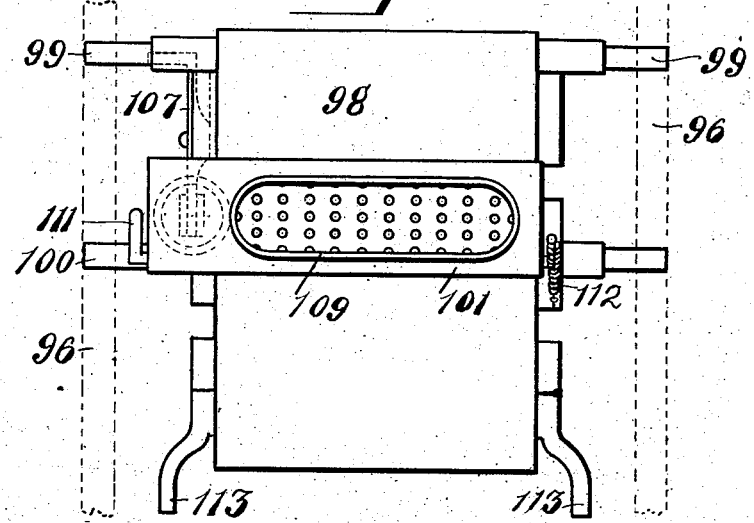
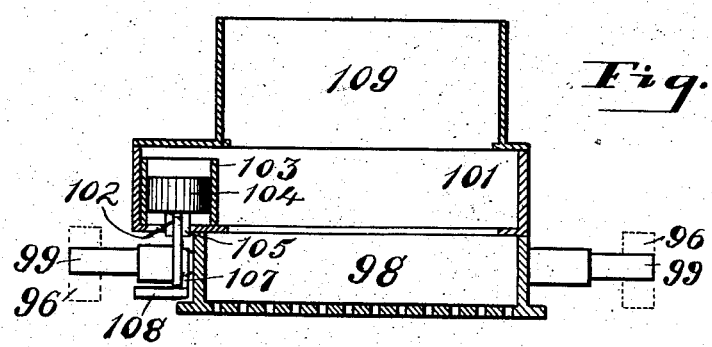
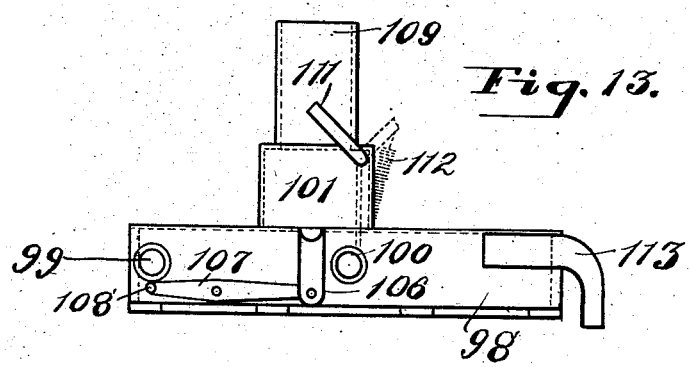

No. 836,902. PATENTED NOV. 27, 1906.
W. C. STEVENS.
LABEL PLACING MACHINE.
APPLICATION FILED JULY 10, 1905.
31 SHEETS—SHEET 11.
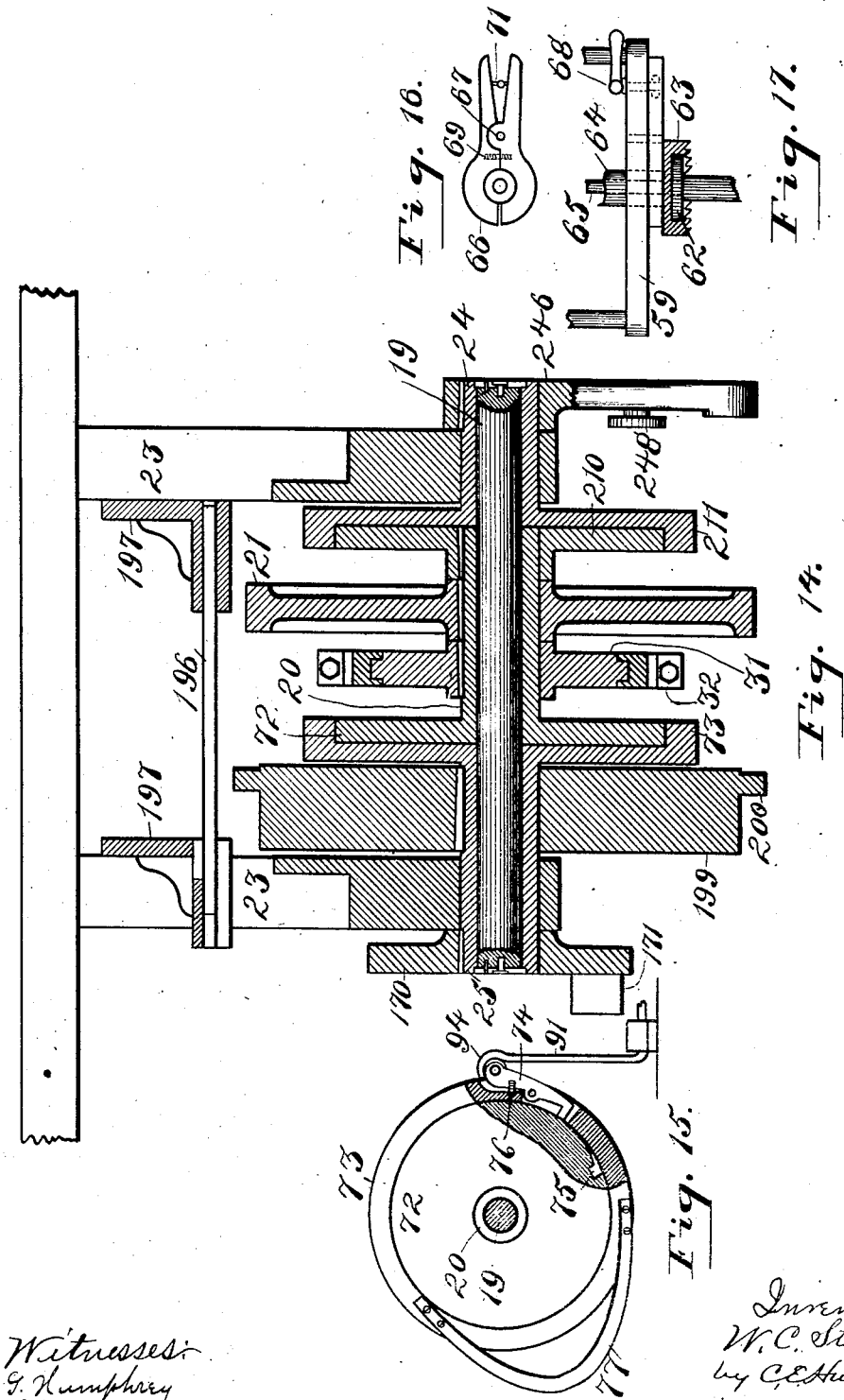

No. 836,902. PATENTED NOV. 27, 1906.
W. C. STEVENS.
LABEL PLACING MACHINE.
APPLICATION FILED JULY 10, 1905.
31 SHEETS—SHEET 12.
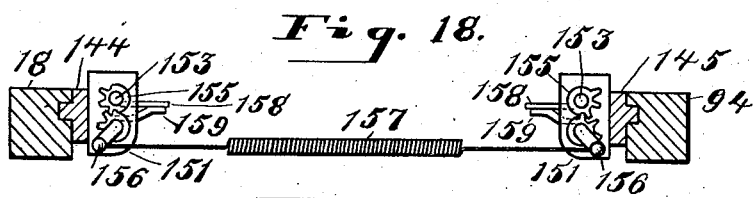
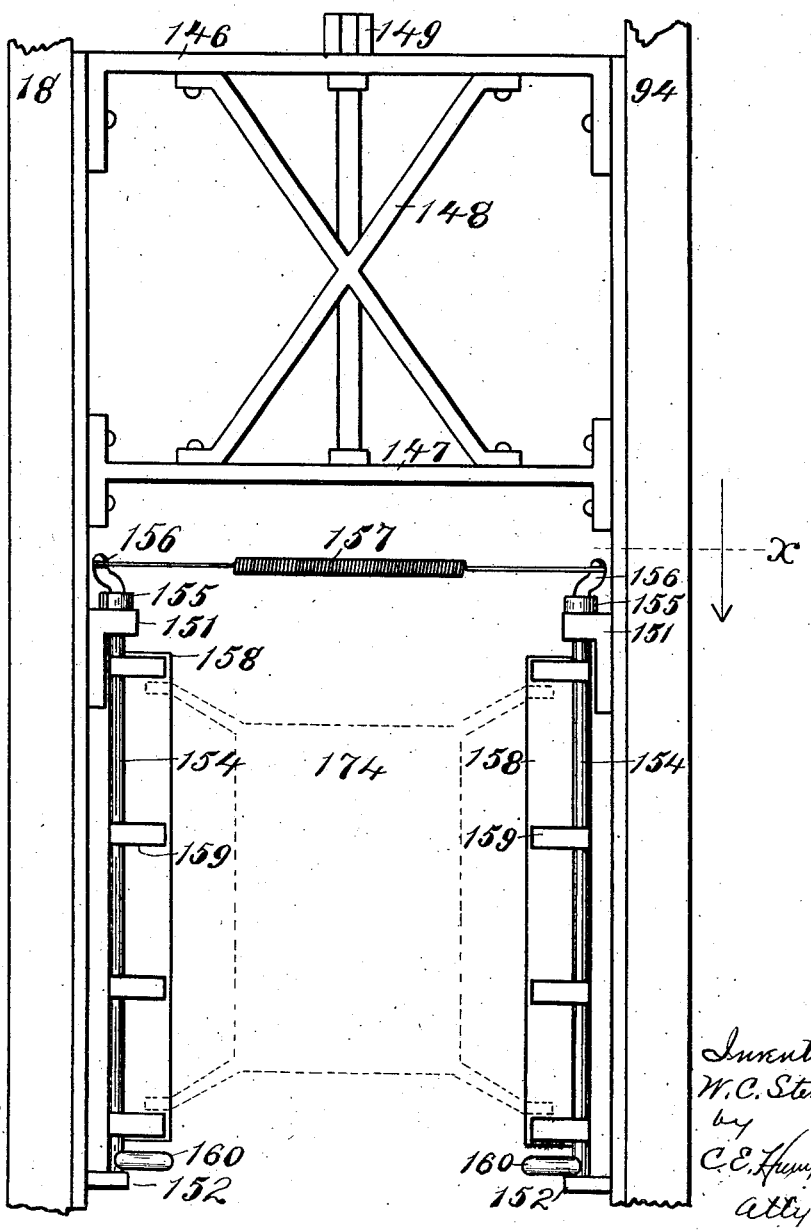

No. 836,902. PATENTED NOV. 27, 1906.
W. C. STEVENS.
LABEL PLACING MACHINE.
APPLICATION FILED JULY 10, 1905.

31 SHEETS—SHEET 13.

Witnesses
G. Humphrey
Glenara Fox

Inventor
W. C. Stevens
by C. E. Humphrey
Atty.

No. 836,902. PATENTED NOV. 27, 1906.
W. C. STEVENS.
LABEL PLACING MACHINE.
APPLICATION FILED JULY 10, 1905.

31 SHEETS—SHEET 14.

No. 836,902. PATENTED NOV. 27, 1906.
W. C. STEVENS.
LABEL PLACING MACHINE.
APPLICATION FILED JULY 10, 1905.

31 SHEETS—SHEET 16.

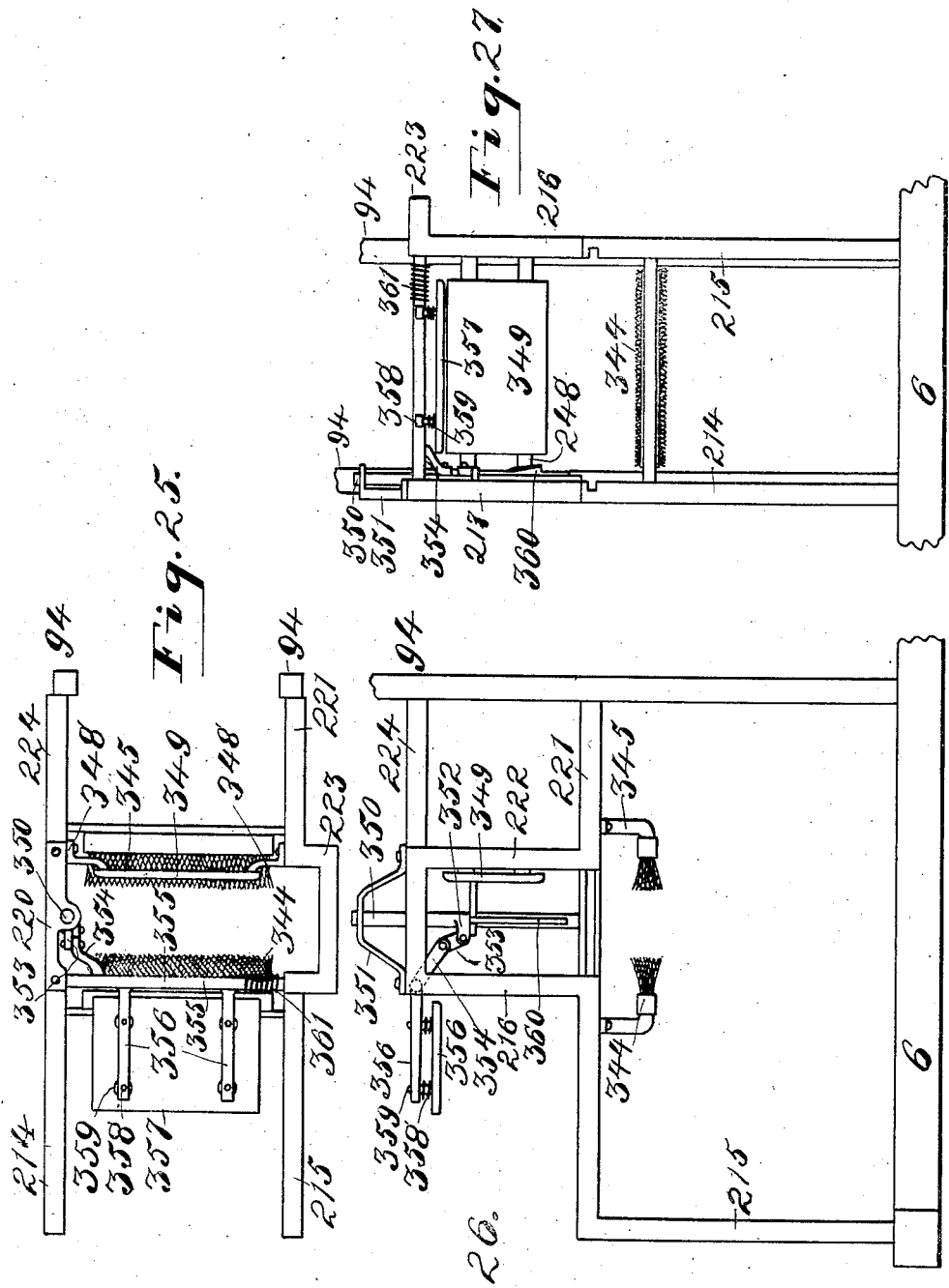

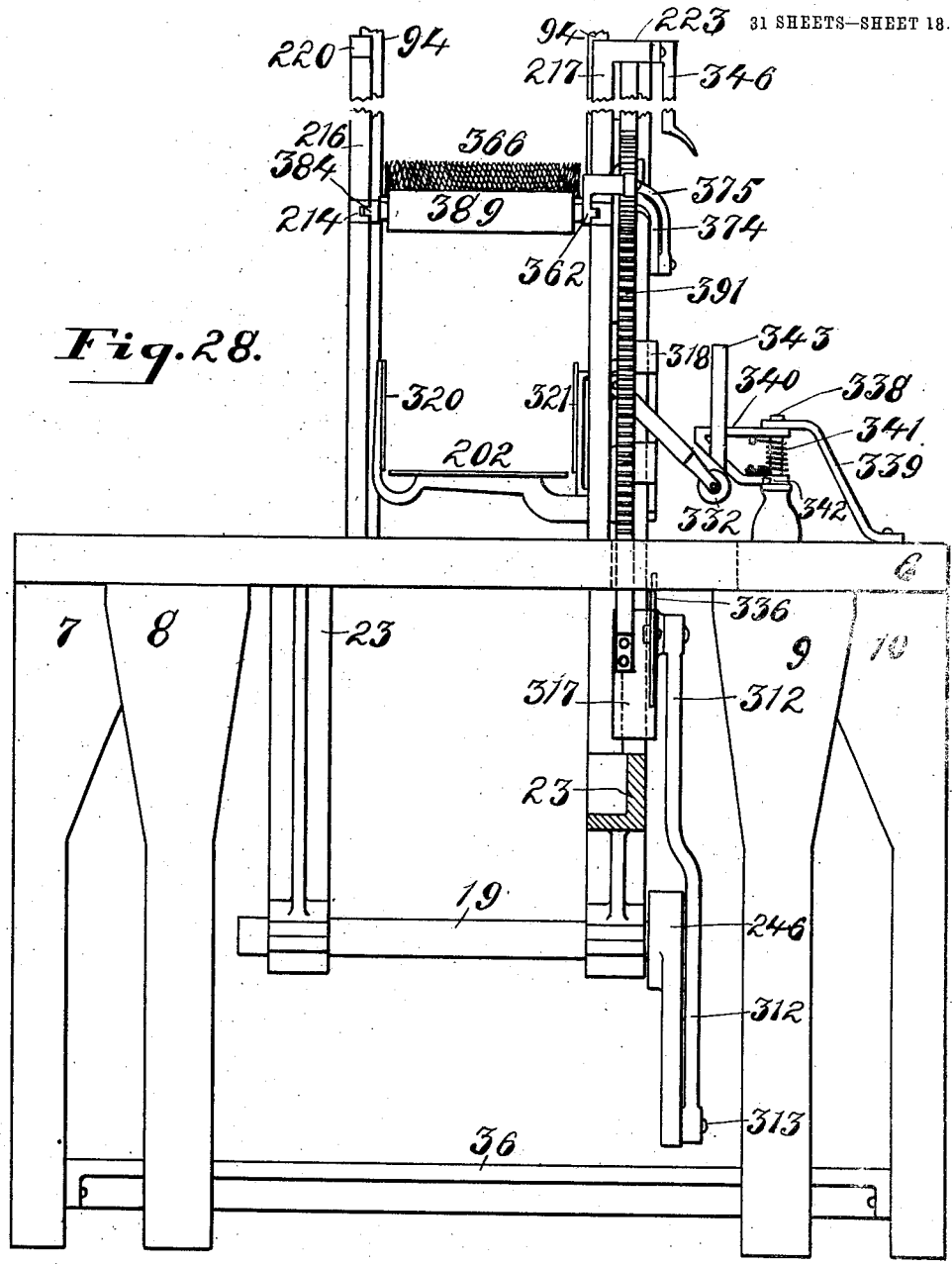

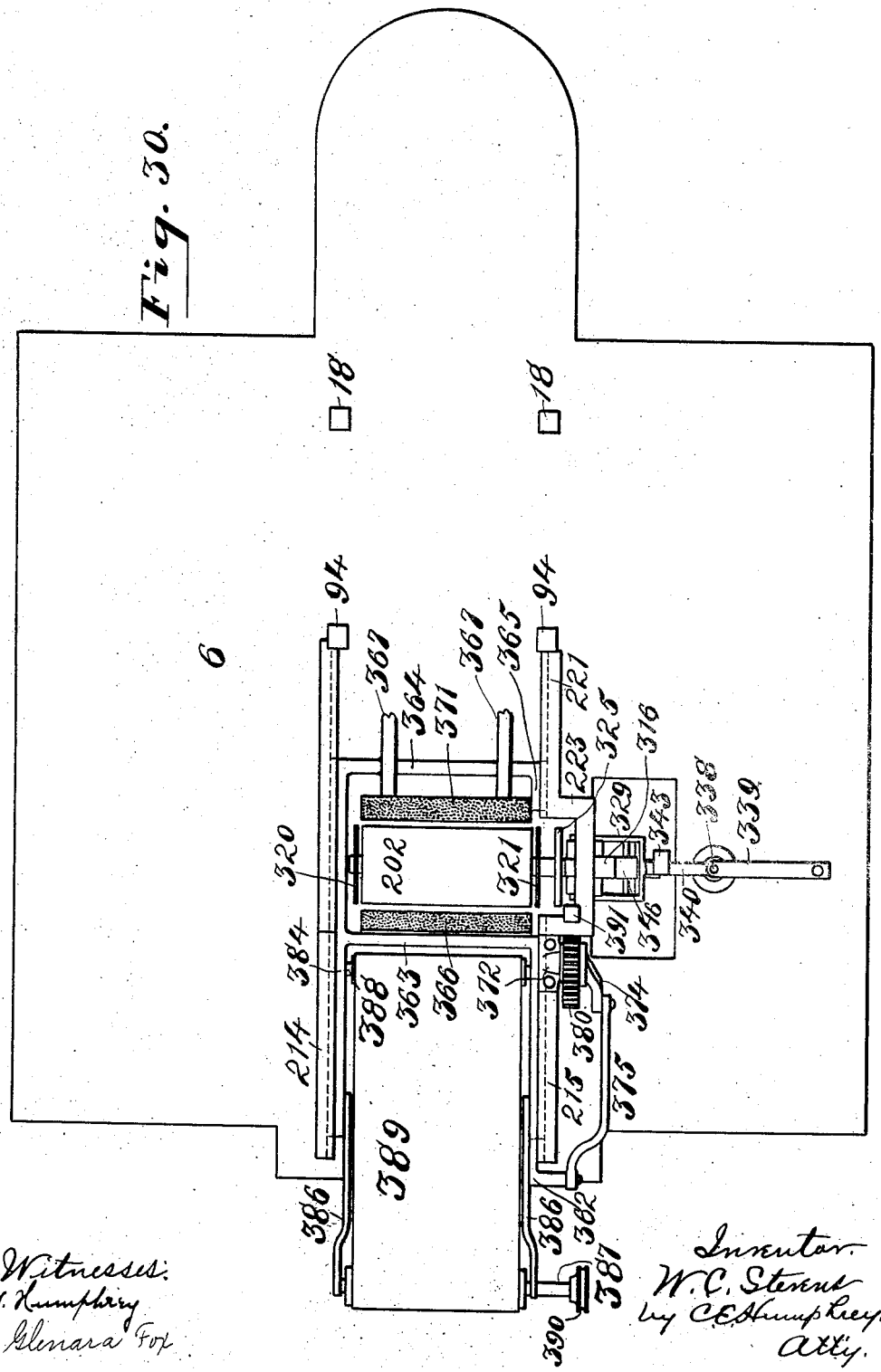

No. 836,902. PATENTED NOV. 27, 1906.
W. C. STEVENS.
LABEL PLACING MACHINE.
APPLICATION FILED JULY 10, 1905.
31 SHEETS—SHEET 21.
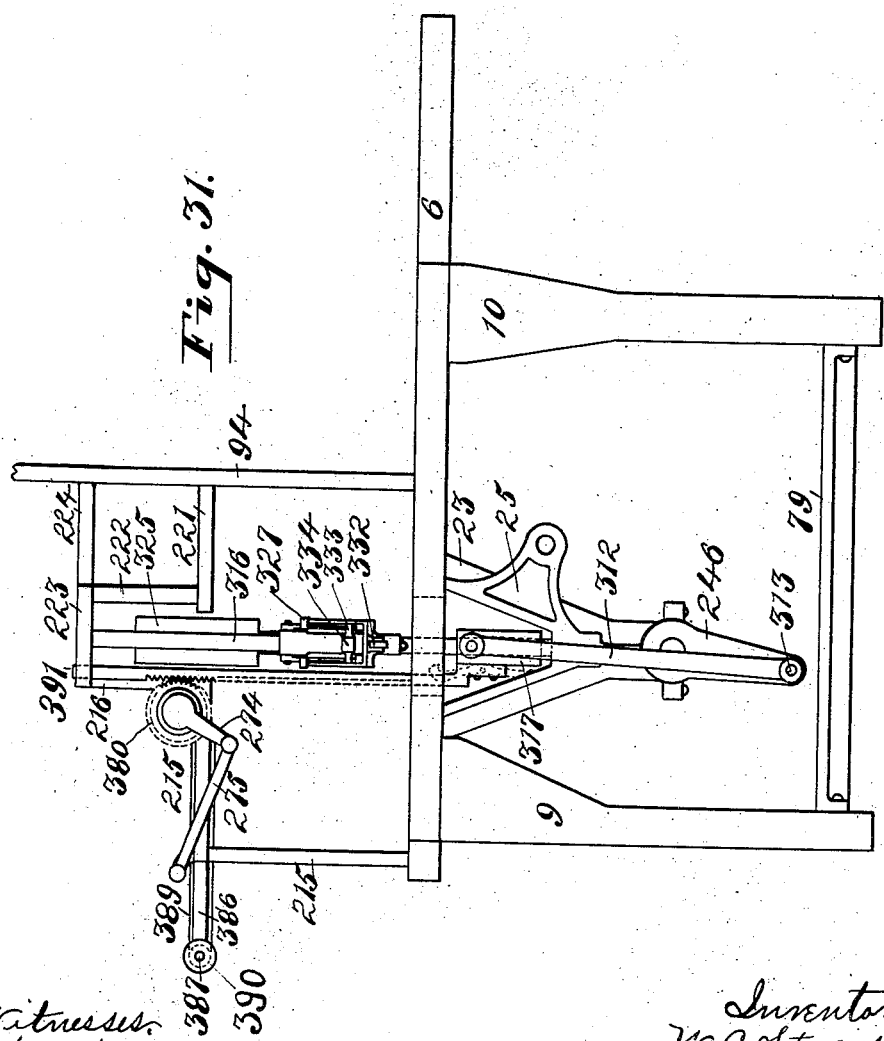

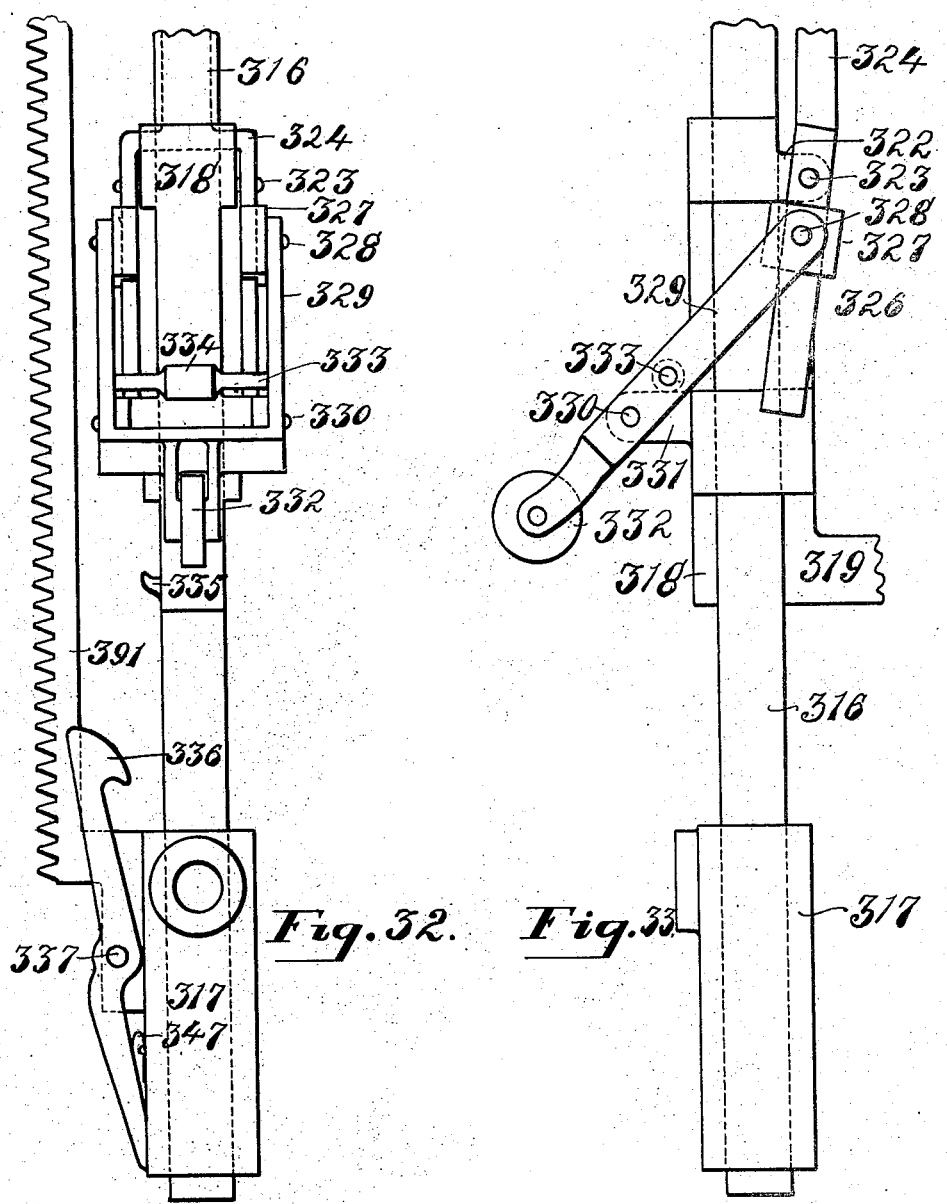

No. 836,902. PATENTED NOV. 27, 1906.
W. C. STEVENS.
LABEL PLACING MACHINE.
APPLICATION FILED JULY 10, 1905.
31 SHEETS—SHEET 23.
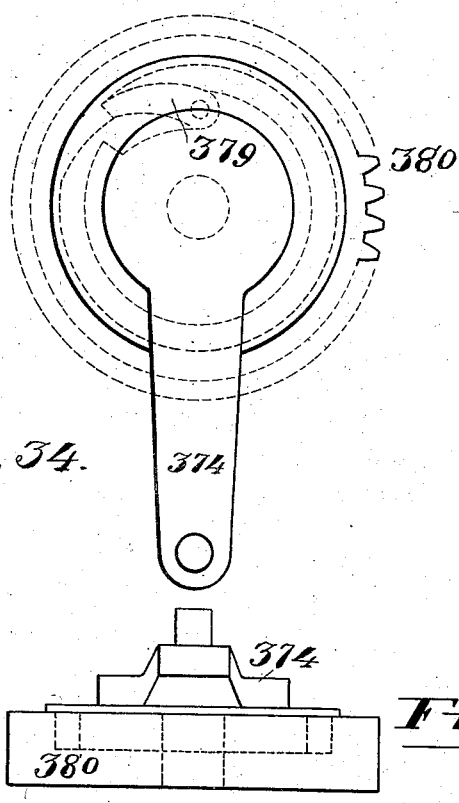
Fig. 34.
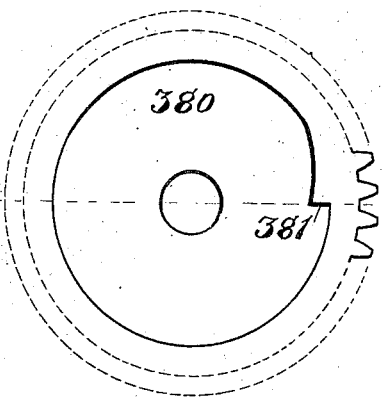
Fig. 36.
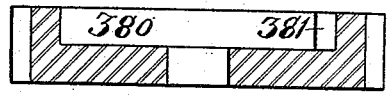
Fig. 37.
Fig. 35.
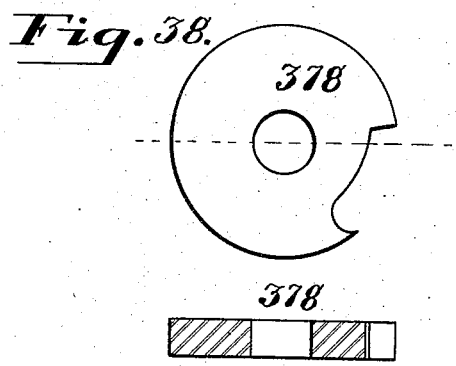
Fig. 38.
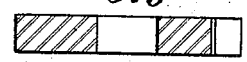
Fig. 39.
Witnesses:
G. Humphrey
Glenara Fot
Inventor,
W. C. Stevens
by C. E. Humphrey,
Atty.

No. 836,902. PATENTED NOV. 27, 1906.
W. C. STEVENS.
LABEL PLACING MACHINE.
APPLICATION FILED JULY 10, 1905.
31 SHEETS—SHEET 24.
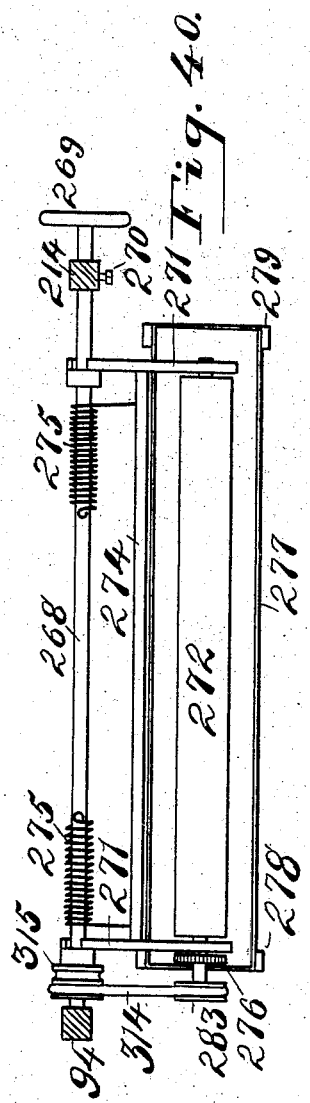
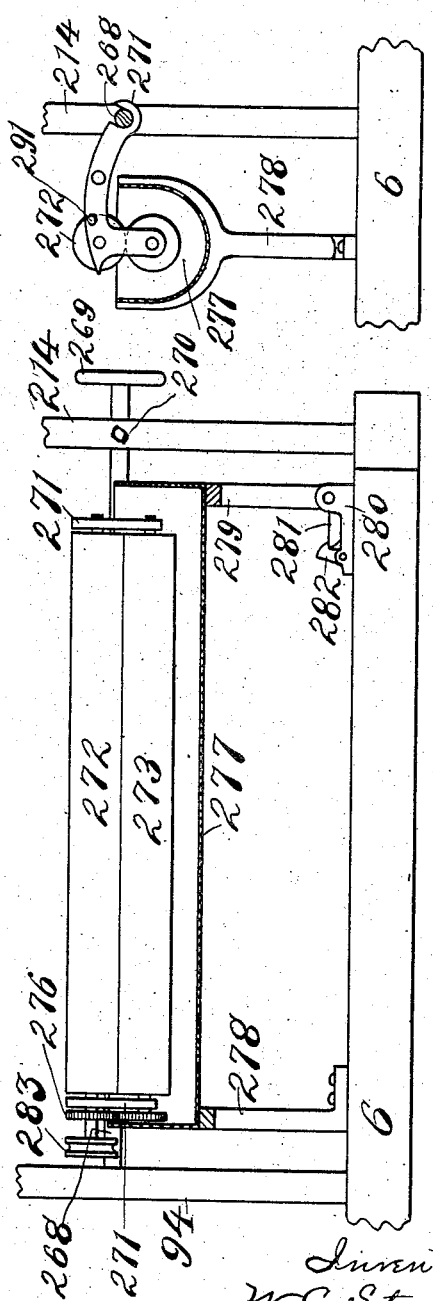

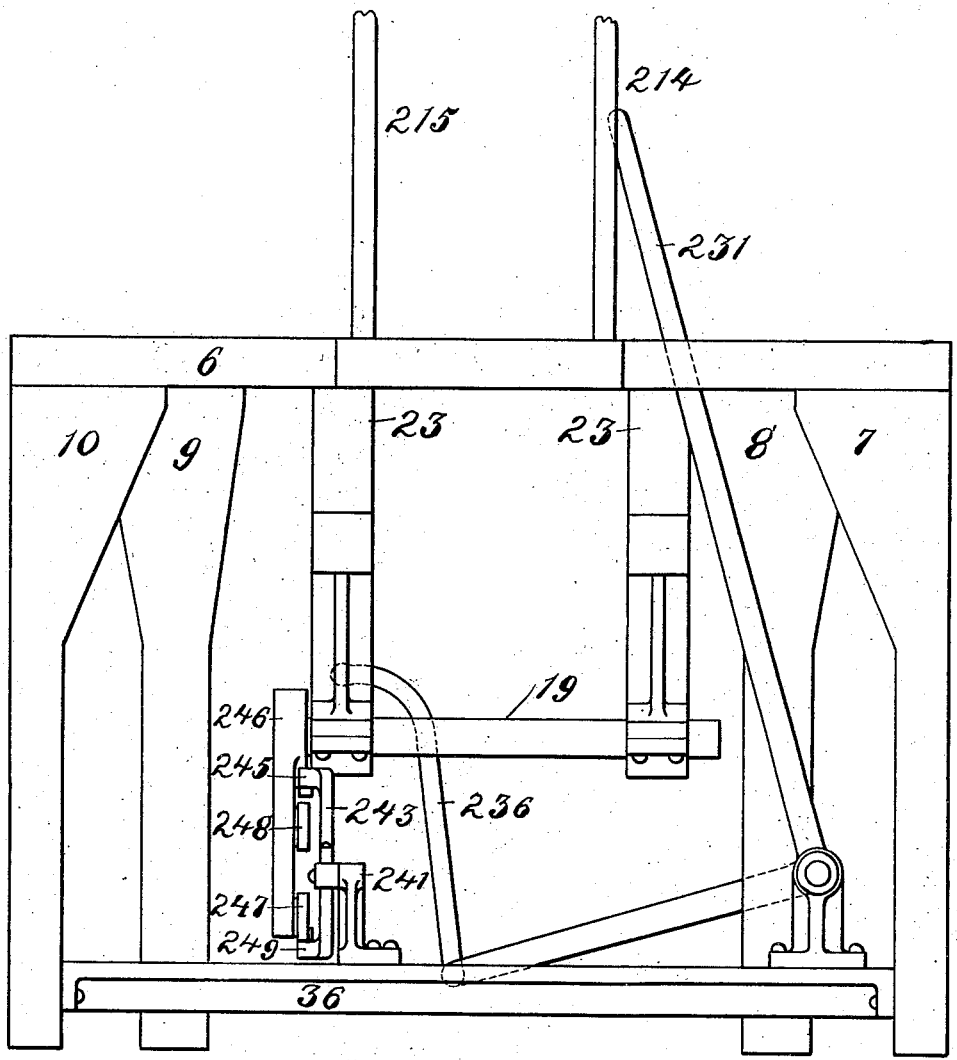

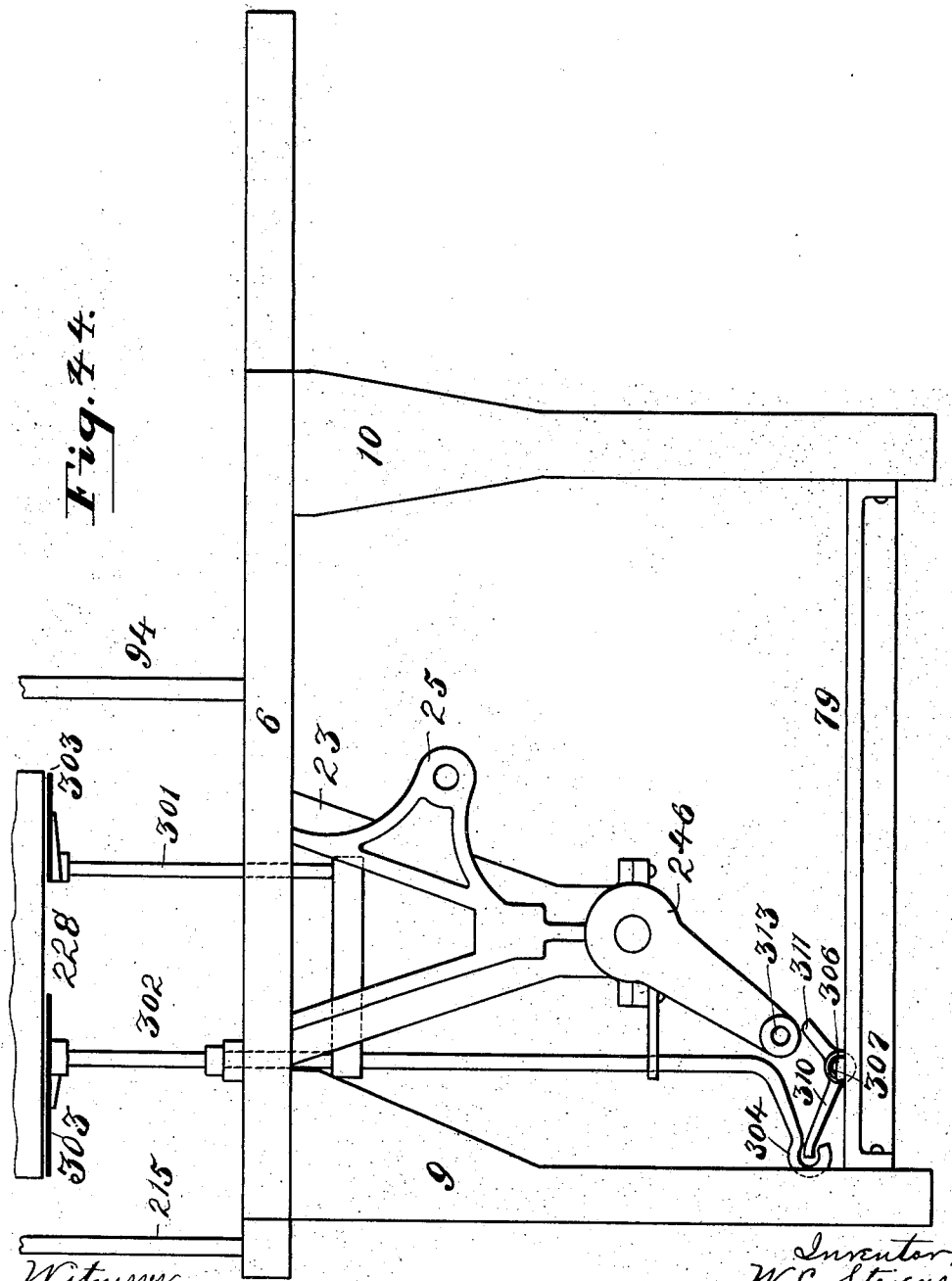

No. 836,902. PATENTED NOV. 27, 1906.
W. C. STEVENS.
LABEL PLACING MACHINE.
APPLICATION FILED JULY 10, 1905.
31 SHEETS—SHEET 27.
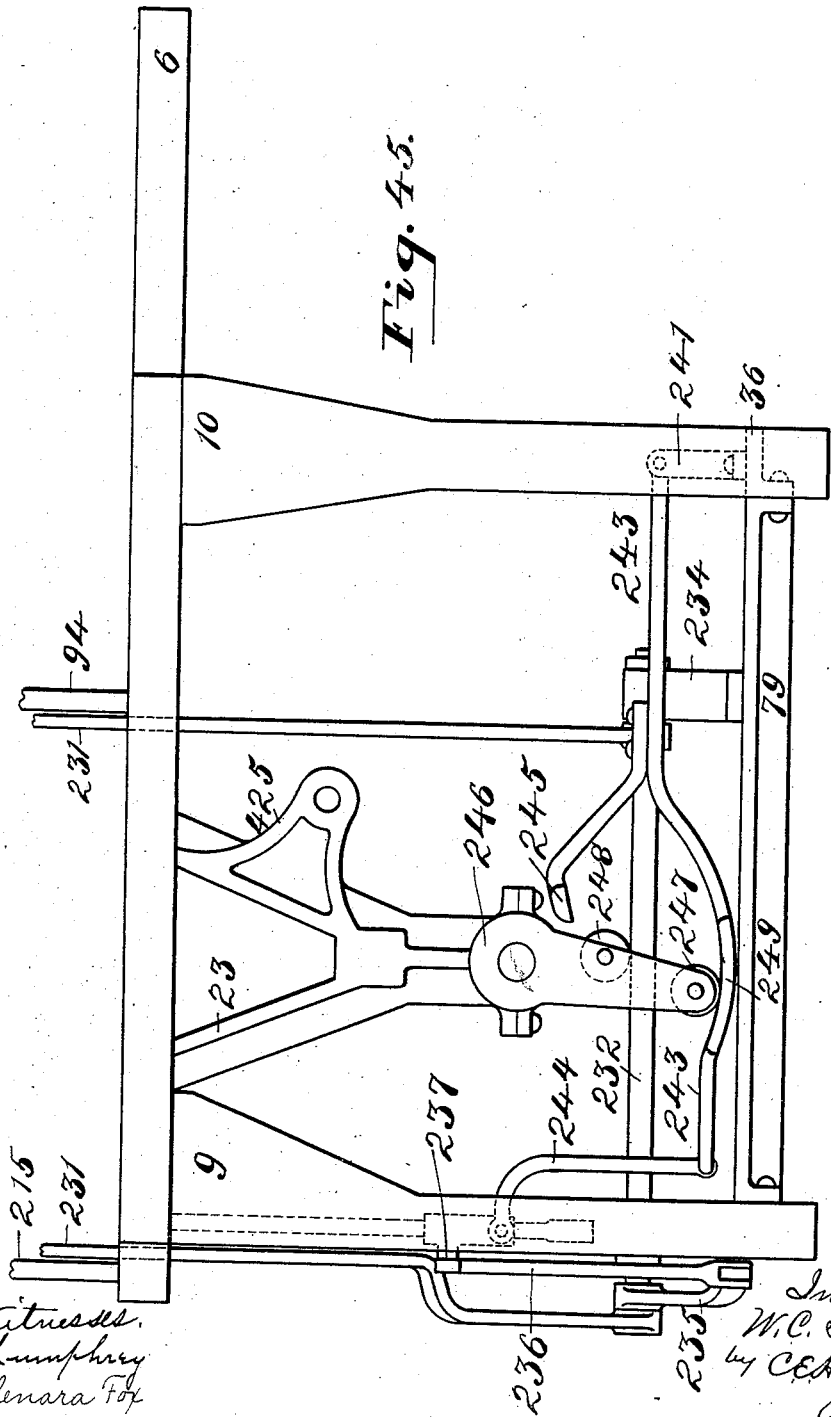

No. 836,902. PATENTED NOV. 27, 1906.
W. C. STEVENS.
LABEL PLACING MACHINE.
APPLICATION FILED JULY 10, 1905.

31 SHEETS—SHEET 30.

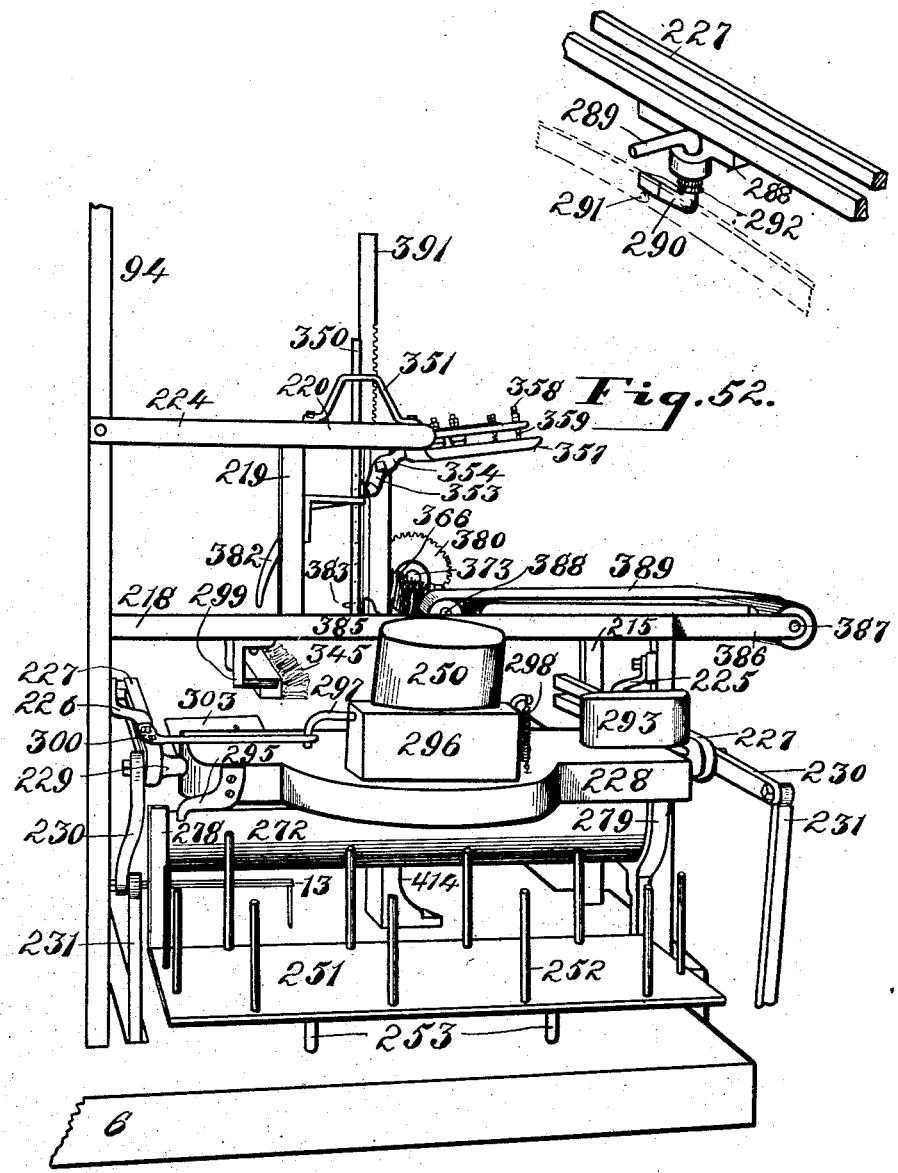

UNITED STATES PATENT OFFICE.

WILLIAM C. STEVENS, OF AKRON, OHIO, ASSIGNOR TO FRANK A. SEIBERLING AND LUCIUS C. MILES, OF AKRON, OHIO.

LABEL-PLACING MACHINE.

No. 836,902.   Specification of Letters Patent.   Patented Nov. 27, 1906.

Application filed July 10, 1905. Serial No. 269,063.

*To all whom it may concern:*

Be it known that I, WILLIAM C. STEVENS, a citizen of the United States, residing at Akron, in the county of Summit and State of Ohio, have invented new and useful Improvements in Label-Placing Machines, of which the following is a specification.

My invention has relation to machines for covering boxes or cartons with a sealing wrapper or wrappers generally bearing printed or pictorial embellishments thereon constituting labels indicative of the contents of the package, the manner of preparing or using the same, or other descriptive matter in relation thereto.

The object of this invention is to provide a machine for automatically covering successively a series of boxes or cartons with a label or labels, said machine containing in its construction wrapping and pasting mechanisms, a feeding mechanism for supplying the wrapping and pasting mechanisms capable of regulating the speed of the supply of the cartons to the wrapping and pasting mechanisms, said machine also containing means for temporarily rendering the pasting mechanisms inoperative upon a failure of the feed mechanism to supply the cartons in uninterrupted succession.

With the foregoing and other objects in view the invention consists of the novel construction, combination, and arrangement of parts constituting the invention, to be hereinafter referred to, and illustrated in the accompanying drawings, which form a part of this specification, in which is shown the preferred embodiment of the invention; but it is be understood that changes, variations, and modifications can be resorted to which come within the scope of the claims hereunto appended.

Figure 20:
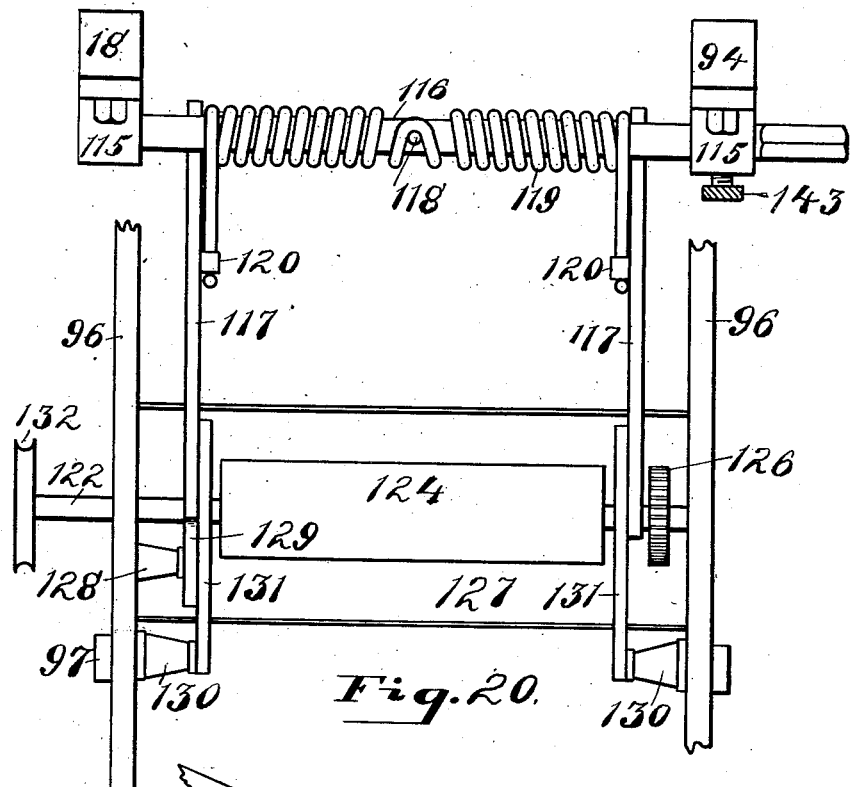
Figure 21:
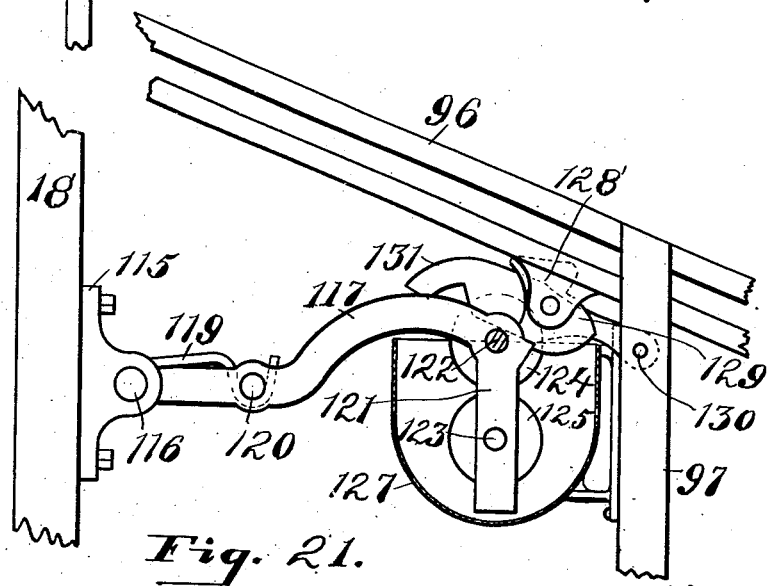
Figure 22:
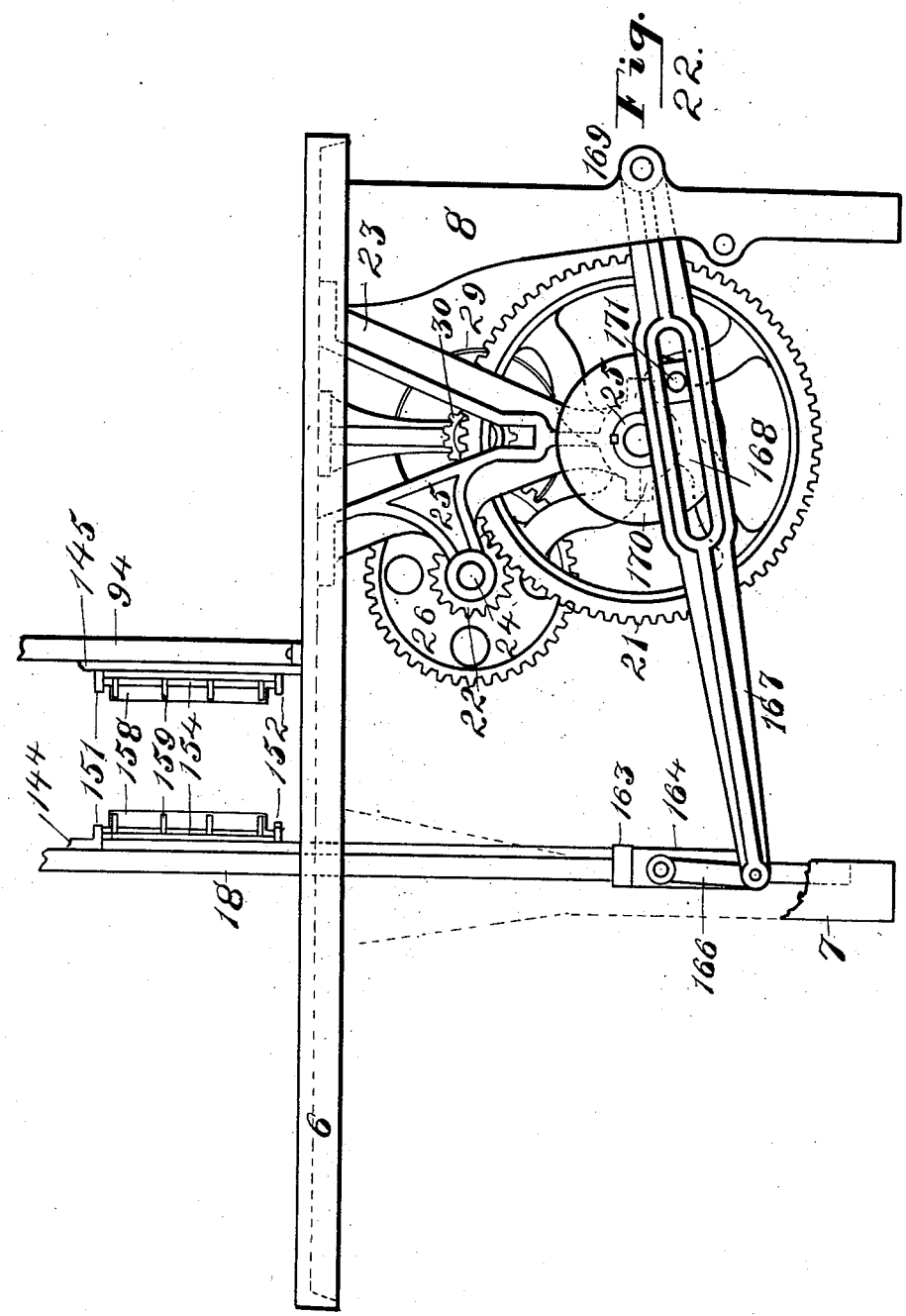
Figure 23:
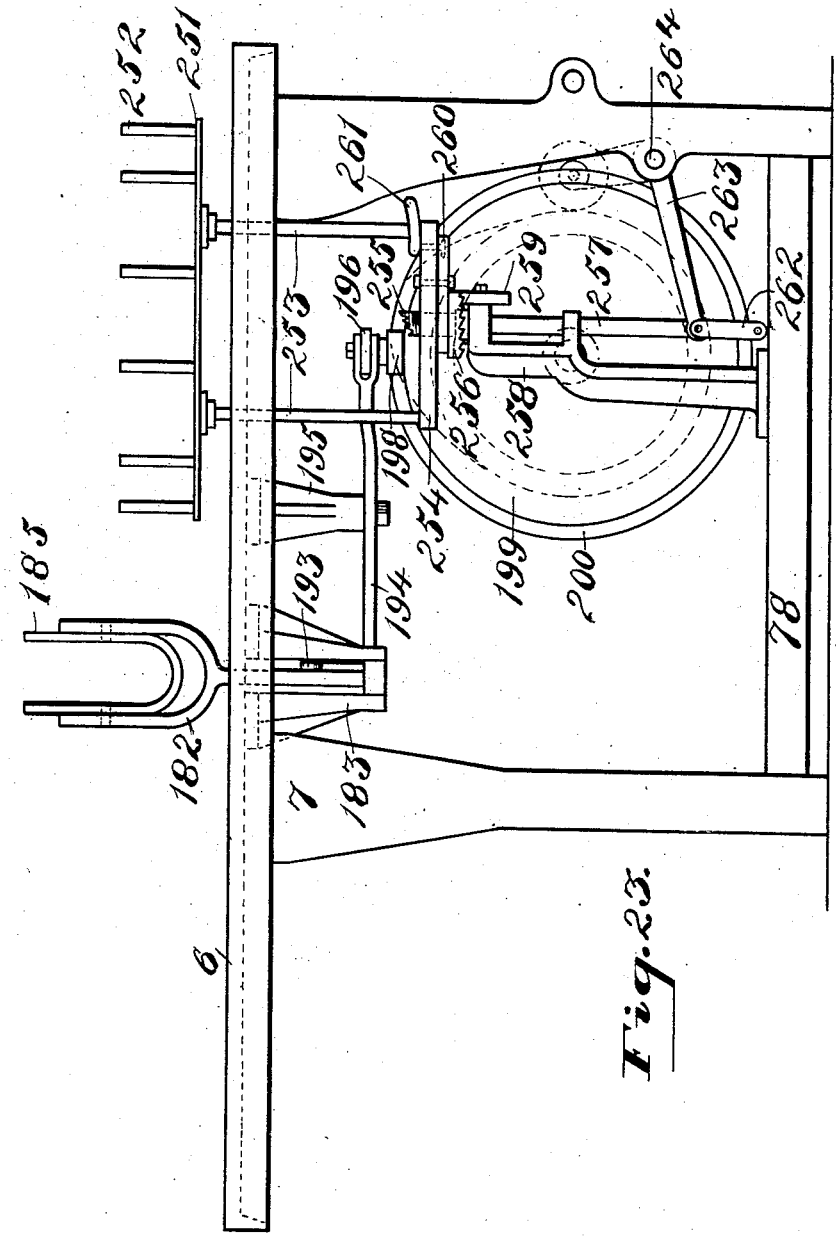
Figure 24:
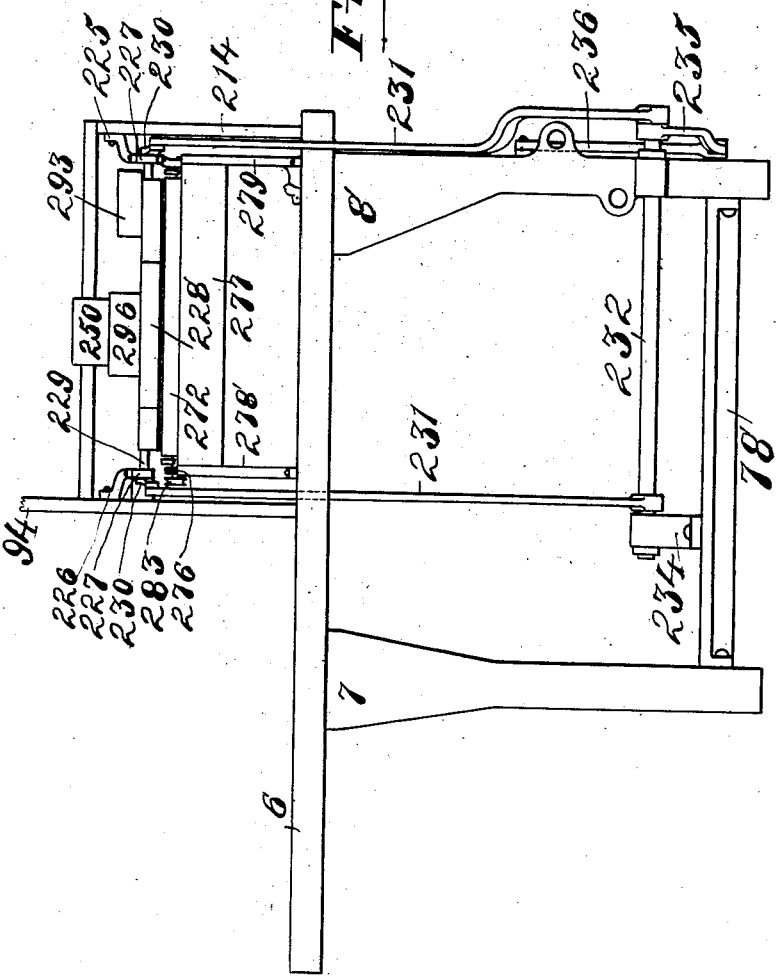
Figure 29:
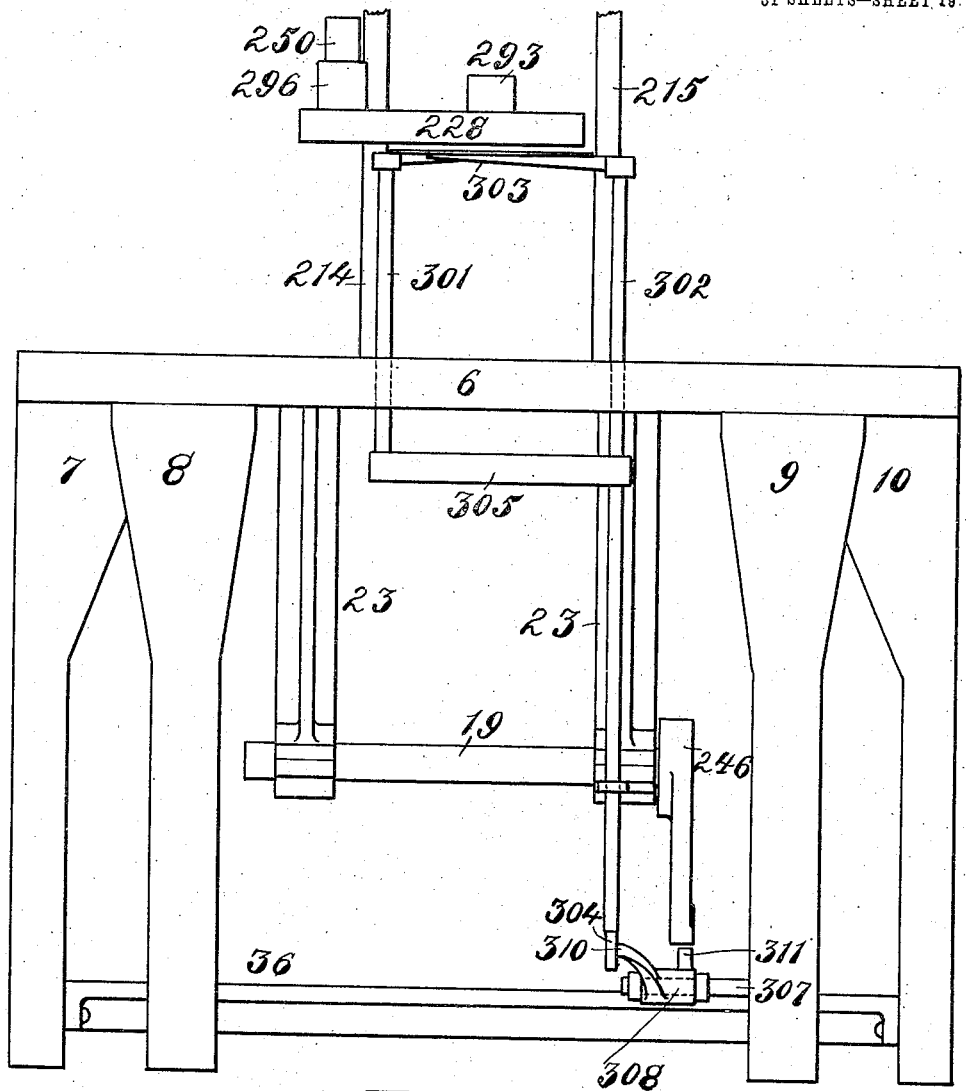
Figure 46:
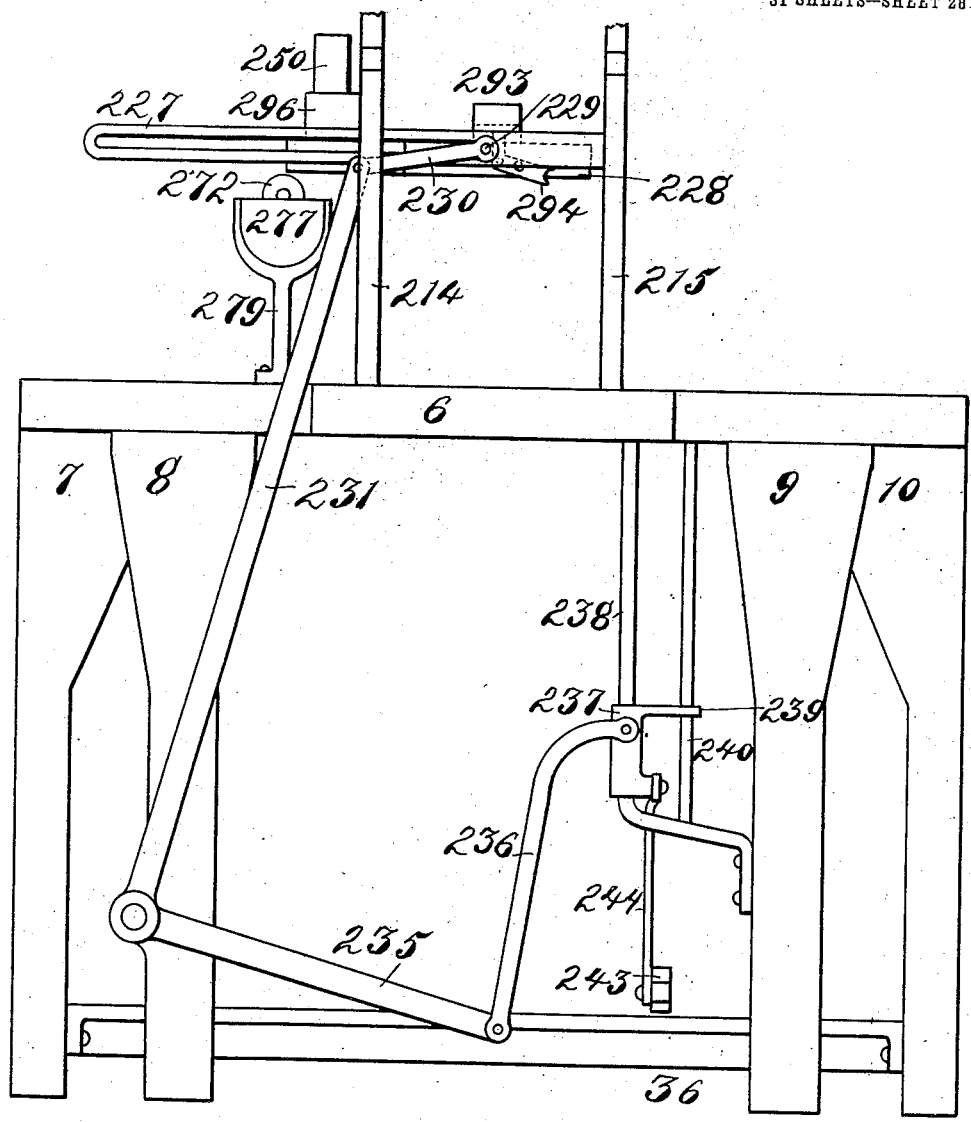
Figure 47:
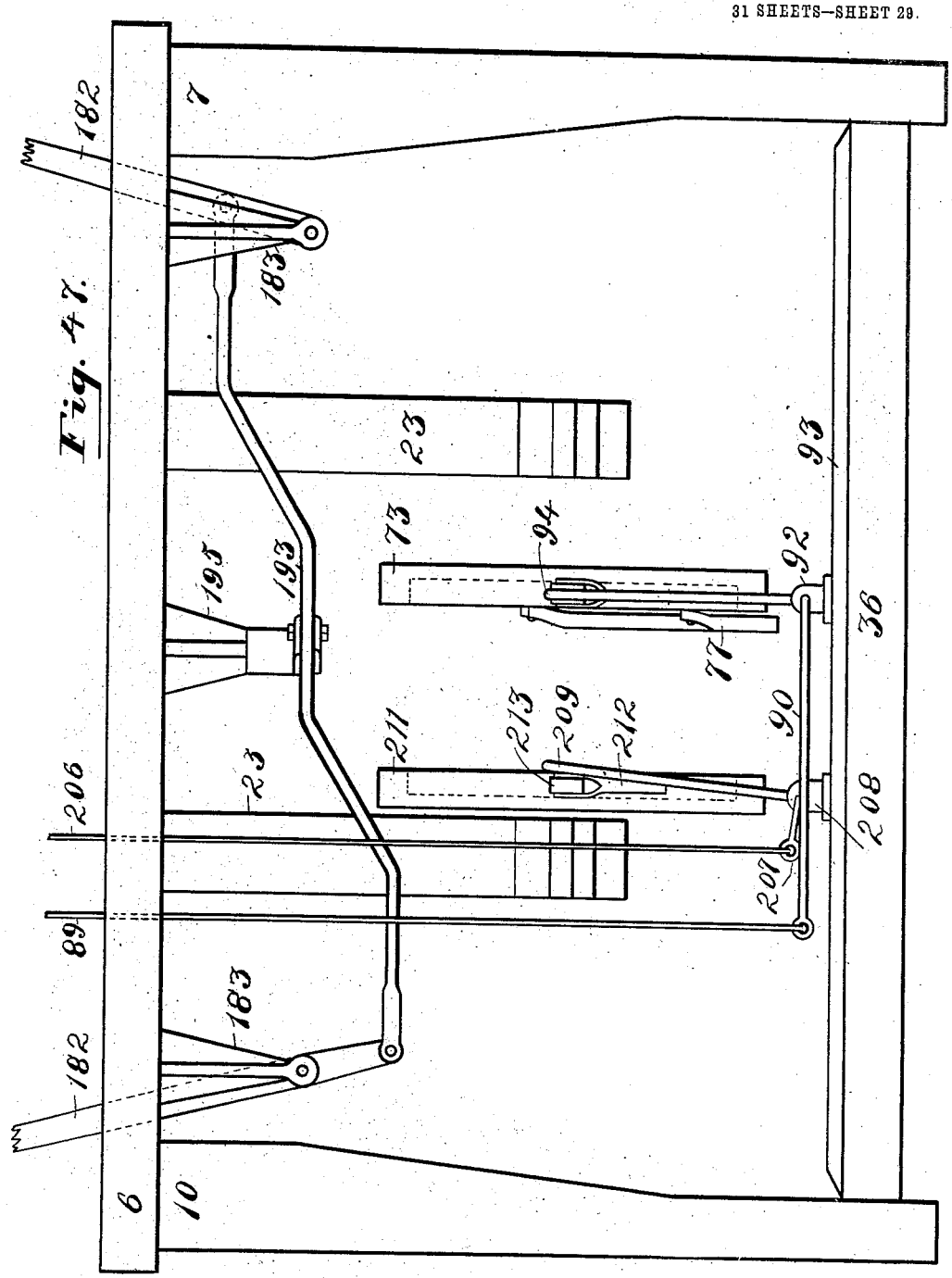
Figure 48:
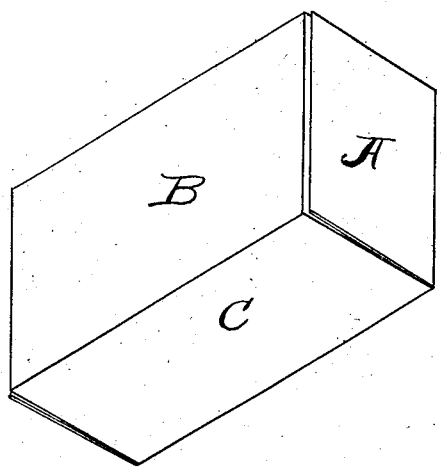
Figure 51:
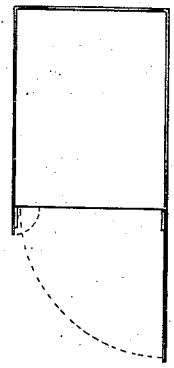
Figure 49:
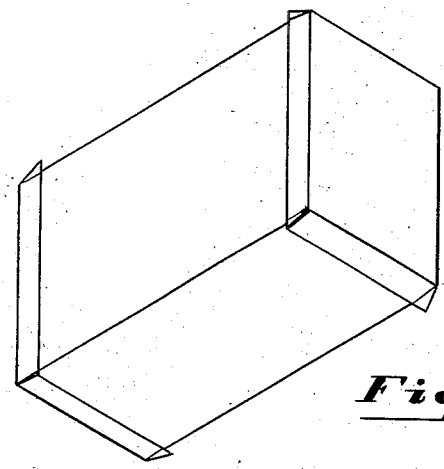
Figure 50:
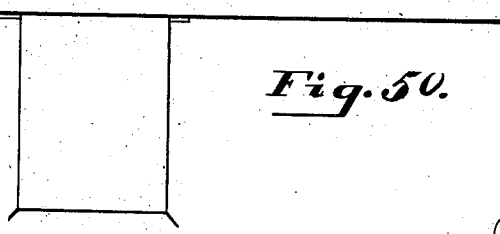

In the drawings, wherein like reference characters denote corresponding parts throughout the several views, Figure 1 is a side elevation of the entire mechanism of the machine above the bed on which the mechanism for feeding, wrapping, and pasting is located. Fig. 2 is a view from the opposite side of the machine. Fig. 3 is a view from the front side of the machine shown to the left in Fig. 1 with a portion of the machine omitted. Fig. 4 is a central section and detail of a part of the mechanism shown in Fig. 3. Fig. 5 is a view from the right of Fig. 1. Fig. 6 is a view of the right side of the machine, showing the mechanism below the bed. Fig. 7 is an opposite view to Fig. 6 and likewise showing the mechanism situated below the bed. Fig. 8 is a view from the rear of the machine below the bed. Fig. 9 is a longitudinal central section of the mechanism situated above the bed. Fig. 10 is a detail showing the mechanism for forwarding the cartons to the pasting mechanism, as well as mechanism for supplying the end labels to the delivery and wrapping mechanisms. Figs. 11, 12, and 13 are top, sectional, and side elevations, respectively, of one of the boxes for picking up the end labels. Fig. 14 is a longitudinal section along the main shaft of the machine with the mechanism mounted thereon, all situated below the bed. Fig. 15 is a side elevation and partial section of one of the cam-wheels used in operating the mechanism for raising the label-holding plates into position. Fig. 16 is a split spring-nut used in the mechanism connected with the label-holding-plate mechanism. Fig. 17 is a side view of one of the label-holding plates with part of its mechanism in section. Fig. 18 is a section at the line X of Fig. 19. Fig. 19 is a side elevation of the vertically-traveling carriage which holds the labels temporarily before they are placed in position on the ends of the cartons. Fig. 20 is a plan of one of the paste-containing pans used in coating the end labels with paste. Fig. 21 is a side elevation of Fig. 20 with the pan in section. Fig. 22 shows a mechanism for raising and lowering the mechanism shown in Figs. 18 and 19. Fig. 23 shows the mechanism for raising the label-holding plate containing the large or wrapping labels used on the cartons. Fig. 24 is an end view of the box for picking up the large or wrapping labels. Figs. 25, 26, and 27 are details of the mechanism for placing the large or wrapping labels upon the cartons. Fig. 28 is a detail showing the elevator for lifting the carton upward during the placing of the large or wrapping labels thereon. Fig. 29 is a detail of the mechanism for catching and retaining the large wrapping-label from the box by which it is picked up from the stack. Fig. 30 is a plan of the mechanism for placing the large or wrapping labels on the cartons. Fig. 31 is a side elevation from the right of Fig. 28. Figs. 32 and 33 are details of the mechanism used in placing the large or wrapping labels on the cartons. Figs. 34, 35, 36, 37, 38, and 39 are details of a ratchet-cam to brush the last end of the label on and release the carton. Figs. 40, 41, and 42 are details of the paste tank and rollers for coating the large or wrapping labels with paste. Fig. 43 is a detail of the mechanism for swinging the pick-up box used in carrying forward the large or wrapping labels to a position to be placed on the cartons. Fig. 44 is a side elevation of Fig. 29. Fig. 45 is a side elevation of Fig. 43. Fig. 46 is a side elevation of the mechanism shown in Figs. 43 and 45. Fig. 47 is a front view of the mechanism below the table, showing the means for operating the end-label-placing devices. Fig. 48 is a perspective view of a carton commonly used and adapted to be covered with labels by this machine. Fig. 49 shows the end labels placed in position on the carton shown in Fig. 48. Fig. 50 shows an end view of the carton and the point at which it encounters the large or wrapping label with which it is covered. Fig. 51 shows an end view of the carton and label covering three of the sides thereof with the ends of the label in position to be folded upon each other to cover the fourth side of the carton. Fig. 52 is a detail of the mechanism used to operate the large wrapper-pasting roll, and Fig. 53 is a perspective view of a portion of the mechanism of the wrapping-label-operating device.

In order to make the description and drawings more plain and more readily understood, the end of the machine which is at the left in Fig. 1 will be called the "front" of the machine and the opposite end the "back" or "rear," while the side toward the observer in Fig. 1 will be termed the "right" side and the side toward the observer in Fig. 2 the "left" side, and following these designations all shafts and similar parts which extend from the right to the left sides of the machine, and vice versa, will be designated by the word "transverse," and all parts extending from the front to the rear of the machine will be distinguished by the word "longitudinal."

The machine which is herein shown and described is adapted for placing labels on cartons of the shape shown in Fig. 48, consisting of ends A A, having major sides B and minor sides C. It will appear from the description, however, that by alternating the proportions and dimensions of the machine cartons of different shapes may be covered with labels of the requisite size. It is presumed in the use of this machine that the cartons come to the machine carried by mechanism, to be more fully described later, filled with some product, such as cereal or breakfast foods; but the contents of the package of course has no bearing upon this invention, and while the material of which the carton is constructed may be metal the most common and preferable material is pasteboard and analogous substances. The cartons are carried one by one to the machine upon a belt 1 from the place where they are filled, lying upon the belt on one of their major sides. This belt passes over a pulley 2, supported by brackets 3, attached to the sides 4 of an L-shaped hopper. The sides of the hopper are supported by feet 5 on a bed 6, which constitutes the main foundation for the machinery which operates directly upon the carton, and below this bed is auxiliary mechanism by which the mechanism above the bed is actuated. This bed 6 is supported on four legs 7, 8, 9, and 10. The cartons enter the upper portion of the hopper between the sides 4 and are guided in their descent between a front plate 11 and a rear plate 12. Upon entering the hopper and in leaving the belt where it passes over the pulley 2 the cartons are tipped one-quarter turn, so as to cause them to descend between the plates 11 and 12 and side plates 4 with one of their minor sides downward. If nothing were in the hopper to arrest their descent, they would fall with one of their minor sides downward upon two rails 13, (see Figs. 1, 2, 3, and 9,) on which they are adapted to slide, driven by mechansism to be hereinafter described, with one of their major sides forward to the end-label-attaching mechanism. In order to regulate the descent and allow only one carton at a time to reach the rails 13, I suspend between the side plates 4 by means of a pin 14 an escapement 15, consisting of a plate with inwardly-bent ends or legs adapted to pass through openings in the guide-plate 12 of such construction that, when swung in one direction it will encounter and arrest the descent of one carton a slight distance above the carton which is resting on the rails 13 and leave a space therebetween sufficient to allow the moving away of the carton which is then on the rails 13 freely without the interruption incident to the weight of a carton resting upon its upper surface. The carton suspended by the escapement 15 serves to stop and interrupt the progressive movement forward of other cartons following along on the belt 1, allowing the belt to slide under the succeeding cartons until the carton which is held by the escapement 15 is permitted to drop onto the rails 13 by mechanism to be hereinafter described. The escapement 15 is held in the position shown in Fig. 9, with its lower leg under the end of the approaching carton, by means of a spring 16, attached to the upper leg of the escapement above its pivot 14. The means whereby the lower leg of the escapement 15 is pulled away from under the suspended end of the carton, allowing it to fall upon the rails 13, will be described later. The carton indicated in Fig. 9 by the reference-letter D is next moved forward sidewise to the position of the carton indicated in the same figure by the letter E. During the transit of the cartons indicated by the reference-letter D to the position indicated by the reference-letter E the ends of the carton are kept closed, and it is guided and steadied in its progress by side plates 17, which extend from the side plates 4 of the hopper to two upright posts 18, vertically extending from the bed 6, the rails 13 therefor constituting the floor and the two side plates 17 constituting the sides of a trough through which the cartons are conveyed, lying on one of their minor sides with one of their major sides advanced. The mechanism by which the cartons are carried forward successively to a position occupied by the carton indicated by the reference-letter E, which is the position they occupy when the end labels are placed thereon, is a constantly-acting mechanism running at all times without reference to the fact that the machine is being supplied with cartons or not. It will be here stated that the balance of the mechanism, which consists of placing and pasting mechanism for the attaching of the labels to the boxes, is only operative during a constant supply of cartons thereto, the mechanism for controlling which will be later described.
Mechanism for advancing the cartons from the position indicated by the reference-letter D to the position indicated by the reference-letter E and from there on consists of the following mechanism: Below the bed 6 are two hangers 23, having openings therethrough in alinement with each other, and their central axial line is transverse to the main body of the machine. In the lower ends of these hangers 23 are journal-bearings, in which are mounted loosely revoluble sleeves 24 and 25. These sleeves 24 and 25 have enlarged disk-shaped heads with counterbored internal openings, the object and purpose of which will be described later. Within the sleeves 24 and 25 is a shaft 19, loosely rotatable therein and bearing in its medial portion a sleeve 20, loose thereon. Mounted on the sleeve 20 and adapted to move therewith is a large spur-gear 21. This spur-gear is ordinarily keyed to the sleeve 20; but any other manner of attaching it thereto is entirely within the scope of this invention. The revolution of the gear-wheel 21 is accomplished by means of a pinion-gear 22, meshing into the threads of the gear 21. (See Figs. 7, 8, 14, and 22.) The pinion-gear 22 is mounted tightly on a shaft 424, mounted rotatably in integral brackets 425, (see Fig. 22,) extending from the hangers 23. On the shaft 424 is tightly mounted a spur-gear 26, and power is communicated thereto by the following mechanism, (see Figs. 7, 8, and 22:) Attached to the under left side of the bed 6 are two bracket-hangers 27, having in their lower ends journal-bearings, in which is mounted a shaft 28. This shaft 28 bears tight and loose pulleys 29, over which is passed a belt from any convenient source of power to convey power to the shaft 28. Also mounted on the shaft 28 is a pinion-gear 30, which meshes into the gear 26 on the shaft 424. Thus it will be seen that power is communicated by a belt to the pulleys 29 and from thence by the pinion 30 to the gear 26 and shaft 424 and from the pinion 22 to the spur-gear 21 on the tight sleeve 20 of the shaft 19. Referring now to Figs. 10 and 14, there is mounted on the sleeve 20 an eccentric 31, movable in unison with the sleeve 20 and bearing an ordinary eccentric-strap 32, to which is attached an eccentric-rod 33, the outer end of which is pivotally connected to a rocking arm 34. The lower end of the rocking arm 34 is pivoted in a curved bracket 35, attached by any suitable means to a bar 36, extending between the legs 7 and 10, supporting the bed 6. The upper end of the rocking arm 34 is free to oscillate backward and forward in unison with the motion imparted to the rod 33 by the eccentric 31. The mechanism which is used to convey the cartons from the position marked D to the position marked E in Fig. 9 is reciprocated backward and forward by the free upper end of the arm 34 and is best shown in Figs. 1, 2, 3, 9, and 10. Referring particularly to Fig. 3, there are fastened on the bed 6, longitudinally thereof, two parallel bars 37, having cut in their oppositely-disposed inner faces ways in which slide two side frames 38 of a reciprocatory carriage.
These side frames 38 are provided with three pairs of upwardly-extending posts, the members of each pair being oppositely disposed with respect to one another and each of these posts being perforated near the top to receive pins which are pivots for the mechanism for grasping and forwarding the cartons along the upper surface of the rails 13. Referring to Fig. 10, there is pivoted between the left pair of these upright posts a rocking arm 39, having on its outer swinging end a plate or leaf 40, so arranged and placed that when swung upwardly on the pivot of the arm 39 it will encounter the front major side of the cartons. (Indicated by dotted lines in Fig. 10.) The opposite end of the arm 39 is downwardly curved in the arc of a circle, and its end is pivotally connected to a longitudinal horizontal connecting-rod 41. Between the right-hand posts of the side frames 38 is pivoted a rocking arm 42, provided with a plate 43 of exactly the same shape and having the same function as the plate 40 on the rocking arm 39. The opposite end of the rocking arm 42 from that holding the plate 43 is pivotally connected with the opposite end of the connecting-rod 41 to that attached to the arm 39. This arrangement is such that the swinging upward and downward of the plate-bearing ends of the rocking arms 39 and 42 will be simultaneous and in unison. Between the middle posts of the side frames 38 is pivoted a rocking arm 44, oppositely disposed to the rocking arm 39 and provided on its outer free end with a plate 45. This rocking-arm 44 is caused to operate simultaneously, but in an opposite direction to the arm 39, by the following mechanism: An L-shaped lever 46 is used to connect the free end of the arm 44 with a point on the arm 39 immediately in the rear of the plate 40, and these connections will be pivotal connections, so as to enable the free swinging of the arms 44 and 39. On the pivot of the L-shaped arm 46 where it is attached to the arm 39 there is attached a link 47, and this link is pivotally united with the upper free end of the oscillating lever 34. The operation of this carton-advancing mechanism just described is as follows, particular reference being had to Fig. 10 in this explanation: As the lever 34 is moved to the right by the influence of the eccentric 31 the force exerted by the link 47 on its pivotal connection with the arm 39 will cause the same to swing on its pivot, which is the pin extending between the two left posts of the side plates 38. The swinging upward of the arm 39 will cause the plate 40 to engage the front major side of the carton resting on the rails 13, where it has been deposited after its passage through the feed-hopper. The swinging upward of the arm 39 on its pivot will also cause a similar motion of the rocking arm 42, and the plate 43 on the arm 42 will engage the front side of the carton marked E in Fig. 9. At the same time the swinging of the arm 39 will cause the L-shaped arm 46 to swing the rocking arm 44 in a reverse direction and cause its plate 45 to grasp the opposite side of the carton occupying the position indicated by the reference-letter D in Fig. 9. These movements of the rocking-arms 39, 42, and 44 will take place substantially instantaneously with the commencement of the movement of the oscillating lever 34. As soon as the rocking arms just described have assumed the position shown in Fig. 9, causing them to grasp the cartons on the rails 13, the entire carriage will slide to the right in Figs. 9 and 10, carrying the carton E past the ends of the rails 13 onto an elevator (to be later described) and bring the carton indicated by the reference-letter D to the position occupied by the carton marked E in Fig. 9. The eccentric 31 is of such a size and is so placed that its stroke to the right in Fig. 10 will have been entirely over by the time the carton D has reached the position of the carton E, and as the eccentric 31 continues its motion the oscillating lever 34 will start on its return movement to the left in Fig. 10, which causes the reversal of the movement of the rocking arms 39, 42, and 44, which causes the plates 40, 43, and 45 to assume the position shown in Fig. 10, where they are shown as lying flat and slightly below the upper surfaces of the rails 13. This movement of the rocking arms having ceased and the movement of the reciprocatory carriage continuing, the carriage consisting of the united side plates 38 will be slid to the left in Fig. 10 until it has reached the position indicated in Fig. 10, with the plates 40, 43, and 45 in horizontal position ready to be raised at the next oscillation of the lever 34 and ready for the next carton, which is delivered upon the rails 13 in exactly the same manner as has been described heretofore. As has been described, this movement of the carriage in the ways cut in the bars 37 is constant, and the eccentric 31, driven as before described, will operate as long as power is communicated to the machine without reference as to whether or not the cartons are fed onto the rails 13.

Referring to Fig. 9, it has been described how the cartons being carried forward to the hopper on belt 1 are arrested in their descent by the lower leg of the escapement 15 and are thereby sustained until the carton which occupies the position indicated by the reference-letter D in this figure has been moved forward sufficiently to allow a clear space on the rails 13 for the descent thereof of the next succeeding carton. It is intended that as soon as the carton indicated by the reference character D in Fig. 9 has been moved forward out of the way the next succeeding carton will fall by gravity between the side plates 4 of the hopper and rest upon the rails 13 in such a position as to be grasped by the plates 40 and 45 and be from thence carried toward the rear of the machine, as has been already described.

The mechanism for withdrawing the lower leg of the escapement 15 from engagement with the suspended carton is as follows and is best illustrated in Figs. 1, 2, and 9 and consists of a rotatable post 48, pivoted in ears 49, projecting from a plate attached to the right plate 17. From the upper end of this post 48 is a projecting oscillating arm 50, connected by a wire 51 or other suitable device with the lower portion of the escapement 15. Attached to the left and medial posts on the right side of the frame 38 of the reciprocatory carriage is a plate 52, on which is mounted a projecting horizontal tappet-bar 53. On the lower portion of the post 48 is a projecting arm 54 in such a position as to encounter the projecting tappet-bar 53, carried by the carriage. The operation of this device is as follows: As the carriage bearing the carton indicated by the reference-letter D in Fig. 9 moves forward the tappet-bar 53 will encounter the lower arm 54 on the shaft 48 and partially rotate it, which causes a simultaneous motion of the arm 50, projecting from the upper portion of the post 48, and by means of the wire 51 withdraws the lower portion of the leg of the escapement 15 from operative connection with the suspended carton, allowing it to fall upon the rails 13 and also forcing the upper leg of the escapement through the plate 12 into a position to encounter and arrest the progressive movement of the succeeding carton. This tappet-bar 53 is of such a length as to prevent the lower arm 54 on the post 48 from being disengaged therefrom, and while the carton-conveying carriage is on its return movement the arm 54 is freed from operative engagement with the tappet-bar 53, permitting the return of the escapement 15 to the position shown in Fig. 9, due to the influence of the coiled spring 16, thereby releasing the carton which is held by the upper leg of the escapement 15 and permitting it to fall and be arrested by the lower leg of the escapement 15 and remain situated in this position, as shown in Fig. 9.

It will be obvious of course that the carton released by the lower leg of the escapement 15 when it falls rests upon the rails 13 between the side plates 4 of the hopper, and as the plates 40, 43, and 45 return to their initial position in a horizontal line after advancing the cartons toward the rear of the machine their upper surfaces are below the plane of the rails 13. They will pass under the carton then reposing on the front ends of the rails 13 and be exactly in the position shown in Fig. 10, and at the next movement of the oscillating lever 34 the plates 40, 43, and 45 will operatively engage the new carton, as well as the carton marked D, which has previously been moved to the position occupied by the carton marked E in Fig. 9 and move them in identically the same manner as has been already described. Of course this progressive movement of each succeeding carton will be kept up as long as the supply of cartons is conveyed forward on the belt 1 into the hopper without respect to the fact that the balance of the machine is operating or not.

The description this far shows the manner by which the cartons are moved forward to the position shown in Fig. 9 and indicated by the reference-letter E. At this point the carton is arrested in its progressive movement, and the labels which cover its ends are placed thereon, the mechanism for doing which is best shown in Figs. 1, 2, 3, 4, 5, 6, 7, 9, 10, 11, 12, 13, 18, 19, 20, 21, 22, 23, and 47. In order to assist in the explanation of the mechanism by which the end labels are placed on the cartons while they occupy a position on the rails 13 (indicated by the reference-letter E in Fig. 9) and to simplify the description, it will be stated that identical mechanisms are used on both sides of the rails 13. Each of these mechanisms is arranged and designed to place an end label on its respective end of the carton, the operations, movements, and parts of which are similar and their motions simultaneous, and it is believed that a description of the mechanism on one side only will be sufficient for this reason. At equal distances from the longitudinal center of the bed 6 and transversely in alinement with each other and with the center of the carton marked E are two end-label-bearing tables 55. (Reference is here directed to Fig. 3.) These tables consist of a flat plate having around their outer edges upwardly-extending pins 56, preferably covered with rubber tubing, and are spaced apart as to just nicely touch the four edges of the labels and yet afford sufficient contact therewith as to steady the stack of labels and retain them perfectly in position, so that the contact of the rubber covers on the pins 56 will afford sufficient frictional resistance to the lifting of the labels that only the upper label of each stack will be taken at each movement of the machine. These tables 55 are adapted to be raised to meet pneumatic pick-up devices (which will be later described) at the proper interval and to lower and recede from the pick-up device during the balance of the time. It is intended that the movement of the tables 55 upward and back will be a quick stroke, sufficient only to enable the lifting from the stack of labels the upper label thereof. Each plate 55 is provided on its under side with two bosses from which extend downwardly vertical shafts 57. These shafts are steadied above the bed 6 by passing through the cross-arms of an upright bracket 58. These shafts extend downwardly and are connected at the lower end by a yoke 59. As has been before stated, the table 55 is adapted to reciprocate vertically, and at each upward stroke thereof a label is taken from the stack placed thereon, and as the upward movement of the plate 55 must necessarily be caused by definitely-acting mechanism it is obvious that as the supply of labels on the table 55 becomes diminished the distance between the top label and the pick-up mechanism will increase to such an extent as to render ineffective the pick-up mechanism in taking away the upper label on account of the fact that the pick-up mechanism is operated by a pneumatic exhaust device whose influence can extend only a limited distance from its operative face. Therefore some mechanism for increasing the height of each table 55 above the bed 6 and the consequent maintenance of a constant distance between the top label and the pick-up mechanism must be incorporated into this device to make it effective. In doing this the following mechanism is utilized, reference now being had to Figs. 10, 16, and 17. Attached to the rear of the legs 7 and 10 are brackets 60, having outwardly-projecting arms or members through which are perforations vertically in alinement with one another, and through both of which is a longitudinal slidable shaft 61, the movements of which are caused by mechanism to be later described. The upper end of each shaft 61 is provided with an enlarged cylindrical head 62, (see Fig. 17,) and over the top of this head 62 is placed the enlarged head 63 of a vertically-threaded shaft 64, the axial line of which is the same as the shaft 61. The head 63 on the lower end of the shaft 64 is counterbored to receive the head 62, and around the edges of his counterbore are cut extremely fine ratchet-teeth, for a purpose to be later described. The upper portions of the shaft 64 pass freely through the central perforation of the yoke 59, and this opening is of such a diameter as to be free from contact with the threads on the shaft 64. In order to steady the shaft 64 on the head 62, I customarily extend a pin 65 upward through the shaft 64, which is made hollow for that purpose. Below the yoke 59 and attached thereto is a split spring-nut 66, having a threaded opening therethrough, the threads of which are adapted to mesh on the threads of the shaft 64. This nut is made in two halves and may be pivoted together by a pin 67, as shown in Figs. 16 and 17, which also serves to retain the spring-nut itself in operative relation with the yoke 59, or the pivot of the spring-nut may be as shown in Fig. 10, where one of the upright shafts 57 will serve the same purpose, the only difference between the arrangement shown in Fig. 10 and the arrangement shown in Figs. 16 and 17 being the location of the pivot of the two halves of the spring-nut. A hand-lever 68 is provided on the upper side of the yoke 59, and it has a downwardly-extending shaft, (see Fig. 17 in dotted lines,) with a pair of lateral blades 71 of such a width that when the hand-lever 68 is rotated in one direction these blades will force apart the outer ends of the handles of the split nut 66 and cause a consequent clamping of the threaded portions of the nut upon the shaft 64, and a reversal of this movement will permit the separation of the ends of the spring-nut, which contain the threads, to free the threaded sides from engagement with the threads on the shaft 64. It is preferred that a spring be placed to operate between the halves of the spring-nut to throw them automatically apart upon a release of the pressure caused by the hand-lever 68. This spring and its position is indicated by the reference-numeral 69 in Fig. 16, where the spring is indicated in dotted lines, showing that the spring is embedded in the metal of the spring-nut. On the upper member of the bracket 60 is pivotally suspended a pawl 70, having a sharp working edge to engage the ratchet-teeth on the head 63 and having an overbalanced end to normally keep the sharp end in operative relation with the ratchet-teeth. As the shaft 61 is reciprocated vertically the pawl 70 will engage the ratchet-teeth on the head 63, and thereby cause a fractional portion of a revolution of the head 63 and shaft 64. This revolving of the shaft 64 will cause the meshing of the threads thereof with the threads in the opening in the spring-nut 66 at the bottom of each downward stroke of the reciprocatory shaft 61, and thereby gradually elevate yoke 59, shafts 57, and plate 55, bearing the stack of end labels, the fractional part of the revolution imparted to the shaft 64 being very slight and the threads thereof being of such a low pitch that the distance the plate 55 is raised at each stroke will be substantially equivalent to the thickness of one of the labels and compensate for the taking away of the upper label, thereby causing the raising of the next succeeding label to approximately the same altitude above the bed 6.

It now having been shown how the end labels are raised to meet the pick-up mechanism and how the successive loss of the upper label is compensated for, a description of the mechanism which reciprocates the shaft 61 now follows, reference being especially had to Figs. 8, 10, 14, 15, and 47. On the sleeve 20, which is loose on and revolves on the main shaft 19, is an integral disk-shaped head 72, which is in constant revolution at all times on the shaft 19. The sleeve 25 on the shaft 19 is provided with an enlarged head 73, counterbored to receive the disk-shaped head 72 of the sleeve 20. The sleeve 25 and its head 73 are not revoluble in unison with the head 72 unless communication is established between the two.

The means for communicating power and motion from the sleeve 20 to the stationary sleeve 25 is as follows: Referring now particularly to Figs. 15 and 47, there exists in the head 73 an opening in which is placed a dog 74, the pivot for which is a pin extending across the sides of the opening existing in the head 73. One end of this dog 74 is provided with an inturned pin-shaped end, which is arranged to bear upon the outer surface of the head 72 and to enter an opening 75, cut therein for this purpose. This pin-shaped head of the dog 74 is caused to bear against the head 72 by means of a spring 76, which constantly presses outward the opposite end of the dog, so that unless forced inward toward the shaft 19 the dog will constantly engage the opening 75, and the head 73 will revolve in unison with the head 72, thereby revolving the sleeve 25, of which the head 73 is an integral part.

The mechanism by which motion is communicated from the head 73 to the vertically-reciprocating shaft 61 is as follows, particular reference being had to Figs. 6, 7, 8, 14, and 15: Attached either to the outer face of the head 73, as shown in Fig. 8, or to its inner side, as shown in Fig. 15, is a cam 77. This cam 77 is adapted to revolve each time the head 73 revolves, and of course it is only operative when the dog 74 is in engagement with the opening 75 of the head 72. Extending between the legs 7 and 8, supporting the bed, is a bar 78, and between the legs 9 and 10 is a similar bar 79, parallel with the bar 78. Mounted on these bars, in transverse alinement with each other, are journal-bearings 80, extending between which and slightly projecting therefrom is a transverse shaft 81. On this shaft 81 (see Figs. 8 and 10) is an arm 82, bearing in its outer ends a roller 83, which is so placed as to encounter and ride over the cam 77 and cause the depression of the arm 82 as the roller 83 follows the convolutions of the cam. The arm 82 is tight on the shaft 81, and the rocking of the arm 82 consequently rocks the shaft 81. To the outer ends of the shaft 81 are keyed oscillating arms 84, which move in unison with the partial rotation of the shaft 81. The outer ends of these arms 84 are connected pivotally by links 114 to the lower ends of the shafts 61. It will be thus seen that as the roller 83 rides over the cam 77 the oscillating arms 84 will be operated and the upright shafts 61 reciprocated in their bearings in the brackets 60, the object and purpose of which has been heretofore described. As has been before described the mechanism for supplying the labels (both end and wrapper) to the machine and their pasting and delivery is only necessary when cartons are fed along the rails 13 to the position indicated by the reference-letter E in Fig. 9.

In order to prevent operation of the mechanism for raising the end labels just described when no cartons are fed to the machine, the following means is employed. (Reference is now directed to Figs. 1, 2, and 10.) On either side of the rails 13 is a pair of posts 85, extending between which is a shaft 86. This shaft 86 extends across and above the pathway which the cartons take in their transit along the rails 13, and from the central portion of this shaft is a downwardly-inclined curved tappet-arm 87, which is of such a shape and configuration as to be swung upward on its pivotal shaft a slight distance by the passage thereunder of a carton. The rock-shaft 86 also bears on its outer left end a rocking bar 88, from the outer free end of which depends a vertically-placed rod 89, to the lower end of which is hinged a rocking lever 90. This lever 90 is attached to or is integral with a longitudinal rotatable bar 91, pivoted in a journal 92, supported on a cross-bar 93, extending between the bars 78 and 79. The rear end of this longitudinal rotatable bar 91 is abruptly turned upwardly and terminates in a hook 94, (see Figs. 15 and 47,) resembling in configuration the ordinary button-hook. The outer free end of the dog 74 in the head 73 is provided with an ordinary friction-roller, (not referred to by reference-numeral,) and the upright portion of the bar 91 and its hook 94 are so placed that when the dog, with its extended friction-roller, revolves with the head 73 the friction-roller encounters the upright portion of the bar 91 and is pressed inwardly toward the shaft 19 to such an extent as to withdraw the pin-like lower end of the dog 74 from engagement with the opening 75 in the head 72, which causes a cessation of the movement of the head 73. If, however, the machine is running at ordinary speed, the tendency might be to cause the head 73 to overrun, and in order to prevent this the operative engagement of the bar 91 and its hook 94 with the free end of the dog is such that the hook will engage and grasp the friction-roller on the dog and prevent any further revolution of the head 73, thus locating definitely its stopping-point. During the passage of cartons over the rails 13 they encounter the lever 87 and raise it, which also raises the rocking arm 88 and rod 89 and, by means of the rocking arm 90, rotate the arm 91 to the right in Fig. 47 sufficiently to discontinue the engagement between the hook 94 and the friction-roller of the dog 74, permitting the dog 74 to engage the opening 75 in the head 72 and allowing the revolution of the head 73 in unison with the head 72 and the consequent operation of the label-raising mechanism which has hereinbefore been described. From this it will be seen that as long as a continuous succession of cartons are passing over the rails 13 they will pass under the tappet-arm 87 at exactly the right interval to throw the hook 94 to one side and prevent its engagement with the dog 74, which insures the constant operation of the label-raising mechanism and other mechanisms to be later described. It will also be noticed that if the cartons do not pass over the rails 13 the arm 87 will not be raised. Consequently the label-raising mechanism will be inoperative.

The mechanism by which the labels are lifted one by one from the stack or supply placed upon the vertically-reciprocating tables 55 will now be described, and reference is especially directed to the following figures as best illustrating the mechanism, Figs. 1, 2, 3, 5, 9, 11, 12, 18, 19, 20, 21, 22, and 23. As has already been described, there are placed on either side of the rails 13 two upwardly-extending posts 18 and back of these similar posts 94, constituting the corners of a horizontal square approximately. The position of these posts is clearly indicated in Figs. 1, 2, 3, and 9. One pair of posts 18 and 19 are placed on the right side of the position occupied by the carton E, and a similar pair are placed on the left side of this same carton E. The lower ends of these posts 94 are secured firmly in any manner to the upper face of the bed 6, and the posts 18 extend downward through the bed 6 and are supported in a manner to be later described, and both sets of posts have their upper ends secured to one another by any number of crossbraces which the case may require and which are indicated by the brace 95. (Shown in Figs. 1, 2, and 9.) It will be stated here that each pair of posts 18 and 94 constitute the supporting means for the mechanism which picks up the end labels from the label-carrying tables 55 and also supports the pasting mechanism by which an adhesive paste is coated over the surface of the labels and also supports the mechanism which grasps the labels from the pick-up mechanism and conveys them in proper position to be placed on the ends of the cartons which rest on the rails 13. It will be further stated that the mechanism attached and supported by each pair of posts 18 and 94 on both sides of the machine are identical in construction and operation, and it is thought that a description of the mechanism existing on one side and attached to one pair of posts 18 and 94 will be sufficient for a complete understanding thereof. Attached by any suitable means to the sides of both posts 18 and 94 are a pair of slotted brackets 96. The slots in these brackets extend a portion of their length in a vertical line and substantially parallel with the posts 18 and 94 and from thence extend outwardly to the right in Fig. 3 at an angle of about twenty-five degrees, more or less, to a point approximately over the label-holding tables 55 and from thence horizontally a short distance. The brackets 96 and their slots are in exact alinement with one another horizontally, and these slots constitute ways for the movement therein of the pick-up mechanism to be later described. The extended portions of these brackets 96 are preferably supported by upright posts 97, which extend from the bed 6. The pick-up mechanism is best shown in the three Figs. 11, 12, and 13. This pick-up device consists, essentially, of a hollow body portion having a lower box-shaped base 98, from the sides of which project a pair of pins 99 and also a pair of pins 100. These pins are placed on the side portions of the box 98 and project laterally and are adapted to travel in the slots existing in the brackets 96. The bottom of the box 98 is perforated by a large number of minute openings of sufficient area to admit of the free circulation of air therethrough. Immediately above the box 98 is a second box 101, which may be integral with the box 98. This box 101 overhangs the box 98 on the left in Figs. 11 and 12, and that portion of the floor of the box 101 which overhangs the box 98 is provided with an opening 102. Within the box 101 and surrounding the opening 102 is a short hollow vertical cylinder 103, secured in place, as shown in Fig. 12, by any suitable or preferred means. This cylinder 103 does not extend to the top of the box 101; but its interior is in open communication with the interior of this box. Within this cylinder 103 is a vertically-slidable piston 104. On the lower face of the piston 104 is a pair of ears 105, between which is suspended a link 106, the lower end of which is pivotally connected with a rocking lever 107, the pivot of which projects laterally from the side of the box 98, and the free end of this lever 107 is provided with a laterally-projecting pin 108. Vertically extending from the top of the box 101 is an oval tube 109, and the interior of this tube is in open communication with the boxes 101 and 98. Over this tube 109 is placed the end of a suction-hose 110, secured to the tube 109 by any preferred means. The opening between the box 101 and the tube 109 is closed by a swinging gate pivoted on a bar 111, the outer ends of which project through the sides of the box 101 and are turned upwardly at an angle with the gate itself. The gate, which is hung on the bar 111, is not shown, but is indicated in Fig. 13 by dotted lines and is adapted to swing for the purpose of closing communication between the box 101 and the tube 109. A coiled spring 112 (see Fig. 13) is adapted to keep the gate either completely open or tightly closed by being connected with one of the upwardly-bent arms of the bar 111. This is caused by the fact that complete downward movement of the bar 111 is prevented by the gate encountering the side of the box 101, which arrests its further movement in that direction, and its descent in the reverse direction is prevented by the gate encountering the top of the box 101, where the tube 109 extends therefrom. The mechanism which causes the rocking of the bar 111 backward and forward about one-quarter of a revolution will be described later. On two sides of the box 98, and extending to the right in Fig. 13, are two tappet-arms 113, bent in any suitable shape, for a purpose which will be described later. The operation of the pneumatic portion of this pick-up mechanism is as follows: When this pick-up mechanism is in a position to receive a label, it is suspended by pins 99 and 100 in the slots in the brackets 96 at the outer horizontal end thereof, and the stack of labels supported on the table 55 will be raised by the mechanism hereinbefore described sufficiently to press the top label of the stack lightly against the perforated bottom of the box 98. This being accomplished, the table 55 immediately descends, leaving the upper label adherent to the perforated bottom of the box 98 by means to be now described. It will be here stated that as the plates 55 rise the rubber-covered pins 56 pass around the outer sides of the box 98 and do not come in contact with any of the mechanism thereof. The air which exists in the interior of the box 98 and 101 and the tube 109 is being constantly exhausted by either a fan or pumping mechanism connected with the hose 110, so the instant that an end label is pressed against the perforated bottom of the box 98 it is caused to adhere thereto by the partial vacuum existing in this box. As soon as the label has become adherent, as just described, to the perforated bottom of the box 98 the entire mechanism is carried forward past the pasting device for coating the bottom surface of the label with adhesive paste, and it is obvious that if for any reason the pick-up device does not work properly and grasp a label the pasting mechanism, unless automatically thrown out of operation, would coat the perforated bottom of the box 98 with paste, which would cause the next label which the device picked up to permanently adhere thereto, as well as to cause a filling of the perforations in the bottom of the box 98.

In order to render the device entirely automatic and so construct the same that should the pick-up mechanism fail to work and pick up the top label from the stack of labels furnished to it, the device contained in the second or upper box is inoperative. The operation of this device is as follows: If no label covers the perforated bottom of the box 98, the combined area of the numerous openings therein is so great that all of the air which will pass through the hose 110 will be furnished by these openings; but if a label is picked up by the device the openings through the bottom of the box 98 are approximately closed, the result of which is that the air will endeavor to pass through the opening 102 under the piston 104, which causes this piston to rise in the cylinder 103 in response to the suction exerted on the inside, which causes the link 106 to tilt the lever 107 sufficient to bring the pin 108 downward in Fig. 13 and into operative position to encounter and throw into operation the pasting mechanism, so that the label on the bottom of the box 98 will receive its coat of paste; but if for any reason the label is not picked up by the device and the openings in the perforated bottom of the box 98 are open the area is so much greater than the opening 102 that the air will freely pass through the perforated bottom and exert no influence on the piston 104, and the pin 108 will then be in such position that it will avoid tripping the pasting mechanism, and the pick-up device will pass over the paste-rollers without receiving any paste therefrom.

The pasting devices are indicated clearly in Figs. 3 and 5, and the details are shown in Figs. 20 and 21 and are as follows: The paste devices, as has been before stated, are supported by the posts 18 and 94 on both sides of the machine, and the description which follows will be confined to one device, as the devices are identical in construction and operation. In horizontal alinement with each other and attached to the posts 18 and 94 are journal-boxes 115, and extending between these boxes 115 is a shaft 116. Hooked onto the shaft 116 between the boxes 115 are two rocking arms 117, the engagement between the arms 117 and shaft 116 being such as to render them readily detachable from each other for the purpose of permitting the cleaning of the paste mechanism at all times. On the shaft 116 is a pin 118, which is the anchor for a coiled spring 119, the ends of which operatively engage lugs 120 on the inner side faces of the arms 117. The normal tendency of this spring 119 is to throw upward the outer free ends of the arms 117 at all times. These arms 117 are in horizontal alinement with each other and have on their outer ends (see Fig. 21) vertical portions 121. Extending between the vertical portions 121 of the arms 117 are upper and lower shafts, (referred to, respectively, as 122 and 123,) and these two shafts bear paste-rollers, (numbered, respectively, 124 and 125,) which are placed at such a distance apart that their peripheries will frictionally engage each other, and the revolution of one will cause a simultaneous revolution of the other, as well as transfer paste collected by one to the outer surface of the other. In order to insure the revolution of the two rolls 124 and 125 in unison, the two shafts 122 and 123 bear intermeshing spur-gears 126, placed on the shafts of the rolls just outside of and to the right of the arms 117 in Fig. 20. Detachably secured to the upright posts 97, which support the brackets 96, is a paste-containing tank 127, from which paste of a suitable character is supplied to the roll 125 and by it to the roller 124, and it is designed that the roller 124, when not otherwise prevented, will revolve and lie in the path of the under face of the bottom of the pick-up box 98 when passing along the slot in the brackets 96 immediately over the paste-tank with the object of coating the bottom side of a label held by the pick-up mechanism with adhesive paste. In order to keep the framework, which consists of the side arms 117 and its connected shafts 122 and 123, bearing the paste-rolls 124 and 125, normally below the line of engagement with the lower face of the bottom plate of the pick-up mechanism 98, there is pivoted on a lug 128 on the lower portion of one of the brackets 96 a dog 129. This dog is so placed that its lower end will engage the top or outer corner of one of the arms 117 and hold it at such a distance from the path of the pick-up mechanism as to prevent the contact of the upper paste-roll 124 with a label held by the under face of the pick-up mechanism.

Referring now to Figs. 12 and 13, in which is shown the tripping mechanism attached to the pick-up mechanism, it will be seen that, as has been before described, if the piston 104 is raised the pin 108 on the lever 107 will be depressed, due to the covering of the perforations in the bottom plate of the box 98 by a label. The depression of the pin 108 by the tilting lever 107 will cause it to trip the dog 129, thereby allowing the frame carrying the paste-rolls to rise sufficiently to coat the label carried by the pick-up mechanism with an adhesive paste. This dog 129 is overbalanced so as to set normally in the position shown in Fig. 21, but the slight elevation of the roll 124, due to the influence of the coiled spring 119, will prevent the return of the dog to the position shown in Fig. 21 unless the mechanism carried by the arms 117 is depressed sufficiently to enable the dog to reengage the outer corner of one of the arms 117, as shown in Fig. 21.

In order to return the pasting mechanism to its normal position (indicated in Fig. 21) after having coated the label which passes thereover with paste and to accomplish this before the return of the pick-up mechanism to the position shown in Fig. 3, there are hung on the inner side faces of the upright posts 97 by means of pins 130 a pair of rocking arms 131, having their free ends downwardly curved and their lower edges approximately parallel with the sides of the brackets 96 and so placed as to rest on the shaft 122 just outside of the paste-roll 124. These rocking arms 131 are so placed with respect to the pick-up mechanism that after the same has passed the tappet-arms 113 on the box 98 will encounter and ride over the upper surfaces of the rocking arms 131 and depress the same, which in turn depresses the shaft 122 and its connected mechanism sufficiently to enable the dog 129 to return to the position shown in Fig. 21, thus effectually holding the paste-roll 124 from engagement with the pick-up mechanism on its return stroke for the reason that, as the pick-up mechanism returns to the position shown in Fig. 3, it has already delivered its paste-coated label to other mechanism, which will be later described, and hence the lower perforated bottom of the box 98 would be unprotected against a coat of paste from the roll 124.

It will be obvious from the foregoing description that if no label is picked up by the box 98 for any reason the rocking lever 107 will not be operated nor the pin 108 depressed sufficiently to engage the dog 129, and hence the paste-roll 124 will not be raised to encounter the lower face of the bottom plate of the box 98.

In order to keep the tension of the spring 119 sufficient at all times to sustain the paste-rolls and arms 117, the right end of the shaft 116 in Fig. 20 is squared to permit the application of a key or wrench thereto, and a set-screw 143 in one of the journals 115 serves to retain the shaft 116 in position after it has been rotated sufficiently to tighten the spring 119.

It has been found that it is best in applying paste to the labels to have the paste-rolls 124 and 125 revolving at a suitable speed at all times when the machine is in operation, both for the purposes of keeping the paste in the tank agitated and in proper condition for use, but it also aids the applying of the paste to the labels and serves to coat the same more evenly and smoothly, and there is less danger existing of an oversupply of paste being applied to these labels, which renders the necessity of drying the cartons in an oven.

The mechanism by which the rotation of the paste-rolls 124 and 125 is secured is best shown in Figs. 1, 2, 3, 6, 7, 9, 20, and 21. Referring first to Fig. 20, there is placed on the front end of the shaft 122 a pulley 132, over which runs a small belt 134 to a double pulley 133, (see Fig. 3,) fastened to the front side of the post 18. As there is a post 18 existing on both sides of the center of the machine and as the pasting mechanism is identical, both pulleys 133 (shown in Fig. 3) are indicated by the same reference-numeral. These pulleys 133 are connected to each other by another belt 135. From the left double pulley 133 in Fig. 3 is a vertical belt 136, which passes over a pulley located on a shaft 137, suitably supported and sustained longitudinally of the machine below the bed. (Reference is here directed to Figs. 3, 6, and 7.) On this shaft 137 is a beveled gear 138, which meshes into a beveled gear 139, supported on a stub-shaft projecting from a bracket 140, (see Fig. 7,) suitably supported. This stub-shaft also bears a sprocket-wheel 141, over which runs a sprocket-chain 142, which passes over a sprocket-wheel, (not shown,) but on shaft 424 between the gear 26 and the pinion 22. From this description it will be seen that as the shaft 424 is constantly running the paste-rolls 124 and 125 will run at all times and keep the paste in suitable condition for use at any instant.

As has been described, the pick-up mechanism is arranged to travel from the position which it occupies in Fig. 3, guided in its course by the engagement of the pins 99 and 100 in the slots existing in the brackets 96, to a position due to the peculiar conformation of these slots upward and inward toward the posts 18 and 94 until the position of the pick-up mechanism has been changed from a horizontal one, as shown in Fig. 3, to a vertical one, with the bottom perforated face thereof bearing the paste-coated label turned toward the transverse center of the entire machine.

The means whereby the pick-up mechanism is caused to move along the slots in the brackets 96 bearing its label and when having reached a vertical position to there deliver the label in a vertical position is best shown in Figs. 3, 5, 8, 9, 14, 18, 19, and 22. The faces of each pair of posts 18 and 94 which face each other are provided with ways which consist of shallow grooves, and in these grooves is adapted to reciprocate a vertically-slidable carriage made up as follows: Arranged to slide in the groove in the post 18 is a vertical bar 144, and in the groove in the post 94 is a similar bar 145. The upper ends of these bars 144 and 145 are connected by cross-bars 146 and 147, which serve to keep the bars 144 and 145 in proper position in the ways in the posts 18 and 94. These bars 146 and 147 are reinforced by cross-braces 148. Extending between the bar 146 and its companion bar on the opposite side of the machine is a transverse bar 149, which serves as one of the connecting means between the carriages sliding between each pair of posts 18 and 94. The ends of these cross-bars 149 are bifurcated and serve as ears into which the end of a bifurcated lever 150 is pivoted, and the two bifurcated ends are each arranged to engage pivotally the pins 100, projecting laterally from the box 98 between it and the brackets 96, from which it will be seen that as the bar 149 rises, due to the influence of mechanism to be later described, the pick-up mechanisms from each side of the machine will be drawn in the ways formed by the brackets 96 until the bar 149 has reached the upward limit of its stroke.

Below the mechanism just described as being attached to the sliding bars 144 and 145 there is fastened to both a pair of brackets, the upper of which is referred to by the numeral 151 and the lower one by the reference-numeral 152, the brackets and mechanism connected therewith being the same on the bar 144 as it is on the bar 145. Therefore a description of one is deemed sufficient. Extending between the brackets 151 and 152 are two vertical transversely-parallel shafts 153 and 154. These two shafts are each rotatable in their brackets as bearings, and they are provided immediately above the bracket 151 with tight collars 155, so made that a portion of each collar is formed with projecting spur-gear teeth, and the teeth of adjacent collars are arranged to intermesh. These teeth on the collars 155 do not extend entirely around the peripheries of the collars, but only sufficiently far to permit substantially one-quarter of a revolution each of the shafts 153 and 154. The two shafts 154 are provided with upwardly-bent crank-shaped heads 156, and these heads 156 are connected together by a coiled spring 157. It will be seen from the drawings, especially Figs. 18 and 19, that the shafts 153 and 154 are each permitted a quarter of a revolution, and when rotating in either direction the spring 157 will retain them temporarily in either position which they may assume. On the shafts 153 are leaves 158, and on the shafts 154 are spring-fingers 159. The leaves 158 and the spring-fingers 159 are so placed on their respective shafts that when swung into the position shown in Figs. 18 and 19 the outer ends of the fingers 159 will press firmly against the leaves 158 and retain between them any such an article as a label. Projecting from the lower ends of the shafts 154 are tappet-rods 160. The entire carriage which is contained between the sliding arms 144 and 145 is slidable in the ways in the posts 18 and 94, and the mechanism for causing this reciprocation will be later described. The termination of the upper end of the movement of the carriage which has just been described will bring the leaves 158 and the spring-fingers 159 immediately opposite to the bottom face of the pick-up box 98 when it has reached the upper end of its stroke, which, as has been described, causes this pick-up mechanism to assume a vertical position, bearing the label on its lower face, (paste side inward.) It is customary and preferable that the end labels to be placed by this device will be somewhat larger than the area of the bottom of the box 98, and hence the labels will project on either side thereof a short distance. The vertical portions of the grooves in the brackets 96, which lie adjacent to the posts 18 and 94, are so close to these posts that the labels adherent to the bottom of the pick-up mechanism 98 will be held and sustained slightly projecting into the space between the posts 18 and 94 and will be substantially on a line drawn between two points each situated centrally between the axes of the shaft 153 and 154. It will be further stated that before the time the leaves 158 and 159 reach the top of their stroke they are separated as far apart as possible, (by later-described means,) so that instead of meeting each other, as shown in Figs. 18 and 19, they are in nearly a straight line away from each other, and the label carried by the pick-up mechanism passes up between these two widely-extended members 158 and 159 and for an instant is held there and retained by the pneumatic action of the pick-up mechanism.

The operation by which the label is transferred from the base of the pick-up mechanism into the grasp of the members 158 and 159 is as follows: At the instant the pick-up mechanism reaches the upward limit of its stroke the tappet-arms 113 in the rear of the box 98 encounter the tappet-arms 160 on the shafts 154 and swing them past the center of their revolution, and through the intermeshing of the two collars 155 and the influence of the spring 157 the two members 158 and 159 snap upon the sides of the label and retain it between them. At the same instant this takes place or just immediately before this the bent end of the rocking bar 111, which holds the air-shut-off gate in the box 101, will encounter a trip 161, placed on the bracket 96. (See Fig. 3.) This trip 161 rotates the bar 111, and the action of the spring 112 will cause it to close the gate hung on the bar 111 and close communication between the suction-hose 110 and the pick-up mechanism, the result of which is that the pick-up mechanism releases the label, leaving it in the grasp of the members 158 and 159, to be later carried downward to a position exactly in the front of the end of the carton occupying the position marked E in Fig. 9.

As soon as the pick-up mechanism has delivered its label into the grasp of the members 158 and 159 the members start downward on their lower movement, and the pick-up mechanism slides downward and outward in the brackets 96 until it reaches substantially the end of its stroke, at which point the bent arm on the bar 111 will encounter an upwardly-extending trip placed on the bracket 96, which reverses its movement and opens the gate, allowing the air to be drawn through the perforations in the base of the box, ready to receive the next label resting on the table 55.

The means whereby the mechanism described as a "carriage" and sliding between the posts 18 and 94 is reciprocated is as follows, attention being especially directed to Figs. 6, 8, 14, 18, 19, and 22. Referring first to Fig. 22, the right post 18 instead of terminating at the top of the bed 6 passes therethrough and extends downward, and its lower end is customarily supported on a cross-bar 36, which extends between the legs 7 and 10, and the vertically-slidable bar 144 also extends downwardly through a suitable opening in the bed 6, and its lower end is provided with a sleeve 163. The bar 144 is considerably shorter than the post 18, so that the sleeve 163 will occupy a position about midway between the bed 6 and the floor on which the machine is situated, this being clearly shown in Fig. 22. The posts 94 terminate at the top of the bed 6 and are sustained there in any suitable manner, as before referred to. The slidable bars 145 do not pass through the bed 6, and the downward motion of the entire carriage between the posts 18 and 94 is arrested by the lower end of the bar 145 encountering the top of the bed 6. From the fact that the bars 144 and 145 on each side of the longitudinal center of the machine are connected with similar devices on the opposite side of the machine by cross-braces, one of which is referred to in Fig. 19 by reference-numeral 149, and by cross-braces 165, (see Fig. 3,) the raising of the bars 144 and 145 will simultaneously raise the devices on both sides in complete unison. On the right-hand post 18 below the strap-sleeve 163 is another sleeve 164, to the side of which is pivoted a link 166, and which in turn is pivoted to the outer end of a rocking arm 167, having its medial portion provided with a slot 168 and its rear end pivoted on a pin 169, attached to the inner rear side of the leg 8. From this it will be seen that if an oscillating motion be communicated to the rocking arm 167 the sleeve 164, encountering the sleeve 163 on the post 18, will raise the bar 144 and its connected mechanism.

The means for communicating motion to the rocking arm 167 is as follows: (Reference is now directed to Figs. 8, 14, and 22.) On the outer end of the sleeve 25 to the left in Fig. 8 of the left hanger-bracket 23 there is keyed a crank 170, having a square-shaped wrist-pin 171, arranged to travel in the slot 168 in the arm 167, and thereby communicate motion to the same. As before stated, the sleeve 25 does not rotate unless the dog 74 in the head 73 on the sleeve 25 engages the head 72 on the tight sleeve 20, so that the operation of the mechanism for raising the bars 144 and 145 is only operated when the machine is supplied with cartons along the rails 13, as has been before described.

The position of and the motion imparted to the arms 167 is such that after the bar 144 has reached the limit of its downward stroke, which is terminated by the bar 145 encountering the bed 6, the sleeve 164 will continue downward therefrom a slight distance under the influence of the wrist-pin 171, so that the mechanism carried by the bars 144 and 145 will remain stationary at the lower end of their stroke during the slight interval that the wrist-pin 171 is at the lower portion of its revolution. The reason for this temporary arresting of the movement of the label-carrying mechanism at the bottom of its stroke is to enable the mechanism by which the labels are placed on the heads of the cartons to perform their function of applying the end labels and withdrawing from contact with the cartons before the mechanism for grasping the next succeeding label from the pick-up mechanism has started on its upward stroke.

The mechanism by which the two labels, one on each end of the carton and held suspended between the members 158 and 159, are driven inward and neatly and evenly applied to the ends of the cartons while in the position indicated by the reference-letter E in Fig. 9 is as follows, particular reference being had to the following figures, 1, 2, 3, 4, 5, 6, 8, 14, 19, 23, and 47: Referring first to Fig. 3, there are placed on both sides of the longitudinal center of the machine two horizontally-slidable bars 172. These bars are in exact alinement with each other transverse to the body of the device and in exact alinement with both the horizontal and vertical center of a carton when it is placed in the position indicated by the reference-letter E in Fig. 9. These bars 172 are each slidable in brackets 58 and 173, and their motion is toward and away from the ends of the carton on the rail 13. As the mechanism connected with these two bars 172 is identical on both sides of the machine and as each mechanism is arranged to place one end label on each carton, a description of one of these mechanisms is deemed sufficient for the understanding of the device. On the inner end of the bar 172 is a head 174. The shape of this head is shown in Fig. 19 and consists of a main body portion provided with outwardly-flaring legs at each of its corners.

The position of the bar 172, with its head 174, is such that it stands immediately outside of the members 158 and 159, which carry downward the pasted label in a vertical position from the tops of the posts 18 and 94, where it is received from the pick-up mechanism, and the arms on the head 174 project laterally sufficiently far to engage the leaves or members 158 when in the position shown in Fig. 19. The relative positions of the head 174 and the label-bearing members 158 and 159 is clearly shown in this figure. The bar 172 is constantly forced inward toward the end of the carton by a spring 175, attached to the side of the bed 6. From the position which the head 174 occupies immediately outside of the label-holding mechanism (shown in Fig. 19) it will be obvious that if a sudden inward thrust is given to the bar 172 the legs on the heads 174, encountering the leaves or members 158, will change their position and open them to the widest extent possible, thereby releasing the label from their grasp and causing it to momentarily adhere to the face of the head 174 and be carried during this contact over the short intervening distance to the end of the carton, against which it is pressed firmly under the influence of the spring 175, which causes its pasted face to adhere to the end of the carton and there remain.

The distance which the label is carried while temporarily held by the head 174 is so short and the stroke of the bar 172 which carries the head 174 is so quick that the label does not fall or become deranged during its transfer from the members 158 and 159 to the end of the carton. The label being considerably larger than the end of the carton, it extends vertically and horizontally beyond the sides of the carton a sufficient distance to enable these projecting sides to be folded down and stuck to the sides of the carton, as shown in Fig. 49.

The means by which the top, bottom, and sides of the projecting label are wiped over the edges and onto the sides of the carton is as follows: Mounted slidably on the bar 172 is a cruciform frame 176. The outer ends of the legs of this frame 176 are bifurcated, and in these bifurcations are pivoted rocker-arms 177, on the free ends of which are mounted V-shaped brushes 178, so placed that the apex of the V is pointed inward toward the carton. The opposite ends of the arms 177 are pivotally attached to links 179, and the opposite ends of these links 179 are attached to a sleeve 180. Attached to the side of the sleeve 180 are links 181, which unite the sleeve 180 to the upper free ends of a bifurcated rock-lever 182. The pivots for both the levers 182 consist of a pair of brackets placed below the bed 6 and designated by the reference-numeral 183. The means by which a rocking motion is communicated to the upper end of the lever 182 will be described later. Suspended on the pivot-pins 184, which connect the links 181 with the lever 182 on the inside of the bifurcated arm of the lever 182, is pivotally mounted a U-shaped member 185, (see Fig. 23,) and the upper separated ends of the member 185 are connected with the upper arm of the cruciform frame 176 by links 186. On the inner side of the brackets 58 is a boss 187 for a purpose to be stated. Referring now to Fig. 4, on the upper face of the bar 172 is placed a plate 188. This plate is provided with upwardly-turned ends 189 and a transverse middle rib 190. The openings through the cruciform frame 176 and the sleeve 180 are large enough to permit the placing of this plate through these openings, as shown in Fig. 4, and the plate is so placed and the opening in the cruciform frame of such configuration that the upturned end 189 and the rib 190 will engage a properly-shaped recess in this opening, and thereby lock the plate 188 and the cruciform frame 176 together as long as they slide upon the bar 172. The sleeve 180 is slidable on the plate 188, and its motion is limited at one end by the frame 176 and at the other by the upturned end 189. Its movement otherwise is perfectly free on the bar 172 and plate 188. A set-screw 191 is passed through the body of the frame 176 and plate 188 and engages the upper surface of the bar 172 to insure a certain amount of frictional resistance to the movement of the plate 188 and its connected mechanism on the bar 172. The amount of the friction may be regulated by the rotation of the screw 191. On the bar 172 is a tight collar 192, which the sleeve 180 will encounter in moving toward the right in Figs. 3 and 4. The operation of this much of the device is as follows: The parts at the beginning of their movement being in the position shown in Fig. 3, it will be assumed that a label duly pasted is held by the members 158 and 159 immediately in front of the head 174. As soon as the rocking arm 182 moves inward toward the longitudinal center of the device the links 181 cause the sleeve 180 to slide on the bar 172 and plate 188 toward the cruciform frame 176. At the commencement of this movement two results happen, first, the bar 172 will be moved forward under the influence of the spring 175 toward the carton on the rails 13, this being permitted by the fact that the sleeve 180 will slide forward and engage the cruciform frame 176, which moves them both inward, thus releasing the pressure against the tight collar 192. This inward movement of the bar 172, as has already been described, frees the label from the grasp of the members 158 and 159 and causes it to adhere centrally on the end of the carton, and the pressure of the spring 175 holds it there by forcing the head 174 against the end of the carton. This pressure of the two heads 174 inward on the ends of the carton serves to hold it steadily in position while the protruding edges of the label are wiped down over the sides of the carton. The movement of the sleeve 180 toward the arm 176 by means of the links 179 tilts the arm 177 on their pivots in the ends of the arms of the cruciform frame 176 and brings the brushes 178 inward toward the longitudinal center of the bar 172 and in a position to cause the brushes to pass between the legs projecting from the corners of the head 174 and operatively engage the protruding edges of the label and wipe them down around the under edges of the carton and into their proper position over the sides of the carton immediately adjacent the ends thereof. As soon as the brushes 178 have accomplished their function the lever 182 starts on its return stroke outward away from the center of the machine, and the result of this movement of the lever 182 will cause the sleeve 180 to slide along the plate 188 until it encounters the outer upturned end 189. This separates the brushes, being a reversal of the movement which took place when the lever 182 was swung inward, and disengages the brushes from operative relation with the newly-pasted label and prevents the same from tearing from the carton. As soon as the sleeve 180 has reached the upturned end 189 on the plate 188 the plate 188 itself moves along the bar 172, bringing with it the cruciform frame 176. In this it is also assisted by the links 186, which connect the U-shaped member 185 with one of the arms of the cruciform frame 176. Before the lever 182 has reached the limit of its entire outward stroke the sleeve 180 encounters the tight collar 192, and the collar 192, together with the bar 172, moves in unison outward until the lever 182 reaches the extreme limit of its stroke, in doing which it overcomes the influence of the spring 175. Just before the end of the stroke of the lever 182 is reached the rounded lower portion of the member 185 encounters the boss 187 and tilts the member 185 on its pivot 184 and by means of the links 186 draws outward the cruciform frame 176 sufficiently to cause the links 179 to assume a more perpendicular position with respect to the bar 172, and thus swing inward toward the bar 172 the brushes 178, thus preparing them for the next inward stroke which they will make to apply the label on the next carton.

The means by which the levers 182 are rocked inward and outward on their pivots in the brackets 183 is as follows: (Attention is now directed to Fig. 47.) The lever 182 on the left of the machine extends below its pivot, and to this lower end is pivoted a connecting-rod 193. The central portion of this connecting-rod 193 is horizontal, and the opposite end to the one just described is upwardly bent and is pivotally attached to the lever 182 on the right side of the machine above its pivot. From this it will be seen that a movement in either direction transversely of the frame of the machine by the connecting-rod 193 will cause the levers 182 to swing in unison toward and away from the longitudinal center of the entire device.

The means for causing the reciprocating motion of the connecting-rod 193 consists of a longitudinal bar 194, pivoted on a bracket 195, depending from the central under face of the bed 6. The opposite end of the longitudinal bar 194 is pivotally attached to a transversely-slidable bar 196. (Reference is now directed to Fig. 8.) The bar 196 is supported and slidable in two housings 197, each fastened to the bracket-hangers 23, which support the shaft 19. On the under side of the bar 196 are two rollers 198, separated a short distance and for a purpose to be now stated.

Referring to Fig. 14, it will be seen that on the sleeve 25, heretofore described as being revoluble only when the dog 74 has been placed in operative relation with the head 72 on the sleeve 20, is a wheel 199, having on its outer face a cam-ridge 200. This ridge 200 is so placed that it is adapted to run between the rollers 198 and to cause a sidewise movement of the bar 196 whenever the offset portion of the cam-ridge 200 passes to the upper part of its revolution and forces the rollers 198 to the left in Fig. 8. The wheel 199 is so placed on the sleeve 25 that the offset portion of the cam will engage and move the rollers 198 and bar 196 to the left in Fig. 8 at the exact instant that it is desired to force the label from the grasp of the members 158 and 159 onto the end of the carton and cause their adherence thereto by means of the brushes 178. As has already been referred to, this mechanism for swinging the brushes into engagement with the label on the carton is only operative when a carton has passed the tappet-arm 87, which starts into operation all mechanism heretofore described as being connected with the sleeve 25 on the shaft 19.

Having now described the means whereby the cartons are delivered from the feeding devices to the end-label-placing devices and the mechanism connected with both and the means for setting into operation the label-placing mechanism when a carton is fed along the rails 13, the description which follows will relate to the manner by which a wrapping-label is placed around the four sides of a carton, completely covering it.

The wrapping-labels customarily used are approximately of the same width as the length of the box, and as they are wrapped around the box they not only completely cover the portions not covered by the end labels, but also cover the portions of the end labels which overlap and adhere to the sides of the box, and in doing so they bend down the projecting corners of the end labels, which must necessarily project from the corners of the box at an angle of approximately forty-five degrees, as shown in Fig. 49. It is also necessary in the placing of the wrapping-label around the sides of a carton that one end of the wrapping-label should slightly overlap the other to insure a perfect union therewith and completely cover the carton itself.

The movements of the carton from the time that it has received the end labels during its progress through the balance of the mechanism when the wrapping-label is placed thereon and its subsequent ejection from the rear of the machine will be taken up successively and the steps described at the same time the mechanism for causing each successive step is specified with reference to the drawings.

As soon as the end-label-pasting devices have ceased their operation, leaving the carton in the position marked E in Fig. 9, the plate 43 is swung up to a perpendicular position on its arm 42 by the mechanism which has been described with reference to the feeding mechanism.

The forward movement of the carriage consisting of the side arms 38, sliding in the ways in the bars 37, existing parallel with and under the rails 13, will carry the carton E in Fig. 9 along the rails 13 between suitably-placed guide-plates 201 to the end of the rails 13 and from there push the carton onto an elevator-plate 202, where it remains during the placing of the wrapping-label on three of its sides—viz., the top and two major sides. The supporting mechanism controlling the elevator-plate 202 will be described later.

Referring to Fig. 9, there is placed between the two vertical posts 94 a shaft 203, on the central portions of which is a downwardly-turned tappet-arm 204 with a curved lower end arranged to encounter the cartons as they successively pass between the guide-plates 201 on the rails 13. The function of the tappet-arm 204 is precisely similar to the function of the tappet-arm 87 suspended between the posts 85 with this exception, that the tappet-arm 204 starts into operation the mechanism by which the wrapping-labels are placed in position and wrapped about the sides of the carton. Mounted on the shaft 203 is a rocking arm 205. From the rocking arm 205 depends a vertical rod 206. This rod above the bed 6 is shown in Figs. 2 and 9. This rod passes downward through a suitable opening in the bed 6 and has attached to its lower end an arm 207, which is connected with a longitudinal bar pivoted in a journal 208, with an upwardly-extending hooked end 209 identical in shape and function with the hooked end 94 of the bar 92.

The position of the last-described mechanism below the bed 6 is shown in Fig. 47.

Referring now to Fig. 14, there is mounted on the sleeve 20 a disk wheel 210, constituting the male member of a clutch. This member 210 is tight on the sleeve 20, which has already been described as being constantly in motion, and surrounding the male member 210 is a female member 211, consisting of a counterbored disk wheel on the sleeve 24, which revolves in the right hanger-bracket 23 in Fig. 14. In order to transmit motion from the member 210 to the other member 211 of the clutch just described, there is located at some point in the outer face of the member 211 an opening provided with a dog 212, having a friction-roller in its outer end (referred to by reference-numeral 213) and so placed as to be engaged operatively by the hooked end of the bar 209. It will be here stated that the operation of the dog 212 is identical with the operation of the dog 74, and a description of its operation is believed to be unnecessary. It will be therefore seen that as the carton passes the tappet-arm 204 in its movement toward the elevator-plate 202 (see Fig. 9) the tappet-arm 204 will be moved and the dog 212 operatively connect the two members 210 and 211 constituting the clutch and the sleeve 24, with its connected mechanism, will continue to revolve with the sleeve 20 until the engagement of the dog 212 with the male member 210 is discontinued.

Referring now to Fig. 9, there is placed immediately on one side of the elevator-plate 202 a stop or abutment 414, whose sole object and function is to prevent the carton carried forward by the plate 43 from being carried too far over the elevator-plate 202, and thus properly position the carton on this plate.

In order to make the understanding of the detailed description which follows more clear, it will be stated that the carton immediately after being placed on the elevator-plate 202 is raised vertically, encountering on its upward movement the pasted under side of the wrapping-label and carrying upward in its movement this label, which is wiped about its two major sides by suitably-placed brushes.

In order to place successively-pasted labels in the vertical path of the upwardly-moving carton and to remove this label-placing mechanism from contact with the carton, the following mechanism is employed, reference being first directed to Figs. 1, 2, 5, 34, 29, 31, 44, and 46. Referring first to Figs. 5 and 46, there are placed on the rear portion of the bed 6 two upright bars 214 and 215, the upper ends of which are bent at right angles with their vertical portion, and which extend inwardly toward the transverse center of the machine parallel with each other. The horizontal portions of the bars 214 and 215 extend inward toward the path of the elevator-plate 202, but do not extend far enough to encroach thereon. Mounted on the horizontal portion of the bar 215 at its inner extremity is an upright bar 216, and a similar parallel bar 217 is perpendicularly attached to the inner end of the bar 214. Attached to the right-hand post 94 (see Fig. 1) is a bar 218 made in the shape of an L, with its horizontal leg in alinement with the horizontal portion of the bar 214 and with its other leg 219 perpendicular with its horizontal portion and parallel with the bar 217. The two bars 217 and 219 are connected by a top bar 220. Parallel with and on the opposite side of the machine from the bar 218 and projecting from the left bar 94 is a similar bar, the lower leg of which is referred to by the reference-numeral 221, and having an upright portion 222 placed in identically the same manner as the leg 219. The tops of the bars 216 and 222 are connected by a top bar 223, horizontally parallel with the bar 220. The bar 220 is connected by a strengthening bar or brace to the post 94 to steady the framework just described; but it may be made integral, as shown in Fig. 1, with the bar 220. The L-shaped bars 218 and 221 are so placed that their vertical portions 219 and 222 form with the bars 216 and 217 the side edges of a vertically-hollow passage-way, into which the carton on the elevator-plate 202 enters.

Referring now to Figs. 1 and 24, there is attached to the inner sides of the bars 214 and 215 brackets 225, and attached to the posts 94 are similar brackets 226, and these brackets support two horizontally-parallel slotted arms 227, which extend toward the right side of the machine. Between the slotted arms 227 is suspended by pins 229 a label-grasping box 228. (See Figs. 24 and 46.) The inner ends of the slots in the arms 227 are so placed that when the pins 229 encounter them the label-carrying device 228 will be located exactly over the path in which the carton rises on the elevator-plate 202 and in exactly the right position as to deliver its pasted label to mechanism which will temporarily sustain it during the retreat of the box 228 out of the way of the upwardly-rising carton. In other words, the wrapper-label-grasping device is adapted to slide transversely of the machine with the slotted arms 227 as guides and at each outward stroke to pick up a wrapping-label and bring the same into contact with the pasting devices for coating the label with paste and to cease its inward stroke and deliver the label in exactly the right position to be engaged by mechanism which will hold the label until placed on the carton.

The mechanism for bringing up successively a single wrapper-label into position to be grasped by the box 228 and the mechanism for coating the label with paste will be described later, attention now being directed to the mechanism by which the reciprocating stroke of the label-carrying box 228 is moved in its guides 227. Attached to the pins 229 on the box 228 are links 230, to the outer ends of which are attached rocking levers 231. The links 230 and the levers 231 are best shown in Figs. 1, 5, 6, 7, 8, 24, 42, and 46. Referring first to Figs. 6 and 8, the lower ends of the rocking levers 231 are fastened on a rotatable shaft 232. This shaft 232 is journaled in the right side of the machine in a box 233, attached to the lower outer portion of the leg 8 of the bed 6, and in a box 234 on the cross-bar 78, which extends between the legs 7 and 8. The front lever 231 passes up through a slot in the bed 6, in which it is designed to rock. The rear lever 231 is attached to the shaft 232 outside of the box 233 on the projecting end of the shaft. It is obvious from this that these two levers 231 will rock in unison and swing the box 228 in its ways in the arms 227. In order to communicate motion to the shaft 232 at the correct interval to cause the box 228 to deliver the label and retreat from the course which the rising carton on the elevator-plate 202 will take, is as follows: (Reference is now directed to Figs. 6 and 46.)

Attached tightly to the shaft 232 is an arm 235 at about substantially a right angle to the levers 231, and to the free end of the arm 235 is pivoted a link 236, having an abruptly-curved upper end, and this upper end of the link 236 is pivotally connected to a vertically-slidable carriage 237. (Attention is now directed to Figs. 8 and 46.)

The ways on which the carriage 237 is slidable consist of a rod 238, having a straight vertical portion on which the carriage 237 is slidable and having its lower end offturned and fastened to the inner side of the leg 9. This carriage has projecting from its upper portion outwardly from the center of the machine a short perforated arm 239.

A rod 240 extends from the under side of the bed 6 to the lower curved portion of the bent rod 238, and on these two means it is firmly secured. This rod 240 is parallel with the rod 238 and is arranged to pass through the perforation in the arm 239, so as to keep the carriage 237 in a certain definite position at all times during its reciprocating motion up and down the two rods 238 and 240.

The means whereby motion is communicated to the carriage 237, causing the rocking of the levers 231, is as follows, (reference being had to Figs. 7, 8, and 45:) On the bar 36, which extends between the legs 7 and 10 of the bed 6 and indicated in dotted lines in Fig. 45, is a bracket 241, to the upper end of which is pivoted a yoked arm 243, the lower leg of this yoke being curved in the form of an arc, the center of which is the center of the shaft 19, and its outer end is pivotally attached to a link 244, having an upwardly abruptly curved end pivotally attached to the lower side face of the carriage 237. The upper leg of the yoked arm 243 is shorter and is upwardly bent and has on its outer end a lateral lug 245.

Referring now to Fig. 14, there is placed on the outer end (left) of the sleeve 24 and revoluble therewith a crank-arm 246, bearing on its outer end a roller 247 and a second roller 248 midway between its outer end and its main portion. The two legs of the arm 243 are so placed and shaped with respect to the two rollers 247 and 248 that as the crank-arm 246 revolves, driven by the sleeve 24, the roller 247 will encounter the concentric portion of the lower leg of this arm and force and hold it downward as long as the roller 247 and the leg are in contact with each other. This depression of the arm 243 by means of the link 244 forces downward the carriage 237 and the rocking end of the arm 235, which throws the wrapper-grasping box 228 inward into the position shown in Fig. 46. The concentric portion of the lower leg of the arm 243 is wider or else is provided with a concentric integral lug 249, on which the roller 247 rides. As soon as the roller 247 has passed from engagement with the lug 249 the roller 248 will encounter the lug 245 on the upper leg of the arm 243 and by maintaining its operative engagement therewith will cause the bar 243 to swing on its pivot in the bracket 241, raising the link 244 and the carriage 237 and throw outward the wrapper-grasping box 228 to the extreme left in Fig. 46. As soon as this box 228 has reached the extreme end of its outward stroke the roller 248 will pass from engagement with the lug 245 by going over its end, and the arm 243, with its connected mechanism, will remain in that position until the crank 246 has revolved sufficiently to bring the lower roller 247 into engagement with the concentric portion of the lug 249 on the lower leg of the arm 243. This mechanism just described will revolve as long as the head 211 of the sleeve 24 is connected by the dog 212 with the member 210 on the constantly-revolving sleeve 20. In order to render the description as brief as possible with consistent clearness, it may be here stated that the box 228 is provided at its top with a tube 250, over which is placed the end of a suction-hose, whose object and function is identical with the hose 110, used on the end-label-grasping mechanism heretofore described, and the construction of the box 228 is in every respect similar to the construction of the end-label-grasping mechanism excepting in respect to the size thereof.

The pneumatic action of a vertically-moving piston in a cylinder arranged when moving upward to trip the pasting device and set it in operation will be described when a description of the pasting device is given.

The means for supplying labels to the box 228 is best shown in Figs. 1, 6, 8, and 23, and is as follows: In suitable vertical openings in longitudinal alinement with each other in the bed 6 are two vertical shafts 253 on the right side of the machine between the levers 231. Mounted on these shafts is a wrapper-label-carrying plate 251, provided around the edges of its upper surface with pins 252, covered with a rubber tubing in exactly the same manner as has been described with reference to the pins 56. On this plate 251 is placed the wrapping-labels, and this plate is intermittingly elevated to meet the under face of the box 228.

Referring now particularly to Figs 6 and 23, the lower ends of the shafts 253 are united by a yoke 254, through which passes freely a shaft 255, having on its lower end an enlarged head 256 and counterbored on its under side to receive the head of a vertically-slidable shaft 257, mounted in the two arms of a bracket 258, attached to the upper face of the cross-bar 78. On the upper arm of the bracket 258 is a sharp-pointed pawl 259, which engages the ratchet-teeth of the head 256 and rotates it a fractional part of a revolution at each downward stroke of the mechanism supported on the yoke 254. Between the yoke 254 and the head 256 is a split spring-nut 260, which engages the threads on the shaft 255, and the spring-nut is operated and caused to engage these threads by a suitable hand-lever 261.

It will be stated that the structure, function, and operation of the mechanism just described is identical, excepting that the parts are larger with the mechanism which has heretofore been described with reference to the end-label-raising plates 55, and it is believed that a more specific description of this mechanism is not necessary.

The shaft 257, which slides in the bracket 258, is reciprocated by the following mechanism: Attached to the lower end of the shaft 257 is a link 262, and to the upper end of this link 262 is attached to a rocking arm 263. This rocking arm 263 is tightly attached to a rotatable shaft 264, which is journaled in the legs 8 and 9. On the outside of the head 211 of the sleeve 24 on the main shaft 19 is a strap-cam 265. This cam is shown in Figs. 7 and 8. Tight on the shaft 264 is a rocking arm 266, which bears in its outer end a roller 267, so placed as to engage the strap-cam 265. When this cam is revolved with the head 211, which turns in unison with the sleeve 24 and is set in motion by mechanism heretofore described, it will be seen that as the cam 265 encounters the roller 267 it will rock the arm 266, and by means of the shaft 264 and the arm 263 will raise the vertical slidable shaft 257, by which means the label-bearing plate 251 is elevated sufficiently to encounter the under face of the box 228.

It will be seen from the description heretofore given that unless a carton leaves the position indicated by the reference-letter E in Fig. 9 and is carried along the rails 13 to the elevator-plate 202 and encounters the tappet-arm 204, the mechanism just described for raising the wrapper-label-raising plate 251 will not operate. Hence no labels will be delivered to the mechanism for pasting and applying them to the cartons.

The mechanism for applying paste to the large wrapping-labels which are picked up by the box 228 during its movement from the place where it receives labels from the plate 251 to the place where it delivers the labels to other mechanism for applying the labels to the cartons is best shown in Figs. 5, 40, 41, 42, 46, 52, and 53, and is as follows: Revolubly mounted in the right post 94 and the post 214 is a revoluble shaft 268, provided with a hand-wheel 269, by which it may be revolved, and the post 214 is provided with a set-screw 270, by which the revolution of the shaft 268 may be arrested at any desired point. Detachably hooked on the shaft 268 are two convex arms 271, having integral with their outer free ends a vertical portion between which are mounted upper and lower paste-rolls, referred to, respectively, by reference-numerals 272 and 273. These two arms 271 are united by a cross-bar 274, situated intermediate the ends of the arms 271. On the shaft 261 are coiled springs 275, having one of their ends thereof fastened to the shaft 268 and their outer ends to the bar 274, so that by rotating the shaft 268 by means of the hand-wheel 269 the influence of the springs 275 will have a constant tendency to swing upward the outer free ends of the arms 271, between which are situated the paste-rolls 272 and 273. When the rotation of the shaft 268 has increased the tension of the springs 275 sufficiently to raise the outer ends of the arms 271, the set-screw 270 is tightened on the shaft 268, and it remains in that position until the set-screw is released. Of course an increase of the tension on the springs 275 can be obtained at any time by repeating this operation. The shafts which bear the paste-rolls 272 and 273 also bear intermeshing spur-gears 276, used to cause the simultaneous revolving of the paste-rolls on their axes. Below the paste-rolls 272 and 273 and properly inclosing them is a paste-tank 277, supported on brackets 278 and 279. The bracket 279 is pivoted at its base in a bracket 280 and is provided with a projecting side leg 281, adapted to be engaged by a catch 282, by which arrangement it will be seen that when the catch 282 is disengaged from the leg 281 the supporting-bracket 279 may be swung outward, thus releasing the paste - tank, which may then be readily removed for cleaning or refilling. On the shaft of the upper paste-roll 272 is a pulley 283, over which a belt 314 is passed from a loose pulley 315 on the shaft 268, and a belt 284 conveys motion from a pulley on the shaft 286, located longitudinally of the machine below the bed 6 and supported by a bearing 285. The shaft 286 is revolved by a belt 287, extending from a pulley on the shaft 137 to a pulley on the shaft 286. (See Fig. 3.) The influence of the springs 275 will constantly raise the paste-rolls into such a position that the upper paste-roll 272 would normally engage either the bottom of the pick-up box 228 or a label held thereon unless mechanism is provided which would constantly force downward the supporting mechanism of the paste-rolls.

The mechanism which will retain the paste-rolls downward and release them when a label is picked up by the box 228 is shown in Figs. 5, 46, 52, and 53. Referring to Fig. 52, there is placed on the slotted bar 227 a bracket 288, in which is mounted a tappet-arm 289, having an upper projecting end and a lower foot, (referred to by reference-numeral 290.) The foot 290, is at right angles with the upper projecting portion, and this foot 290 is arranged to bear against the outer side of the right arm 271 in Fig. 40, and on this arm is a pin 291. The engagement of the foot 290 against the outer face of the arm 271 is maintained by a coiled spring 292 on the tappet-arm 289. The normal position of the foot 290 with respect to the arm 271 is to engage the same immediately over the pin 291, and thereby keep the entire paste mechanism downward in the paste-tank 277 sufficiently to insure the passing of the label-carrying mechanism over the upper paste-roll 272 without engagement therewith. From this it will be seen that it will be necessary that the pick-up mechanism 228 must carry suitably-actuated mechanism which will encounter and trip the tappet-arm 289 whenever the box 228 bears a label, so as to insure the rising of the paste-roll 272 into engagement with the label.

Referring now to Figs. 46 and 53, there is mounted on the box 228 a casing 293, in which is a cylinder carrying a piston, (indicated in dotted lines in Fig. 46,) and the piston in the cylinder carries a depending arm pivotally connected with a rocking arm 294, having its front end concaved and so positioned that when in the position shown in Fig. 46 it will engage the tappet-arm 289 and partially revolve it, causing a release of the engagement existing between the foot 290 and the pin 291, allowing the roller-carrying mechanism to rise and bring the paste-roller 272 into operative engagement with the label carried on the bottom of the box 228.

If there is no label picked up by the box 228, the piston in the cylinder 283 will not rise, and the concaved front end of the rocking arm 294 will pass over the tappt-arm 289 and fail to engage the same.

The operation of the cylinder, piston, and lever for tripping the paste-roller-retaining mechanism is identical with that described with reference to the end-label-carrying mechanism, and it is believed that a detailed description thereof is not necessary.

In order that the paste-roller 272 may be depressed after having applied the paste which it carries to a label after the passage of the box 228, so as to insure against the paste-roller 272 engaging the under face of the box 228 on its return outward stroke, there is placed on the rear of the box 228 a tappet 295, which engages the upper convex side of the left arm 271 in Fig. 40 and presses it downward sufficiently to cause the pin 291 to pass below the position of the foot 290, and their engagement will be established by the spring 292 in the position shown in Fig. 53.

The operation of this label-carrying device and its paste-applying mechanism is substantially equivalent in function as that of the pick-up mechanism for applying the labels to the ends of the cartons which has been already described, and a further description is deemed unnecessary for this reason. The description just given relates only to those portions of this device which are different in construction from the devices which were utilized on the end-label-pasting mechanism.

The upper portion of the pick-up box 228 is provided with a superimposed valve-casing 296, (see Fig. 53,) in which is a valve or gate suspended on a cross-bar 297, having its end bent at right angles to its main portion and also provided with a spring 298 at one end, which serves to keep the gate either entirely open or entirely closed, the operation being the same as has been described with respect to the rocking bar 111 and its spring 112 in Fig. 13, relating to the end-label-carrying mechanism. The opposite end of the cross-bar 297 is downwardly curved and adapted to be swung one-quarter of a revolution to open or close the opening by which air is drawn from the box 228 at each end of its stroke by the following mechanism. (See Fig. 53.)

On the horizontal bar 218 is a tappet-arm 299, which is arranged to engage the down-turned end of the cross-bar 297 when the box 228 is forced inward by mechanism already described. This engagement of the tappet 299 and the curved end of the bar 297 closes the gate in the casing 296 and arrests the suction exerted on the label held on the under face of the box 228. As the box 228 moves outward into the position shown in Fig. 53 the arm 297 encounters an arm 300, attached by screws or otherwise to the left slotted arm 227 in this figure. This opens the gate existing in the casing 296 and allows the air to be drawn through the perforations in the bottom of the box 228 in precisely the same manner as the tappet-arm 162 operates in Fig. 3 with reference to the end-label-carrying mechanism.

As soon as the box 228 bearing a label (with its under face coated with paste) reaches the inner end of its stroke and the engagement of the bent portion of the bar 297 and the tappet-arm 299 is effected the pneumatic action of the device ceases, and the label, held in exactly the position to be placed on the carton, is released, and the box 228 returns to its normal position to receive another label.

It will be apparent that at the instant the pneumatic action of the box 228 ceases or just immediately preceding this other devices must grasp the label and sustain it until it can be placed on the carton. It will be further seen that the retaining devices for holding the pasted label in position after its release from the box 228 must be such as will hold the label in a fixed definite position, so that when the label is encountered by the rising carton the labels will always meet the cartons accurately, so that the labels when in place will be suitably situated with respect to the cartons on which they are to be pasted.

The mechanism for grasping the label after it is released from the box 228 is as follows, reference being had to Figs. 7, 8, 29, and 44: Referring particularly to Figs. 29 and 44, there are mounted on the bed 6 as a bearing two vertically-slidable shafts 301 and 302, so arranged that they form two oppositely-diagonal corners of an imaginary horizontal rectangle, surrounding the path which the elevator-plate 202 will take in its upward movement bearing the carton. On the tops of these shafts 301 and 302 are flat plates 303. These plates are so situated as to extend immediately below the position of the box 228 when it is at the end of its inward stroke. These plates 303 are to be raised upward in unison with their shafts 301 and 302 and encounter the label held on the under face of the box 228, and in doing so will encounter the pasted side of the label, and the label adheres to these plates 303 on account of the adhesive nature of the paste on it. This vertical raising of the plates 303 takes place at the same instant that pneumatic action in the box 228 ceases. The mechanism for causing a sudden upward jump of the plates 303 at precisely the right interval to grasp the label when released by the box 228 is as follows: The shaft 302 (see Figs. 29 and 44) passes downward through the table and is provided on its lower end with a hook 304. This hook is formed so as to be at approximately right angles with the balance of the shaft 302. The two shafts 301 and 302 are connected together below the table by a cross-bar 305, so that their action is simultaneous.

On the cross-bar 79, extending between the legs 9 and 10 of the bed 6, is a journal-box 306, in which is a short shaft 307, bearing a hub 308, held in place by collars 309 and having projecting from one side an arm 310, which extends into and stands between the sides of the hook 304. This hub 308 also bears a tappet-arm 311, so placed as to be encountered and operated by the end of the crank 246. The engagement of the crank end 246 with the tappet-arm 311 will be very short and only sufficient to rotate the hub 308 on the shaft 307 and cause the arm 311 in the hook 304 to raise the two shafts 301 and 302 and their plate 303 a slight distance and to instantly return. This slight upward movement of the plate 303, as has been described, causes them to encounter the pasted face of the label and bring it downward about a quarter of an inch and free from contact with the under surface of the pick-up mechanism 228. The label which is held paste side downward is now in a position to receive the carton carried by the elevator-plate 202.

In order to make the understanding of the balance of the mechanism easier and clearer, it will be stated that the two plates 303 are separated and stand on either side of the path of the elevator-plate 202 with the label extended between them with its paste side downward, so that as the carton rises with one of its minor sides upward on the elevator-plate 202 it will encounter the under pasted face of the label at a point between the two plates 303, and as the upward movement of the carton continues it will draw the label from engagement with the plates 303 and carry it upward between suitably-placed mechanisms for smoothing the label into position along the two major sides of the carton.

The elevator-plate and its connected mechanism will now be described, reference being generally had to Figs. 1, 2, 5, 9, 25, 26, 27, 28, 30, 31, 32, 33, 34, 35, 36, 37, 38, 39, 52, and 53. Referring first to Fig. 31, there is mounted in the bottom of the V of the left hanger 23 an upright square bar 316. This bar is supported at its upper end by being attached to the under face of the cross-bar 223, extending between the vertical leg 222 and the vertical bar 216. At the point where the bar 316 passes through the bed 6 a large opening is formed in the same for the passage therethrough of a reciprocating sleeve 317. This sleeve 317 is pivotally connected to the connecting-rod 312, operated by the crank 246, and the sleeve 317 is thus actuated reciprocally along the bar 316. The sleeve 317 is normally arranged when the crank is at the lower portion of its movement to pass below the bottom of the bed 6, this being shown in Fig. 31. Also mounted on the bar 316 is a carriage 318, (shown in large detail in Figs. 32 and 33,) consisting of a main portion suitably shaped to slide on the bar 316 and having a projecting bar 319, which bears the elevator-plate 202. This elevator-plate is arranged when in its lower position to stand in the rear of, adjacent to the rear ends of, the rails 13, so that a carton carried along the rails 13 will pass onto this plate 202. Referring now to Fig. 28, this elevator-plate is provided with end plates 320 and 321, the objects of which are to hold the cartons steadily in position while being elevated on the plate 202, and the plate 320 is also arranged to operate other mechanism to be later described. In the upper portion of the carriage 318 is a projecting ear 322, through which passes a pin 323, on which is pivoted a yoked arm 324, having on its free outer end a blade 325. The blade 325 is arranged to be swung downward and press upon the top of the label after the same has been encountered and raised from contact with the plates 303 and retain it in position, as well as press the carton securely on the elevator-plate 202. The mechanism for swinging downward the blade 325 at the proper moment is as follows: The arm 324, which bears the plate 325, is bifurcated at its rear end and straddles the ear 322, and the side arms of the bifurcated portions are arranged to straddle the carriage 318. These bifurcated arms are referred to in the drawings by the reference-numeral 326, and each bears a slidable sleeve 327. Projecting from the sides of the sleeves 327 are pins 328, and to these pins are attached the bifurcated ends of a rocking lever pivoted on a pin 330, the support for which is an ear 331, projecting from the lower portion of the carriage 318 and on the opposite side thereof from the ear 322. The opposite end of this rocking lever is divided and contains a roller 332, whose object will be described later. Extending between the bifurcated arms 329 is a revoluble shaft 333, having an enlarged roller-like middle portion 334. The lower part of the carriage 318 bears a lug 335, arranged to be engaged by a hook 336, pivoted on the sleeve 13

317 by a pin 337. Referring now to Fig. 28, there is mounted on the bed 6, to the left of the central line of the bar 316, a post 338, having a broad base and stiffened at its top by a brace 339, and having in its medial portion a horizontally-swinging tappet 340, consisting of a skeleton frame with two legs, both of which are pivoted on the post 338 and provided with a spring 341, which normally tends to keep the tappet in alinement with the transverse central line of the bar 316, at which point its revolution under the influence of the spring is prevented and arrested by a stop 342. This tappet 340 has its under inner working face inclined at an angle of about forty-five degrees, and this face is so placed as to encounter the roller 332 on the bifurcated arm pivoted on the lower portion of the carriage 318. Extending vertically from the inclined portion of the under face of the tappet 340 is an inclined bar 343, the inclination of which is best shown in Fig. 2, and so placed that the roller 332 when carried downward in unison with the movements of the carriage 318 will encounter its inclined surface and revolve the tappet 340 sufficiently to push it to one side and permit the complete descent of the roller 332 to the position shown in Fig. 28. The operation of this much of the mechanism is as follows: The parts being in the position shown in Fig. 28, with a carton placed on the elevator-plate 202 between the ends 320 and 321, the revolution of the crank 246 will be induced by being thrown into the gear by the mechanism operated by the passage of the carton to the elevator-plate along the rails 13, as has been before described. The revolution of the crank 246 raises the connecting-rod 312 and also the sleeve 317, which passing up on the bar 316 through the opening in the bed 6 encounters the bottom face of the carriage 318 and carries it upward to the limit of the stroke caused by the crank 246. As soon as the carriage 318 starts to rise the roller 332 will encounter the inclined face of the tappet 340, which pushes the roller and the supporting end of the bifurcated arm inward toward the bar 316 and causes a correspondingly reverse motion in the bifurcated ends 329, and as these ends 329 are connected to the sleeves 327 they tilt the plate-bearing bar 324 on its pivot 323 and cause a downward swinging of the plate 325 toward the carton on the elevator-plate 202. This downward-swinging motion of the plate 325 is kept up until the plate 325 bears firmly against the upper surface of the carton, where its weight will retain it during the upward movement of the elevator-plate 202. The pressure of the plate 325 upon the carton serves to compress the label, which has previously been encountered and picked up by the carton in its upward movement, firmly upon the carton and also presses the carton firmly upon its seat on the plate 202. It will be stated that the parts are so arranged that the movement of the carton upward on the elevator-plate 202 will only be about a quarter of an inch before it encounters the label suspended between the plates 303, and the engagement of the pressure-plate 325 upon the top of the carton occurs immediately after the label has been raised by the carton from its position on the plates 303. As the carton continues to rise on the elevator-plate 202 it passes between a pair of stationary brushes, whose object and purpose is to wipe and smooth the label along the two major sides of the carton. These brushes are so positioned that their pressure upon the label will be sufficient to smooth out all wrinkles along the sides of the carton and cause the complete adherence of the label to the same. One of these brushes extends between the horizontal portions of the bars 214 and 215 and is referred to by the reference-numeral 344, and the other brush extends between the lower legs of the L-shaped bars, (designated by the reference-numerals 218 and 221,) and this brush is referred to by the reference-numeral 345. Before the elevator-plate 202 reaches the upper end of its vertical movement the roller portion 334 on the cross-shaft 333 between the bars 329 encounters the curved foot of a tappet-bar 346, projecting downwardly from the cross-bar 223 and parallel therewith. The engagement of this roller 334 with the curved portion of the tappet-bar 346 will cause a reversal of the movement of the arms 329 to that induced by the tappet 340, and thereby swing upwardly the pressure-plate bar and its plate 325, releasing the carton from engagement therewith. As the carriage 318 descends the roller 332 will encounter the inclined bar 343 and swing the tappet 340 to one side until the roller 332 has reached the bottom of its stroke, as shown in Fig. 28, and as soon as the roller 332 has passed below the inclined portion of the tappet 340 the spring 341 will return the tappet into a position to reëngage the roller 332 on its next upward stroke.

It will be seen from the description so far that the carriage 318 is freely slidable on the bar 316, so that it is raised in its upward movement on this bar by encountering the upwardly-rising sleeve 317, driven by the connecting-rod 312, and the downward movement of the carriage 318 is due to gravity and its own weight. Now, from the fact that the elevator-plate 202 is substantially the same width as the carton which it supports, this plate will encounter the stationary brushes 344 and 345 on its downward movement, and hence, unless drawn downward by some other means than its own weight, would be caught and held suspended by these two brushes. It will be further stated that it is impossible to permanently connect the two sleeves 317 and 318, for the reason that the sleeve 317 is drawn downward below the surface of the bed 6 by the connecting-rod 312, and if the machine is constantly running the time that the sleeve 317 is at the bottom of its downward stroke is only momentary and immediately commences its upward movement, and on the other hand the carriage 318 must rest at the bottom of its downward stroke sufficiently long to enable the placing of a carton on the surface of the elevator-plate 202 and allow the inward and outward movement of the label-carrying device 228 and the transfer of the label from the label-bearing mechanism to the plates 303. Therefore it is essential that when the carriage 318 has reached the bottom of its downward movement a certain length of time must elapse before it is reëngaged by the sleeve 317 for its upward movement, and this object is attained by making the connection between the carriage 318 and the sleeve 317 a detachable one, such as will cause a positive engagement between them from the time that the sleeve 317 and carriage 318 start on their downward movement on the bar 316 until the elevator-plate 202 has safely passed the brushes 344 and 345 and then be discontinued to permit the elevator-plate bearing the carriage 318 to remain stationary and allow the further downward movement of the sleeve 317 a considerable distance and its return to reëngagement with the carriage 318. In accomplishing this object the hook 336 is utilized in the following manner, and its operation and function will now be described. The upper end of this hook 336, which contains the catch, is arranged to be constantly swung inward toward the bar 316 by a spring 347, and the influence of this spring and the position of the hook is such that when the sleeve 317 encounters the bottom side of the carriage 318 the catch on the hook 336 will engage the lug 335, and this engagement will be maintained during the upward stroke of the two traveling members and during their downward descent until just immediately previous to the time when the carriage 318 reaches the limit of its downward movement, and when this point has been reached the lower leg of the hook 336 will encounter one of the inclined inner side faces of the hanger-bracket 23 and sliding along this inclined face will be pressed inward sufficiently to press outwardly the catch end of the hook 336 and disengage it from the lug 335, and thus allow the further descent of the sleeve 317. The inclined face of the hanger-bracket 23 will keep this hook in the position shown in Fig. 32 until the next upward movement of the sleeve 317, when the lower leg of the hook 336 is freed from the pressure on it of the inclined face of the bracket 23. This movement of the hook 336 will take place each and every time the sleeve 317 is reciprocated on its bar 316.

The preceding description illustrates the manner by which the carton is raised after passing from the ends of the rails 13 and how it rises on the elevator-plate 202, between the label-bearing plates 303, and how it encounters the label borne by these plates and raises the same from engagement therewith, and how the label is wiped down and smoothed along the two major sides of the carton during this upward movement, and also how as soon as the elevator-plate bearing a carton has reached the top of its stroke it immediately commences to descend and would unless other mechanism were employed carry back the carton to its formal position. It therefore becomes necessary to provide means for retaining the carton at the upper end of its vertical movement sufficiently long to permit the wiping around of the loose depending ends of the label on the lower minor side of the carton. The mechanism for temporarily holding the carton in this position is as follows, reference being particularly had to Figs. 25, 26, and 27: Supported between the posts 219 and 222 by brackets 348 is a plate 349, preferably padded on its inner surface by some elastic material and so positioned that it will just nicely clear the front major face of the carton resting on the elevator-plate 202. It is intended that as soon as the carton has reached a position immediately adjacent this plate 349 that another plate will be swung by automatic means into such a position as to compress the carton against the plate 349, and thus retain the same. The mechanism of this swinging plate is shown in Figs. 1, 25, 26, 27, and 53. In the bar 220 is a vertically-slidable shaft 350, steadied above the bar 220 by an inclosing brace 351. This bar is designed to normally have its lower end rest on the bar 218 and from there to rise vertically. On the shaft 350 is an ear 352, to which is pivotally connected a link 353, and to this link 353 is attached an arm 354, extending from a rotatable shaft 355, extending between the top ends of the bars 216 and 217. On this rotatable shaft 355 are two extended arms 356, which bear a plate 357, fastened to the arms 356 by bolts 358, and between the arms 356 and the plate 357 and surrounding the bolt 356 are coiled springs 359, which serve to cushion the plate 357 when forced against the carton by the revolution of the arms 356. From this description it will be seen that as the shaft 350 is raised the mechanism connecting the same with the plate 357 will cause the downward and inward swinging of this plate 357 and cause it to engage and compress a carton raised into a position in front of the plate 349.

The mechanism by which the shaft 350 is raised is as follows: On the inner face of the shaft 350 is a lug 360, which is so positioned as to be encountered by the upright end 320 of the elevator-plate 202, and as the plate 202 rises the upper surface of the end plate 320, engaging the lug 360, will raise the shaft 350, swinging downward and inward the plate 357 and causing it to compress the carton between it and the plate 349.

The arrangement of the ear 352, the link 353, and the rocking arm 354 constitutes a form of toggle-joint, and the centers and pivots of these are so placed that when the shaft is raised to the top of its stroke it will be retained there by the fact that it is past the center of this toggle-joint. By this is meant that the distance from the center of the shaft 355 to the center of the pivot between the arm 354 and the link 353, plus the distance between that pivot and the pivot between the link 353 and the ears 352, plus the distance from the center of that pivot to the center axial line of the shaft 350, is slightly greater than the direct distance between the center of the shaft 355 and the center of the shaft 350, so that as the shaft 350 is raised upward, so as to bring the ears 352 above the horizontal line of the center of the shaft 355, the shaft 350 will be held against accidental descent by this cramping action of the toggle-joint just described.

A coiled spring 361 is placed on the shaft 355, the influence of which is to rotate the shaft 355 in a direction to cause the plate to swing upward, and thus it will be seen that as the shaft 350 is raised to the top of its stroke its action will be contrary to the influence and tendency of the coiled spring 361, the normal tendency of which is to keep the members, as shown in Fig. 26, with the plate 357 up at all times.

The description so far given having illustrated the means for raising the carton on the elevator-plate 202 past the plates 303, picking up the wrapping-label held by said plates and how the label is wiped along and over the large major sides of the carton, and how the carton having reached the top of its upward movement is grasped between the swinging plate 357 and the stationary plate 349 and there retained, the mechanism for wiping the two loose ends of the label across the lower minor side of the carton follows, referring to Figs. 1, 2, 5, 25, 26, 27, 28, 30, 31, 32, 33, 34, 35, 36, 37, 39, and 53. Before describing in detail the mechanism by which the two lower depending ends of the labels are wiped across the under minor side of the carton it will be presumed that the carton itself is held between the plates 357 and 349 and that the elevator-plate 202 has started on its downward stroke a sufficient distance to permit the mechanism (which will be later described) to pass under the lower face of the carton freely without encountering the elevator-plate 202 or its connected mechanism. It will be stated in order to make the explanation clearer that the horizontal portion of the post 214 and the lower leg 218 are in alinement with each other and that the horizontal portion of the post 215 and the lower leg of the L-bar 221 are likewise in alinement with each other, and on the inner opposing faces of these four bars are cut horizontal ways (see Figs. 5 and 28) in which are adapted to slide a carriage, (not referred to by reference-numeral, but hereinafter designated as the "delivery-carriage.") Reference is now had to Fig. 30, which best illustrates the make-up of this carriage and which is as follows: Arranged to slide in the horizontal portions of the post 214 and the lower leg of the L-shaped bar 218 is one of the side bars of the delivery-carriage, (referred to by reference-numeral 384,) and arranged to slide in the ways in the horizontal portion of the post 215 and the lower leg of the L-shaped bar 221 is a shorter bar 362. These bars 384 and 362 are connected by a cross-bar 363. Parallel with the bar 363 and spaced apart therefrom is another cross-bar 364, having on its end which engages the L-shaped bar 221 a foot portion 365, which is adapted to slide in the ways in the L-shaped bar 221. This foot portion 365 does not connect with the bar 362; but a space is formed between them to permit the movement of the blade 325, which would otherwise be encountered and prevented from rising from engagement with the top of the carton as it reaches the upper end of its vertical movement. The bars 384, 362, 363, 364, and 365 are customarily made integral with each other and are slidable in the ways already described. Attached to the front end of the cross-bar 363 is a wiping-brush 366, with its bristles turned outwardly in such a position that when carried by the delivery-carriage toward the carton its function will be to wipe the depending end of the label across the lower minor face of the carton. (Reference is here directed to Fig. 9.) Inclosing the bar 364 are a pair of skeleton brush-carriers 367. These brush-carriers are identical and are in horizontal transverse alinement with each other, (reference is here directed especially to Fig. 9,) and these carriers are so formed that they have a lower horizontal straight portion which incloses the bar 364 in Fig. 9, and from there the two sides of the framework constituting this brush are inclined upward at an angle of about twenty-five degrees, more or less, and adjacent to this the upper half of the framework of this brush-carrier is abruptly turned downward to form an abutment against which the bar 364 may engage. From this hollow portion of the framework of the brush-carrier 367 there extends two arms 368, having perforated front ends, through which is a shaft 369, and this shaft 369 is supported by two swinging links 370, each of which is pivoted to the inner faces of the upright post 94. Across the front faces of these brush-carriers is a brush 371, standing transversely disposed with respect to the machine and parallel with the brush 366. It will be seen from the drawings and the description thus far that these two brush-carriers 367 constitute hollow frames having two horizontal portions joined by an inclined or diagonal middle portion, and it will also be seen that as these two frames 367 are pivoted on the shaft 368, which is hung by links 370, they are capable of a horizontal reciprocal movement which is imparted to these two frames by the movements of the delivery-carriage, one bar 364 of which passes through the openings in these frames. Anticipating the detailed description of how the movement is caused, it will be generally stated that the movement of the delivery-carriage which operates these two brushes will be toward the rear of the machine—that is, toward the right in Fig. 9—a short distance to be followed by an immediate movement of the delivery-carriage toward the front of the machine or the left in Fig. 9. This second movement of the carriage is a relatively longer stroke than the first movement. The means by which these two alternating movements are accomplished is as follows: Mounted on the horizontal portion of the post 215 is a stub-shaft bearing 372. Projecting horizontally to the left from the bearing 372 is a stub-shaft 373, (see Fig. 2,) on which is mounted a crank-arm 374. The outer end of this crank-arm 374 is pivotally attached to a link 375, and the opposite end of the link 375 is attached to a pin 376 on a bracket 377 on the rear end of the bar 362. Referring now to Figs. 34, 35, 36, 37, 38, and 39, which illustrate details of the mechanism for revolving the crank-arm 374, there is tightly mounted on the shaft 372 a disk-wheel 378, having a portion of its periphery cut away for the reception therein of a pawl 379. (Indicated in Fig. 34.) Surrounding the disk-wheel 378 and its pawl 379 is a cup-shaped member 380, having a central perforation through which projects the shaft 372 and on which this member is freely revoluble. On the interior of the main opening in this cup-shaped member 380 is an inwardly-projecting abutment 381, of proper size to engage the pawl 379 and simultaneously revolve the crank-arm 374 in unison with the cup-shaped member 380 whenever engagement is effected between the abutment 381 and the free outer end of the pawl 379. The outer periphery of the cup-shaped member 380 is provided with spur-gear teeth on its entire surface, and these teeth are arranged to engage rack-teeth on a bar 391, placed parallel with the bar 316 and fastened by any preferred means to the rear face of the sleeve 317. The connection between the rack-bar 391 and the sleeve 317 being constant, the rack-bar 391 is reciprocated upward and downward in unison with the sleeve 317. In passing upward the rack-bar 391 passes through a suitably-formed opening in the cross-bar 223, which thereby steadies its movements in unison with the sleeve 317.

The teeth on the rack-bar 391 and the cup-shaped member 380 being arranged to intermesh, it is obvious that the upward movement of the rack-bar 391 will revolve the cup-shaped member 380 in a reverse direction to that which would cause an engagement between the abutment 381 and the pawl 379. Hence, as the sleeve 317 moves upward no movement of the crank-arm 374 will take place, as the pawl 379 will ride over the abutment 381 and fail to engage it, and the cup-shaped member 380 will simply revolve loosely on the shaft 372. As the sleeve 317 starts on its downward movement, bringing with it the carriage 318, the cup-shaped member 380 will commence to revolve in a direction designed to cause operative engagement between the abutment 381 and the pawl 379, and as it is designed that the carriage 318 shall descend a sufficient distance to clear the brushes 366 and 371 before movement on their part takes place the cup-shaped member 380 will be so placed on its shaft 372 that the engagement between its teeth and the teeth of the rack-bar 391 will cause a considerable portion of a revolution of the cup-shaped member 380 before the engagement between the abutment 381 and the pawl 379 takes place, thereby allowing sufficient time to elapse to permit the elevator-plate 202 to descend to allow the horizontal movement of the brushes 366 and 371. It will also be stated that the position of the crank-arm 374 will be in the position shown in Fig. 2 at the time the engagement takes place between the abutment 381 and the pawl 379. As soon as this engagement takes place the crank-arm 374 is rotated by the cup-shaped member 380, and the first effect of this rotation will be to force the entire delivery-carriage, with its attached mechanism, a short stroke toward the rear of the machine. The length of this stroke will be sufficient to cause the bar 364 to draw forward the brush-carrying frames 367 a sufficient distance to insure the wiping of the shorter end of the label onto the lower minor side of the carton.

As the label is so placed when picked up by the carton that one depending end of the same will hang farther down than the other, the shorter end is first wiped onto the lower minor face of the carton by the brush 371. As soon as the brush shall have performed this function just described the delivery-carriage will commence its stroke toward the front part of the machine driven by the revolution of the crank-arm 374.

Experience has demonstrated that if the brush 371 is driven directly back along the same horizontal line that it follows in wiping the end of the label onto the face of the carton it is liable to and will frequently brush the newly-pasted end of the label loose. To avoid doing this, the peculiarly-shaped frames 367 are utilized, and the operation of returning the brush 371 to its stationary position (shown in Fig. 9) is as follows: The brush 371, being in frictional engagement with the lower minor face of the carton, will retain the two swinging frames 367 in the position into which they were drawn by the rearward movement of the delivery-carriage. As soon as the delivery-carriage commences its movement toward the front of the machine the bar 364 will freely slide in the horizontal parallel portions of the openings in the frames 367 without disturbing their longitudinal position, and as soon as the under face of the bar 364 encounters the lower portion of the frame which forms one of the sides of the inclined openings in these frames it will depress the ends of both frames 367, which bear the brush 371, thus lowering it from engagement with the carton, and as this motion is continued the bar 364 will encounter the opposite ends of the frames which surround the openings therein and force the frames toward the front of the machine until they have passed from the immediate vicinity of the carton, the brush 371 during this time being lowered from its normal position the distance which will be permitted by the difference between the two horizontal portions of the openings in the frames 367. At the same time that the bar 364 is lowering the brush 371 the brush 366, which is firmly attached to the cross-bar 363 in the delivery-frame, will be carried forward under the influence of the crank-arm 374 and link 375 and with it wipe the long depending loose end of the label across the balance of the lower minor side of the carton and cause it (if desired) to slightly overlap the opposite shorter end of the label which has just been wiped into place.

The stroke of the delivery-carriage toward the front of the machine is sufficiently long to permit the brush 366 to pass beyond the front major side of the carton, and the instant that this brush 366 has passed beyond the carton and wiped the last portion of the label thereon the carton is released from the pressure which is exerted upon it by the plates 357 and 349 and is delivered to the rear of the machine, to be thence carried to any suitable place.

The mechanism by which the carton is released from its position and is delivered completely covered with a label is as follows: Referring first to Figs. 1, 30, and 53, there is pivotally mounted on the inside of the upright leg 219 an L-shaped trip 382, having a lower depending leg and an upper approximately horizontal one. The upper leg of this trip 382 is so placed that its outer free end will almost touch the vertical slidable shaft 350, and on the lower end of this shaft 350 is a pin 383. This pin 383 is so placed on the shaft 350 that when the same is raised to its highest point the pin 383 will be immediately under and just touch the under face of the outer end of the horizontal leg of the trip 382. It is obvious in this construction that when the shaft 350 is raised to its highest point and the plate 357 swung inward and compressed against the side of the carton that any movement against the lower hanging leg of the trip 382 in the direction of the front of the machine will cause the upper horizontal arm of the trip to bear down on the pin 383 and force downward the shaft 350 past the point where the toggle device, already described, is capable of sustaining it, and the spring 361 will immediately after the commencement of the downward movement of the shaft 350 throw upward and outward the plate 357, and thus free the carton from the pressure of the plates 357 and 349. In order to operate this trip 382, there is placed on the bar 386 a lug 385, which being carried forward toward the front of the machine on its supporting-bar 384, will operate the trip and cause the swinging outward of the plate 357.

To catch and properly deliver the cartons after being released from the grasp of the plates 357 and 349, the following mechanism is employed: Extending from the rear inner faces of the bars 362 and 384 are two arms 386, having extending between their outer free ends a rotatable shaft 387, bearing in its central portions between the arms 386 a roller, (not referred to by reference-numeral,) and there is mounted between the bars 362 and 384 adjacent to the cross-bar 363 a rotatable shaft 388, also provided in its central portion with a roller. Over these two rollers just described is passed a wide conveying-belt 389, which may be stationary, if desired, or may be caused to travel over the rollers as pulleys if this latter means is found more desirable. In order to cause the belt 389 to travel, there is placed on the shaft 387 a pulley 390, over which may be passed an elastic belt of sufficient power to revolve the shaft 387 and its roller and actuate the belt 389, using the shaft 388 and its roller as an idler. It will of course be seen that the belt which would be used over the pulley 390 must be a flexible one in view of the fact that the belt 389 and its supporting mechanism is reciprocated along with and forms part of the delivery-carriage.

At the time that the lug 385 actuates the trip 382 the belt 389 will be immediately under the position occupied by the carton, and it will fall on this belt and thereby carried outward on the belt as it is revolved by the pulley 390 or else the belt, not being moved, will serve as a supporting means and convey the carton covered by its label outward to the extreme end of the stroke given to the delivery-carriage carried by the crank 374. If the belt 389 is being actuated, a trough or chute is provided, into which the cartons may fall as rapidly as they are ejected by the machine, and if the belt 389 is not moved the cartons may be picked one by one from its upper surface as rapidly as they are delivered from the label-placing mechanism.

It is believed that the operation of the machine has been sufficiently described and each successive step explained carefully in connection with each of the various mechanisms through which the carton passes from the time that it is conveyed into the hopper at the front end of the machine until it leaves by means of the delivery-carriage at the rear end of the machine.

What I claim, and desire to secure by Letters Patent, is—

1. A machine of the class described, comprising a feeding device for cartons, a course leading from said feeding device, a conveying device to convey cartons from said feeding device successively along said course into a definite position, means for picking up labels singly from a source of supply, means for temporarily holding said labels adjacent the ends of said cartons, means to release said labels and force them against the ends of said cartons while on said course, a carriage mounted on said last-named means, pivotally-mounted brushes on said carriage, means to reciprocate said carriage toward said cartons and simultaneously force inward said brushes into engagement with said labels on said carriage, and means to separate said brushes before said carriage is reciprocated in an opposite direction.

2. In a machine of the class described, the combination of a feeding device for cartons, a course leading from said feeding device, conveying mechanism for transporting cartons along said course to a definite position, means to operate said feeding device whereby cartons are delivered therefrom singly and successively to said course, means for picking up labels singly from a source of supply, means for holding said labels adjacent the ends of said cartons while on said course, means to withdraw said labels from said last-named means and force them against the ends of said cartons, a carriage mounted on said last-named means, pivotally-mounted brushes on said carriage, means to reciprocate said carriage and brushes simultaneously so that when said carriage is reciprocated toward said cartons said brushes are forced into engagement with said labels and are separated from said engagement before said carriage is reciprocated in a reverse direction.

3. A device of the class described comprising a carton-feeding means, means for simultaneously covering the ends of cartons with labels, independent means for covering the sides of said cartons with a label, means for irrevolubly sustaining said cartons during the placement of said labels, and means interposed between said feeding means and said end-label-placing means arranged to be set in operation by the cartons in their passage to said end-label-placing means for causing the operation of said end-label-placing means.

4. A device of the class described comprising means for placing labels simultaneously on the ends of cartons, independent means for placing a label around the sides of cartons, means to irrevolubly hold said cartons during the operation of said last-named means, and means interposed between said end-label-placing means and said last-named means for throwing into operation the mechanism for placing a label on the sides of said carton.

5. The combination in a machine of the class described, of a feeding device for cartons, means for operating said feeding device whereby cartons are delivered therefrom singly and successively, a course leading from said feeding device adapted to receive said cartons, conveying means for moving said cartons along said course arranged to move said cartons at a determinate distance at each reciprocation thereof, end-label-placing mechanism arranged adjacent the point where said cartons are left by said conveying device, comprising means to pick up labels singly from a source of supply, means to coat one side of said labels with an adhesive material, means to hold said labels adjacent the ends of said cartons, means to withdraw said labels from said last-named means and force them against the ends of said cartons, a carriage mounted on said last-named means, pivotally-mounted brushes on said carriage, means to reciprocate said carriage and simultaneously force inward said brushes into engagement with said labels on said carriage when reciprocated in one direction, and means to separate said brushes before said carriage is reciprocated in an opposite direction.

6. A device of the class described comprising in combination a feeding mechanism, a transporting means and label-placing mechanisms, said feeding mechanism being arranged to supply cartons to said transporting means successively, independent means for wrapping a label about the sides of said cartons, means for sustaining said cartons irrevolubly during the operation of said last-described mechanism, said transporting means being arranged to transport cartons from said feeding mechanism to said label-placing mechanisms, and means carried by said transporting means to trip said feeding mechanism and cause the delivery of cartons therefrom.

7. A device of the class described comprising a carton-feeding means, means for simultaneously placing end labels on said cartons, means for transporting said cartons from said feeding means to said end-label-placing means, and means interposed between said feeding means and said end-label-placing means arranged to be engaged by the passing cartons to set in operation said end-label-placing means.

8. A device of the class described comprising separate means for covering a carton with end and side labels, a feeding device therefor consisting of a hopper, means to supply cartons to said hopper, means to transport said cartons from said hopper to one of said label-placing mechanisms, a pivoted plate in said hopper, provided with a projecting leg arranged to encounter the cartons passing through said hopper and arrest their progressive movement therein, a member carried by said transporting means arranged to cause the operation of said plate and release said cartons suspended thereby.

9. A device of the class described comprising a supporting-frame, a course for cartons situated thereon, a feeding mechanism to deliver cartons to said course, means for moving cartons along said course, means to regulate the delivery of said cartons from said feeding mechanism arranged to be actuated by said moving means, a rocking arm to reciprocate said moving means suitably mounted in said frame, and a constantly-running instrumentality to operate said arm.

10. A device of the class described comprising a feeding means and label-placing mechanisms, a suitable course extending from said feeding means to said label-placing mechanisms, a carriage arranged to reciprocate along said course and convey cartons thereon, a plurality of pivotally-mounted plates in said carriage arranged when swung in one direction to project upwardly into the path of cartons on said course, and when swung in an opposite direction to fall below the pathway of cartons passing over said course, means for connecting said plates together whereby their motion is simultaneous, and an oscillatory arm to reciprocate said carriage along said course, one end of which is connected with the frame of the machine and the other to the mechanism of said hinged plates whereby the swinging upwardly of said plates into said course will be simultaneous with the commencement of movement of the carriage on which said blades are mounted.

11. A device of the class described comprising a feeding means and label-placing mechanisms, a suitable course extending from said feeding means to said label-placing mechanisms, means in said feeding means to cause the same to deliver cartons to said course successively, conveying means to move cartons along said course, a tappet mounted on said conveying means arranged to actuate the delivery mechanism in said feeding means, and means to cause constant reciprocation of said conveying means along said course.

12. A device of the class described comprising a feeding means and label-placing mechanisms, a course extending from said feeding means to said label-placing mechanisms for cartons, means to cause a successive movement of cartons along said course from said feeding means to said label-placing means, a rocking tappet-arm suspended over said course in such a position as to be engaged by the passing cartons, means for causing the operation of said label-placing mechanisms involving one member of a clutch, constantly-running mechanism in said device bearing another member of a clutch, means to connect the two members of said clutch together operatively, and means to connect said last-named means with said tappet-arm.

13. A device of the class described comprising a feeding means, means for simultaneously placing end labels on cartons, independent means for wrapping a label about the sides of said cartons, means for holding said cartons irrevolubly during the placing of said labels, a supporting-frame for said means, a constantly-operated clutch member supported in said frame, means for operating said end-label-placing means, a clutch member connected with said last-named means, means for locking the two members of said clutch together, and means arranged to be operated by cartons during their passage from said feeding means to said end-label-placing means to cause the interlocking of said clutch members.

14. A device of the class described comprising a feeding mechanism, means for simultaneously placing labels on the ends of cartons, means for wrapping a label about the sides of said cartons, means for retaining said cartons irrevolubly during the placing of labels thereon, a constantly-revolving sleeve, a clutch member on said sleeve, means for operating said label-placing mechanisms, a clutch member connected with said operating mechanism arranged to engage the clutch member on said sleeve, means to lock said clutch members together, mechanism suitably mounted to encounter the cartons passing over said feeding mechanism to said end-label-placing mechanism, and means to transmit motion from the device encountered by said cartons to said clutch-locking mechanism.

15. A machine for simultaneously covering the ends of cartons with labels, and subsequently by an independent operation wrapping a label about the sides of said carton, comprising feeding means and label-placing mechanisms, a suitable course extending from said feeding means and label-placing mechanisms, mechanism arranged to engage said cartons and convey them along said course from said feeding means to the first of said label-placing mechanisms, a tappet suspended in such a position with respect to said course as to be engaged by cartons passing therealong, a clutch in said device, means to constantly revolve one member of said clutch, means to connect the other member of said clutch with said first label-placing mechanism, means operated by said tappet-arm to lock the members of said clutch together, means to normally keep the members of said clutch out of operative engagement with each other, and means to convey said cartons from said first label-placing mechanism to said second label-placing mechanism.

16. The combination in a device of the class described of a label-placing mechanism adapted to place labels on cartons, means to carry a supply of labels, means to reciprocate said label-carrying means, means to pick up singly a label from said supply and convey it to a position to be engaged by said label-placing mechanism, reciprocally-moving means to wipe said labels onto said cartons when moved in one direction and arranged to detach itself from engagement with said labels before being moved in the opposite direction, and means operated by the movement of cartons to said label-placing mechanism to throw said pick-up mechanism into operation.

17. The combination in a device of the class described, of a label-placing mechanism adapted to place labels on cartons, a plate provided with a supply of independent labels, reciprocally-moving means for picking up labels singly from the top of said supply and conveying them to a position to be engaged by said label-placing mechanism, means for guiding said pick-up mechanism in its movement and retaining it against movement at the time of picking up a label, means to cause said label-supply-carrying plate to approach said pick-up mechanism at the moment said pick-up mechanism is at rest and to recede therefrom during the movement of said pick-up mechanism, and means to positively and successively diminish the distance between said label-carrying plate and said pick-up mechanism at each reciprocation of the former.

18. The combination in a device of the class described of a label-placing mechanism adapted to place labels on cartons, means to carry a supply of labels, a pair of vertically-reciprocatory shafts to support said label-supply-carrying means, a yoke to unite said shafts, a threaded shaft passing through said yoke, a spring-nut carried by said yoke to engage said threaded shaft, ratchet-teeth on said threaded shaft, a pawl to operatively engage said teeth and rotate said shaft at each movement of said yoke, means to reciprocate said yoke, and means to pick up labels singly from said supply and carry them to a position to be engaged by said label-placing mechanism.

19. The combination in a device of the class described of a label-placing mechanism adapted to place labels on cartons, means to furnish a supply of labels, a pick-up mechanism comprising a hollow member provided with a perforated lower face, means to constantly withdraw the air from the interior of said member, a cylinder mounted in said hollow member connecting the interior and exterior thereof, a pasting device, a slidably-mounted piston in said cylinder, said pivoted arm operated by said piston adapted to trip a pasting device, means to convey said pick-up mechanism from the point where it engages said labels to a delivery-point, and means to convey said labels from said delivery-point to a position to be engaged by said label-placing mechanism.

20. In a machine of the class described, the combination of a supporting medium, a suitable carton-support thereon, a frame adjacent said carton-support, slidable carriages mounted in said frame, a pair of pivotally-mounted leaves and pivotally-mounted spring-fingers on each of said carriages, said leaves and spring-fingers arranged to coact and grasp a label, means to deliver a label to said leaves and spring-fingers, means to reciprocate said carriages in said frame, and means to wipe said labels onto the ends of said cartons, said last-named means being arranged to separate said leaves and spring-fingers when reciprocated in one direction whereby said labels are released from operative engagement therewith.

21. In a machine of the class described, the combination of a supporting medium, a suitable carton-support thereon, a frame adjacent said carton-support, a carriage slidable in said frame, pivotally-hung label-grasping mechanisms on said carriage, means on said mechanisms to cause the same to grasp and release a label, means to deliver a label to said grasping mechanism, means on said delivery mechanism to actuate said label-grasping mechanism, and means for reciprocating said slidable carriage.

22. In a machine of the class described, the combination of a supporting medium, a suitable carton-support thereon, a frame adjacent said carton-support, a slidable carriage on said frame, a pair of leaves and a pair of spring-fingers each pivotally mounted in said carriage arranged to coact and grasp a label, a pick-up mechanism arranged to successively bring forward labels and deliver them to said leaves and spring-fingers, means to cause the operation of said leaves and spring-fingers, means to normally retain said leaves and spring-fingers either open or closed, and means to reciprocate said slidable carriage.

23. In a machine of the class described, the combination of a supporting medium, a carton-support thereon, means for temporarily holding labels adjacent the ends of cartons on said support, a slidable carriage on said last-named means, pivotally-mounted brushes on said carriage, mechanism on said last-named means to rock said brushes on their supports, and means to actuate said brush-rocking means and said brush-bearing carriages simultaneously.

24. In a machine of the class described, the combination of a carton-supporting medium, means for temporarily holding labels adjacent the ends of cartons on said supporting means, means to release said labels and force them against the ends of cartons held on said medium, a carriage mounted on said last-named means, pivotally-mounted brushes on said carriage, means to reciprocate said carriage and simultaneously force inward said brushes into engagement with said labels on said carriage when reciprocated in one direction, and means to separate said brushes before said carriage is reciprocated in an opposite direction.

25. In a machine of the class described, the combination of a supporting medium, a carton-support thereon, means for temporarily holding labels adjacent the ends of cartons on said support, means to release said labels and force them against the ends of said cartons, a slidable carriage on said last-named means, pivotally-mounted brushes on said carriage, mechanism on said last-named means to rock said brushes on their supports, and means to actuate said brush-rocking means and said brush-bearing carriages simultaneously.

26. In a machine of the class described, the combination of a carton-supporting medium, means for temporarily holding labels adjacent the ends of cartons on said supporting means, means to release said labels and force their pasted faces against the ends of said cartons, a carriage slidably mounted on said last-named means, brushes pivotally mounted on said carriage, a slidable member mounted similarly to said carriage arranged to actuate said brushes to wipe said labels over the ends of said cartons, and means to cause said member to engage and withdraw the means for forcing the labels against the cartons from operative engagement with said labels when on said cartons.

27. In a device of the class described, the combination of a supporting element, a course for cartons thereon, means to convey cartons along said course and past the end thereof, an elevator-plate to receive said cartons, means to raise said plate, means to interpose a label in the path of said carton on said plate, and means to wipe said label onto the sides of said carton.

28. In a device of the class described, the combination of a supporting element, a course for cartons mounted thereon, means to convey cartons along said course, an elevator-plate to receive cartons from said course, means to move said plate, means to interpose a label in the path of cartons when on said plate, and means to wrap said label about the sides of said carton.

29. The combination in a device of the class described, of a carton receiving and conveying mechanism, means to actuate said mechanism, means to pick up labels successively from a source of supply thereof, means to coat said labels with an adhesive compound, means on said pick-up device to throw said pasting device into operative position, means to cause said pick-up device to interpose pasted labels in the line of movement of said cartons, and means to place said labels on said cartons.

30. The combination in a device of the class described, of a carton receiving and conveying mechanism, means to actuate said mechanism, a reciprocatory pick-up device arranged to pick up labels successively from a source of supply thereof, means to cause said pick-up device to interpose said labels in the line of movement of said cartons, means to coat said labels with paste when held by said pick up device, means to normally retain said pasting device out of the line of movement of said pick-up device, and means to apply said labels to said cartons.

31. The combination in a device of the class described, of means to receive and convey cartons, means to deliver cartons to said receiving means, means to interpose labels in the line of movement of said cartons, means to apply said labels to said cartons, a tappet-arm arranged to be engaged by the cartons passing to said carton-receiving means, means to actuate said carton-receiving means and label-placing mechanism, and means connecting said last-named means operatively with said tappet-arm.

32. A device of the class described, comprising in combination a carton-elevator, means to actuate said elevator, means to interpose labels in the line of movement of said cartons while on said elevator, means for holding said cartons on said elevator arranged to engage said cartons after said cartons have encountered said labels, means to apply said labels to portions of said cartons during their movement on said elevator, means to grasp said cartons at the termination of movement of said elevator, and means for wiping the unattached portions of said labels onto the uncovered portions of said cartons.

33. A device of the class described, comprising in combination a reciprocatory receiving and conveying means, means to actuate said means, means to interpose labels in the line of movement of cartons on said means, means to wipe portions of labels over portions of said cartons while on said means, means to temporarily grasp said cartons at the termination of the stroke of said means, and means to wipe the unattached portions of said labels onto said cartons while being held by said temporary holding device.

34. The combination in a device of the class described, of a carton receiving and conveying means, means to actuate said mechanism, means to interpose labels in the line of movement of said cartons, means to apply portions of said labels to portions of said cartons, means to temporarily hold said cartons, a reciprocatory sliding carriage, brushes mounted on said carriage, and means to bring said brushes on said carriage into operative relation with the unattached portions of said labels whereby said labels are wiped over the uncovered portions of said cartons.

35. The combination in a device of the class described, consisting of a carton receiving and conveying device, means to actuate said device, means to interpose labels in the line of movement of said cartons, means to apply portions of said labels to said cartons, means to temporarily hold said cartons thereafter, a reciprocatory sliding carriage, brushes on said carriage arranged to operatively engage the unattached portions of said labels, and means to impart an alternate reciprocatory motion to said carriage.

36. The combination in a device of the class described, consisting of a carton receiving and conveying mechanism, means to reciprocate said last-named means vertically, means to interpose labels in the line of movement of said cartons, means to apply portions of said labels to portions of said cartons during the vertical movement of said carton-receiving mechanism, means to grasp said cartons when at the top of their upward movement, a slidable carriage arranged to pass under said carton when temporarily held, brushes on said carriage to operatively engage the unattached portions of said labels, and means to reciprocate said carriage.

37. The combination in a device of the class described, consisting of a carton receiving and conveying mechanism, means to impart a vertically-reciprocatory movement thereto, means to interpose labels in the line of movement of said cartons, means to temporarily grasp said cartons when at the end of their upward movement, a horizontally-slidable carriage arranged to pass under said cartons when so held, brushes on said carriage to operatively engage the unattached portions of said labels, means to reciprocate said carriage, and means to operatively connect the carriage-operating mechanism with the mechanism for receiving and raising said cartons.

38. The combination in a device of the class described, consisting of means to receive and convey cartons, means to reciprocate said last-named means, means to interpose labels in the line of movement of said cartons, means to grasp and temporarily retain said cartons when at one end of their reciprocation, means to apply said labels to said cartons, and means operated by said label-placing mechanism for releasing the grasp of said temporary carton-holding device.

In testimony whereof I have hereunto set my hand in presence of two subscribing witnesses.

WILLIAM C. STEVENS.

Witnesses:
C. E. HUMPHREY,
GLENARA FOX.